US012687814B2

(12) United States Patent
Minoshima et al.

(10) Patent No.: US 12,687,814 B2
(45) Date of Patent: Jul. 21, 2026

(54) IMAGE-FORMING APPARATUS INCLUDING MECHANISM FOR MAINTAINING OPENING AND CLOSING STATES OF SHUTTER OF FIXING DEVICE THROUGH URGING FORCE OF URGING MEMBER

(71) Applicant: BROTHER KOGYO KABUSHIKI KAISHA, Nagoya (JP)

(72) Inventors: Saya Minoshima, Gifu (JP); Tomonori Watanabe, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/791,836

(22) Filed: Aug. 1, 2024

(65) Prior Publication Data

US 2025/0044735 A1 Feb. 6, 2025

(30) Foreign Application Priority Data

Aug. 1, 2023 (JP) ................................. 2023-125879

(51) Int. Cl.
*G03G 21/18* (2006.01)
*G03G 15/20* (2006.01)
*G03G 21/16* (2006.01)

(52) U.S. Cl.
CPC ..... *G03G 21/1832* (2013.01); *G03G 15/2017* (2013.01); *G03G 21/1685* (2013.01);
(Continued)

(58) Field of Classification Search
CPC ........... G03G 21/1832; G03G 15/2017; G03G 2215/2009; G03G 2215/2016; G03G 15/20; G03G 21/1685; G03G 15/2035; G03G 21/1633; G03G 21/1647; G03G 21/18; G03G 21/1835; G03G 2215/20; G03G 2221/1639; G03G 2221/1654; G03G 2221/169; G03G 15/2064; G03G 21/1638; G03G 2215/00544; G03G 2215/00548;
(Continued)

(56) References Cited

U.S. PATENT DOCUMENTS

2008/0193163 A1* 8/2008 Moon .................... G03G 21/08
399/128
2010/0254728 A1* 10/2010 Iwase ................ G03G 15/2035
399/122
(Continued)

FOREIGN PATENT DOCUMENTS

| | | |
|---|---|---|
| JP | 2019-095643 A | 6/2019 |
| JP | 2019-101165 A | 6/2019 |

*Primary Examiner* — Stephanie E Bloss
*Assistant Examiner* — Laura Roth
(74) *Attorney, Agent, or Firm* — Scully, Scott, Murphy & Presser, P.C.

(57) ABSTRACT

An image-forming apparatus includes a fixing device, a shutter, and an urging member. The fixing device includes a heater unit, and a pressure unit forming a nipping region in cooperation with the heater unit. The shutter is movable between a closing position for covering a part of the heating unit and an opening position for uncovering the part of the heating unit. The urging member is configured to urge the shutter such that: the shutter at the closing position is maintained at the closing position; and the shutter at the opening position is maintained at the opening position.

21 Claims, 35 Drawing Sheets

(52) U.S. Cl.
CPC ..... *G03G 21/1835* (2013.01); *G03G 21/1633* (2013.01); *G03G 21/1647* (2013.01); *G03G 2215/00544* (2013.01); *G03G 2215/2003* (2013.01); *G03G 2215/2009* (2013.01); *G03G 2215/2016* (2013.01)

(58) Field of Classification Search
CPC ....... G03G 2221/1675; G03G 15/2032; G03G 15/6573
See application file for complete search history.

(56) References Cited

U.S. PATENT DOCUMENTS

| | | | | |
|---|---|---|---|---|
| 2012/0219324 | A1* | 8/2012 | Masuda | G03G 15/2035 399/122 |
| 2012/0251200 | A1* | 10/2012 | Ishida | G03G 15/2028 399/328 |
| 2014/0314438 | A1* | 10/2014 | Maeda | G03G 21/1685 399/92 |
| 2019/0163103 | A1 | 5/2019 | Iizuka | |
| 2019/0163121 | A1 | 5/2019 | Wada et al. | |
| 2023/0082752 | A1* | 3/2023 | Toyota | G03G 21/1633 399/328 |
| 2023/0280675 | A1* | 9/2023 | Minoshima | G03G 15/2028 399/122 |
| 2024/0319662 | A1* | 9/2024 | Minoshima | G03G 21/1842 |
| 2025/0172891 | A1* | 5/2025 | Minoshima | G03G 21/206 |
| 2025/0172903 | A1* | 5/2025 | Minoshima | G03G 21/1633 |
| 2025/0181015 | A1* | 6/2025 | Ohira | G03G 15/2064 |
| 2025/0181021 | A1* | 6/2025 | Ohira | G03G 15/6573 |

* cited by examiner

IMAGE-FORMING APPARATUS INCLUDING MECHANISM FOR MAINTAINING OPENING AND CLOSING STATES OF SHUTTER OF FIXING DEVICE THROUGH URGING FORCE OF URGING MEMBER

REFERENCE TO RELATED APPLICATIONS

This application claims priority from Japanese Patent Application No. 2023-125879 filed on Aug. 1, 2023. The entire content of the priority application is incorporated herein by reference.

BACKGROUND ART

In a conventional image-forming apparatus using a detachable cartridge, a shutter is provided in front of a fixing device in order to prevent a user's hand from contacting a heater of the fixing device.

For example, in such a conventional image-forming apparatus, a link member connected to a shutter is provided such that the link member can abut on a cartridge. Upon attachment of the cartridge, the link member abuts on the cartridge and moves such that the shutter is opened in response to the movement of the link member. The shutter is urged toward its closed position by an urging spring.

SUMMARY

In the above-described conventional structure, the shutter is normally urged toward its closed position by the urging spring. That is, an urging force to move the shutter toward its closed position is still applied even when the shutter is at its open state. Hence, the open state of the shutter may become unstable.

In view of the foregoing, it is an object of the present disclosure to provide an image-forming apparatus capable of stably keeping the opening state and closing state of the shutter.

In order to attain the above and other objects, the present disclosure provides an image-forming apparatus including a fixing device a fixing device configured to fix a toner image to a sheet, a shutter, and an urging member. The fixing device includes a heater unit and a pressure unit forming a nipping region in cooperation with the heater unit. The shutter is movable between a closing position for covering a part of the heater unit and an opening position for opening the part of the heater unit. The urging member is configured to urge the shutter such that: the shutter at the closing position is maintained at the closing position; and the shutter at the opening position is maintained at the opening position.

With this configuration, the opening state of the shutter and the closing state of the shutter can be stably maintained by a single member, i.e., by the urging member.

DESCRIPTION

Hereinafter, an image-forming apparatus 1 according to one embodiment of the present disclosure will be described with reference to FIGS. 1 through 35.

<Outline of Image-Forming Apparatus 1>

Figure 1:
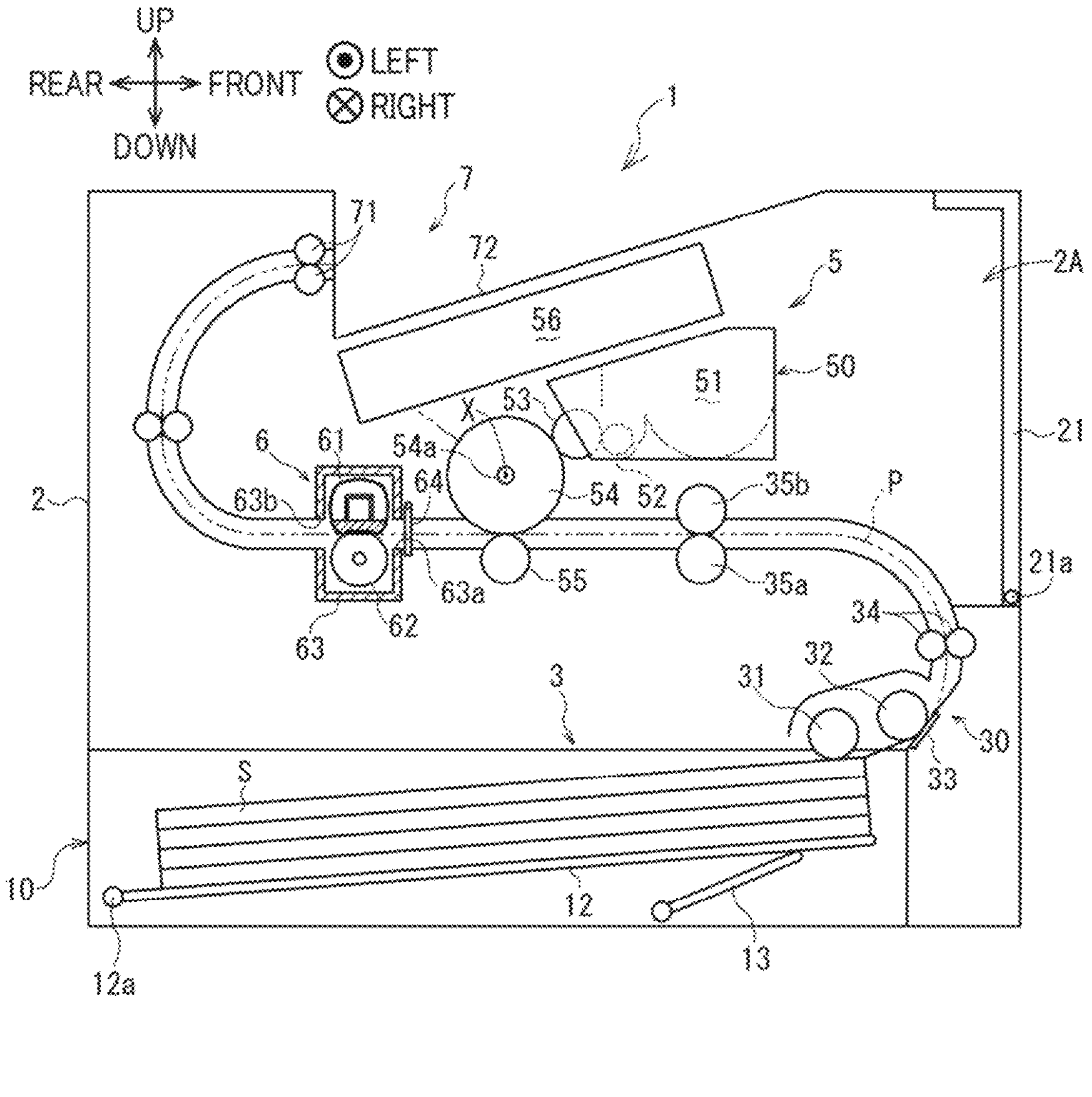
FIG. 1 is a vertical cross-sectional view of an image-forming apparatus according to a first embodiment taken along a widthwise center plane thereof.

The image-forming apparatus 1 illustrated in FIG. 1 is an electrophotographic-type laser printer configured to form an image on a sheet S.

In the following description, the right side and the left side of FIG. 1 will be defined as a front side and a rear side of the image-forming apparatus 1, respectively, and the near side and the far side of FIG. 1 will be defined as a left side and a right side of the image-forming apparatus 1, respectively. Further, the upper side and the lower side of FIG. 1 will be defined as an upper side and a lower side of the image-forming apparatus 1, respectively.

The image-forming apparatus 1 includes a housing 2, a sheet supplying unit 3, an image-forming unit 5, a fixing device 6, and a sheet discharge unit 7.

The housing 2 houses therein the sheet supplying unit 3, the image-forming unit 5, the fixing device 6, and the sheet discharge unit 7. The housing 2 has a front surface where an opening 2A is open. The housing 2 has a front cover 21 configured to open and close the opening 2A. The front cover 21 has a lower end defining a pivot axis 21*a*. The front cover 21 is pivotally movable about the pivot axis 21*a* between a closed position where the front cover 21 closes the opening 2A and an open position where the front cover 21 opens the opening 2A. The housing 2 is an example of a housing of the disclosure. The opening 2A is an example of an opening of the housing of the disclosure.

The sheet supplying unit 3 includes a sheet supply tray 10 configured to support a stack of the sheets S, a sheet pick-up unit 30, a pair of conveyor rollers 34, and a registration roller 35*a*. The sheet supplying unit 3 is positioned at a lower internal portion of the housing 2, and is configured to convey each of the sheets S supported on the sheet supply tray 10 to the image-forming unit 5. The image-forming apparatus 1 defines a sheet conveying passage P extending from the sheet supplying unit 3 to the sheet discharge unit 7 via the image-forming unit 5.

The sheet supply tray 10 includes a lifter plate 12 and a pressure plate 13. The lifter plate 12 is a plate-like member for supporting the sheets S from below. The lifter plate 12 is pivotally movable about a pivot axis 12*a* defined at a rear end portion thereof. The lifter plate 12 is movable upward and downward between an ascent position and a descent position by the pivotal movement about the pivot axis 12*a*.

The pressure plate 13 is positioned below the lifter plate 12 and is configured to move the lifter plate 12 up and down between the ascent position and the descent position.

The sheet pick-up unit 30 is a conveying mechanism configured to pick-up one sheet S from the stack of sheets S supported on the sheet supply tray 10 and to convey the sheet S toward the image-forming unit 5. The sheet pick-up unit 30 includes a pick-up roller 31, a separation roller 32, and a separation pad 33.

The pick-up roller 31 is configured to pick-up the sheets S supported on the sheet supply tray 10 and to convey the sheets S toward the separation roller 32. The separation roller 32 is positioned downstream of the pick-up roller 31 in a sheet conveying direction. The separation pad 33 is positioned to face the separation roller 32 and is urged toward the separation roller 32.

The sheets S conveyed by the pick-up roller 31 toward the separation roller 32 are separated one by one at a position between the separation roller 32 and the separation pad 33. Each separated sheet S is then fed into the sheet conveying passage P.

The sheet S fed to the sheet conveying passage P is then conveyed to the image-forming unit 5 by the pair of conveyor rollers 34, the registration roller 35*a*, and a pinch roller 35*b* (described later) facing the registration roller 35*a*. The registration roller 35*a* is configured to regulate a leading end of the sheet S to temporarily stop the same, and then to convey the sheet S toward the image-forming unit 5 at a prescribed timing.

The image-forming unit 5 is positioned downstream of the sheet supplying unit 3 in the sheet conveying direction. The image-forming unit 5 is configured to form an image on the sheet S conveyed from the sheet supplying unit 3. The image-forming unit 5 includes a process cartridge 50, a transfer roller 55, and an exposing device 56.

The process cartridge 50 is configured to transfer an image onto the sheet S conveyed from the sheet supplying unit 3. The process cartridge 50 is positioned above the sheet supplying unit 3 when accommodated in the housing 2. The process cartridge 50 includes a developer accommodation chamber 51, a supply roller 52, a developing roller 53, and a photosensitive drum 54. The pinch roller 35*b* is supported by the process cartridge 50.

The process cartridge 50 is configured of: a drum cartridge including the photosensitive drum 54; and a developing cartridge including the developing roller 53 and attachable to the drum cartridge. The process cartridge 50 is attachable to and detachable from the housing 2. Specifically, the process cartridge 50 is attached to the housing 2 by inserting, into the housing 2, the drum cartridge and the developing cartridge attached to the drum cartridge as a unit. The process cartridge 50 is detached from the housing 2 by removing, from the housing 2, the drum cartridge and the developing cartridge attached thereto altogether as a unit.

The process cartridge 50 may be configured as a cartridge including at least one of a photosensitive drum, a developing roller, and a developer storage chamber. Attachment and detachment of the process cartridge 50 to and from the housing 2 can be performed when the front cover 21 is at the open position. The process cartridge 50 is an example of an operation member of the disclosure. The process cartridge 50 is an example of a cartridge serving as the operation member of the disclosure.

The photosensitive drum 54 defines a rotational axis X. In a state where the process cartridge 50 is attached to the housing 2, the photosensitive drum 54 is arranged such that the rotational axis X extends in a left-right direction. The photosensitive drum 54 includes a drum shaft 54*a* defining the rotational axis X. The drum shaft 54*a* is made from metal. The photosensitive drum 54 is rotatable about the rotational axis X.

In the present embodiment, the process cartridge 50 is configured of: the drum cartridge including the photosensitive drum 54; and the developing cartridge attachable to the drum cartridge and including the developing roller 53. However, the process cartridge 50 may be configured of: a cartridge including the photosensitive drum 54 and the developing roller 53; and a toner box attachable to the cartridge and configured to accommodate toner therein.

Still alternatively, in the image-forming apparatus 1, the drum cartridge including the photosensitive drum 54 and the developing cartridge including the developing roller 53 may be individually attachable to the housing 2. That is, the process cartridge 50 may be configured as a detachable cartridge that includes at least one of a photosensitive drum, a developing roller, and a toner container, the cartridge being detachably attachable to the housing 2.

The exposing device 56 is configured to expose a peripheral surface of the photosensitive drum 54 to light. The exposing device 56 includes a laser diode, a polygon mirror, a lens, and a reflection mirror, and the like. The exposing device 56 is configured to irradiate laser light to the photosensitive drum 54 of the process cartridge 50 attached to the housing 2, based on image data inputted into the image-forming apparatus 1, to form an electrostatic latent image on the peripheral surface of the photosensitive drum 54.

The developer accommodation chamber 51 is configured to accommodate toner as a developer. The toner stored in the developer accommodation chamber 51 is supplied to the supply roller 52 while being agitated by an agitator (not illustrated). The supply roller 52 is configured to supply the toner conveyed from the developer accommodation chamber 51 to the developing roller 53.

The developing roller 53 is arranged in close contact with the supply roller 52. The developing roller 53 is configured to carry the toner that is supplied from the supply roller 52 and that is positively charged by a friction member (not illustrated). Further, the developing roller 53 is applied with a developing bias by a bias application member (not illustrated).

The photosensitive drum 54 is positioned adjacent to the developing roller 53. The peripheral surface of the photosensitive drum 54 is uniformly charged by a charger (not illustrated), and then the peripheral surface is exposed to light by the exposing device 56. The exposed region on the peripheral surface of the photosensitive drum 54 has a potential lower than potential of a non-exposed region thereon, whereby the electrostatic latent image corresponding to the image data is formed on the peripheral surface (exposed region) of the photosensitive drum 54. The positively charged toner is supplied from the developing roller 53 to the exposed region on the peripheral surface of the photosensitive drum 54 where the electrostatic latent image is formed, so that a visible toner image corresponding to the electrostatic latent image is formed on the peripheral surface of the photosensitive drum 54.

The transfer roller 55 is positioned to face the photosensitive drum 54 of the process cartridge 50 attached to the housing 2. The transfer roller 55 is applied with a transfer bias by a bias application member (not illustrated). The toner image formed on the peripheral surface of the photosensitive drum 54 is transferred onto a surface of the sheet S while the sheet S nipped between the transfer roller 55 and the photosensitive drum 54 is conveyed in a state where the transfer bias is applied to the peripheral surface of the transfer roller 55. The sheet S onto which the toner image has been transferred is then conveyed to the fixing device 6.

The fixing device 6 is configured to thermally fix the toner image that has been transferred on the sheet S by the process cartridge 50 to the sheet S. The fixing device 6 includes a heating unit 61 and a pressure roller 62. The heating unit 61 is configured to generate heat when supplied with power from a power source (not illustrated). The pressure roller 62 is positioned to face the heating unit 61. One of the heating unit 61 and the pressure roller 62 is urged toward the other (toward a remaining one of the heating unit 61 and the pressure roller 62) by an urging mechanism (not illustrated), so that the heating unit 61 and the pressure roller 62 are in close contact with each other. The fixing device 6 is an example of a fixing device of the disclosure. The heating unit 61 is an example of a heater unit of the disclosure, and the pressure roller 62 is an example of a pressure unit of the disclosure.

When the sheet S on which the toner image has been transferred is conveyed to the fixing device 6, the heating unit 61 and the pressure roller 62 convey the sheet S while nipping the sheet S therebetween to apply heat to the sheet S to thermally fix the toner image to the sheet S. In this way, the fixing device 6 thermally fixes the toner image to the sheet S while the sheet S is conveyed through the fixing device 6.

The sheet discharge unit 7 is positioned downstream of the image-forming unit 5 in the sheet conveying direction. The sheet discharge unit 7 is configured to discharge the image-formed sheet S to an outside of the image-forming apparatus 1. The sheet discharge unit 7 includes a pair of discharge rollers 71 and a discharge tray 72. The pair of discharge rollers 71 is configured to discharge the sheet S conveyed from the fixing device 6 along the sheet conveying passage P toward the outside of the housing 2. The discharge tray 72 is defined on an upper surface of the housing 2, and is configured to receive the sheet S discharged to the outside of the housing 2 by the pair of discharge rollers 71.

Figure 2:
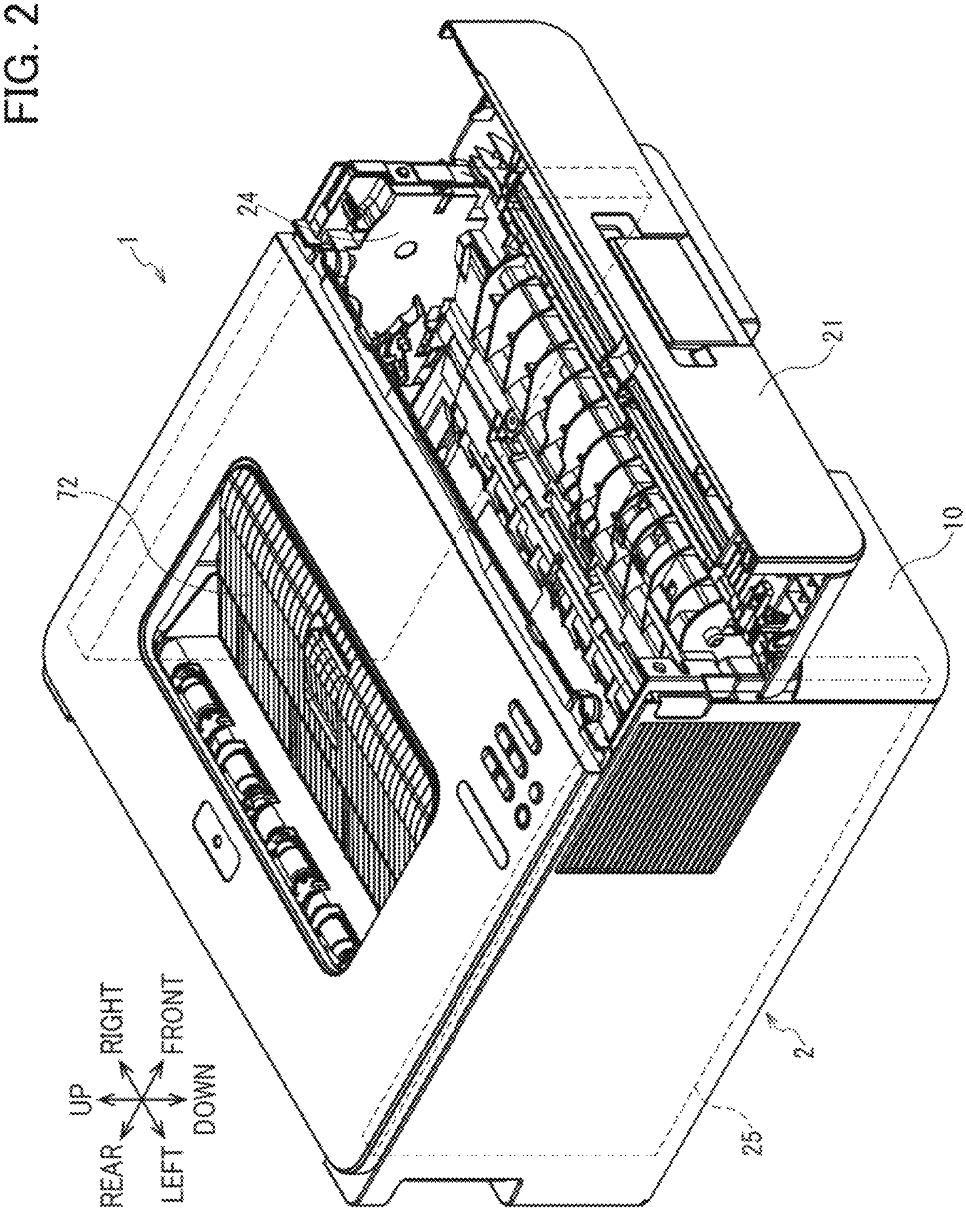
FIG. 2 is a perspective view of the image-forming apparatus in a state where a front cover thereof is at its open position.

As illustrated in FIG. 2, the housing 2 includes a first main frame 24 and a second main frame 25 spaced away from each other in the left-right direction. The first main frame 24 is positioned at a right end portion of the housing 2, and the second main frame 25 is positioned at a left end portion of the housing 2. The first main frame 24 extends in a front-rear direction and an up-down direction, and has a major surface perpendicular to the left-right direction. The second main frame 25 extends in the front-rear direction and up-down direction, and has a major surface perpendicular to the left-right direction.

The process cartridge 50 (attached to the housing 2) and the fixing device 6 are positioned between the first main frame 24 and the second main frame 25. The first main frame 24 is positioned rightward of the process cartridge 50 and the fixing device 6, and the second main frame 25 is positioned leftward of the process cartridge 50 and the fixing device 6. The process cartridge 50 is detachably supported by the first main frame 24 and the second main frame 25.

<Fixing Device 6>

Figure 3:
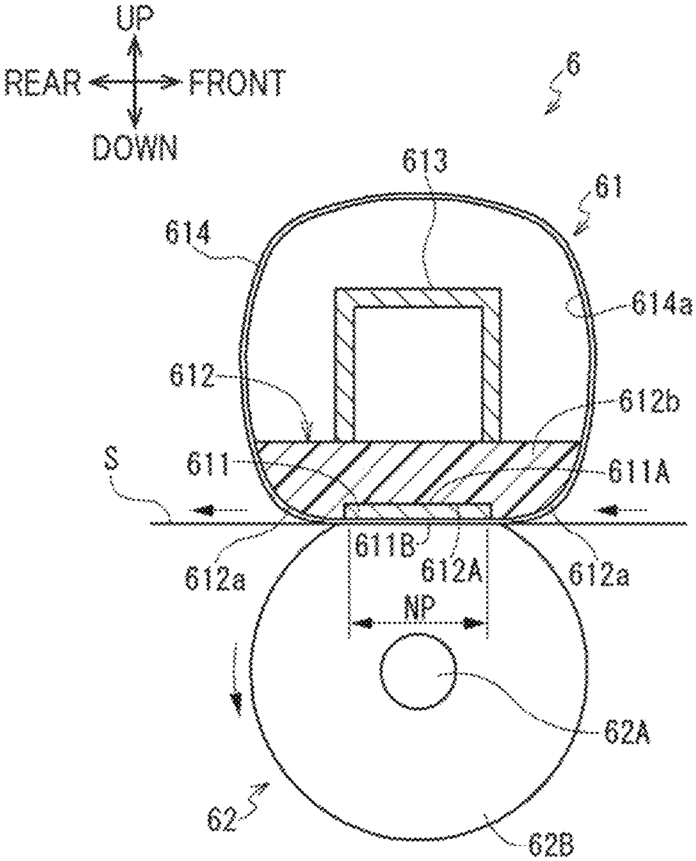
FIG. 3 is a cross-sectional side view of a fixing device in the image-forming apparatus.
Figure 4:
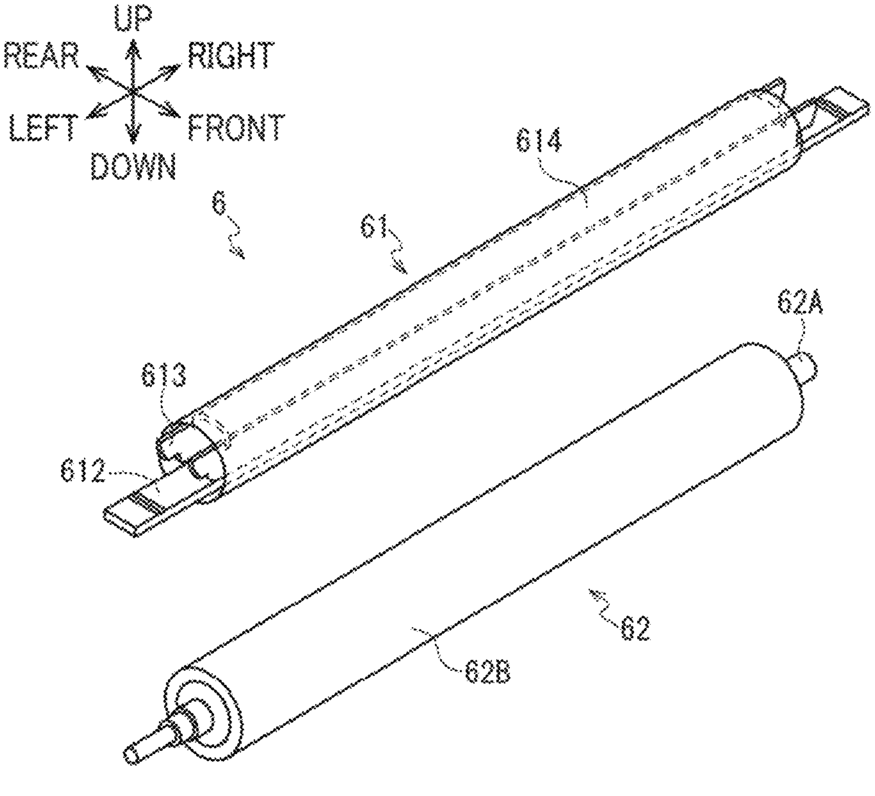
FIG. 4 is a perspective view of a heating unit and a pressure roller of the fixing device.

As illustrated in FIGS. 3 and 4, the heating unit 61 includes a heater 611, a holder 612, a stay 613, and a belt 614. The heater 611 has a flat plate-like shape elongated in the left-right direction. The heater 611 has a first surface 611A and a second surface 611B opposite the first surface 611A. The first surface 611A is supported by the holder 612.

The holder 612 is made from resin, for example. The holder 612 includes a support wall 612*b*. The support wall 612*b* has a guide surface 612*a* and a supporting surface 612A. The guide surface 612*a* contacts an inner peripheral surface 614*a* of the belt 614 for guiding a circular movement of the belt 614. The supporting surface 612A is in contact with the first surface 611A of the heater 611 for supporting the same. The stay 613 supports the holder 612. The stay 613 has a higher rigidity than the holder 612 made from resin. For example, the stay 613 is manufactured by bending a steel plate (having higher rigidity than the holder 612) to have a U-shape in cross-section.

The belt 614 is an endless belt having heat resistivity and flexibility. The belt 614 is constituted by a metal hollow tubular member made from, for example, stainless steel, and a fluorine resin layer coated over the hollow tubular member. The heater 611, the holder 612, and the stay 613 are positioned in an internal space provided by the endless belt 614. The belt 614 is configured to circularly move around the heater 611, the holder 612, and the stay 613. The inner peripheral surface 614*a* of the belt 614 is in contact with the heater 611.

The pressure roller 62 includes a shaft 62A made from metal and an elastic layer 62B provided over the shaft 62A. The pressure roller 62 is pressed against the heater 611 through the belt 614. The pressure roller 62 and the heater 611 define a nipping region NP therebetween where the belt 614 is nipped therebetween for heating and pressing the sheet S. That is, the pressure roller 62 forms the nipping region NP in cooperation with the heater 611, and is configured to apply heat and pressure to the sheet S at the nipping region NP in cooperation with the heater 611.

The pressure roller 62 is rotationally driven upon receipt of a driving force from a motor (not illustrated) provided inside the housing 2. The belt 614 is configured to circularly move following the rotation of the pressure roller 62 with the aid of the frictional force generated between the pressure roller 62 and the belt 614 or between the belt 614 and the sheet S nipped at the nipping region NP. Hence, the toner image having transferred on the sheet S is thermally fixed thereto while the sheet S is conveyed between the pressure roller 62 and the belt 614 heated by the heater 611.

As illustrated in FIGS. 1 and 5A through 7B, the fixing device 6 further includes a fixing frame 63 covering the heating unit 61 and the pressure roller 62, and a shutter 64 supported by the fixing frame 63.

The fixing frame 63 holds the heating unit 61 and the pressure roller 62. The fixing frame 63 covers circumferences of the heating unit 61 and the pressure roller 62. The fixing frame 63 has a first opening 63*a* (see FIGS. 7A and 7B) and a second opening 63*b* (see FIGS. 7A and 7B). The first opening 63*a* is formed at an upstream side of the heating unit 61 and the pressure roller 62 in the sheet conveying direction. The second opening 63*b* is formed at a downstream side of the heating unit 61 and the pressure roller 62 in the sheet conveying direction. The fixing frame 63 covers the heating unit 61 from above.

The shutter 64 is positioned at an upstream side of the first opening 63*a* in the sheet conveying direction. The shutter 64 is an example of a shutter of the disclosure.

The shutter 64 includes a shutter body 640, a pair of pivot shafts 641, and a connection shaft 642. The shutter body 640 has a generally flat plate-like shape extending in the left-right direction. Each pivot shaft 641 is provided on each end of the shutter body 640 in the left-right direction to extend therefrom outward in the left-right direction. The pivot shafts 641 are both rotatably supported by the fixing frame 63. The connection shaft 642 protrudes rightward from a right end of the shutter body 640. That is, the connection shaft 642 extends in parallel to each pivot shaft 641.

The shutter 64 is pivotally movable about an axis of each pivot shaft 641 between a closing position (illustrated in FIGS. 5A, 6A, 7A) where the shutter 64 closes the first opening 63*a* and an opening position (illustrated in FIGS. 5B, 6B, 7B) where the shutter 64 opens the first opening 63*a*. The nipping region NP defined between the heating unit 61 and the pressure roller 62 is covered with the shutter 64 when the shutter 64 is at the closing position, whereas the nipping region NP is exposed to an outside of the fixing frame 63 through the first opening 63*a* when the shutter 64 is at the opening position.

The shutter 64 covers a part of the heating unit 61 when the shutter 64 is at the closing position, and opens the part of the heating unit 61 when the shutter 64 is at the opening position. That is, the shutter 64 can be displaced between the closing position where the shutter 64 closes the part of the heating unit 61 and the opening position where the shutter 64 opens the part of the heating unit 61.

As illustrated in FIGS. 5A, 5B, 7A, 7B and 8A, the shutter 64 has an abutment end part 64*a*. The abutment end part 64*a* is an upper end of the shutter 64 (shutter body 640) when the shutter 64 is at the closing position. When the shutter 64 is at the opening position, the shutter 64 (abutment end part 64*a*) abuts on an abutment surface 631 of the fixing frame 63 (see FIG. 7B). The abutment surface 631 of the fixing frame 63 faces upstream in the sheet conveying direction. The abutment end part 64*a* of the shutter 64 abuts on the abutment surface 631 when the shutter 64 is at the opening position. The abutment of the abutment end part 64*a* on the abutment surface 631 restricts the shutter 64 from pivotally moving further in a direction for opening the shutter 64 (clockwise in FIG. 7B) from the opening position illustrated in FIG. 7B. That is, the abutment surface 631 of the fixing frame 63 functions as a restriction surface for restricting the position of the shutter 64 when being abutted by the shutter 64 at the opening position.

As illustrated in FIGS. 5A, 5B, 8A and 8B, the shutter 64 has an abutment part 64*b* configured to abut on the fixing frame 63 when the shutter 64 is at the closing position. The abutment part 64*b* is provided at a right end portion of the shutter 64 (shutter body 640). The abutment part 64*b* is configured to abut on an abutment surface 632 of the fixing frame 63 when the shutter 64 is at the closing position (see FIG. 8A).

The abutment surface 632 of the fixing frame 63 faces upstream in the sheet conveying direction. The abutment part 64*b* abuts on the abutment surface 632 when the shutter 64 is at the closing position. The abutment of the abutment part 64*b* on the abutment surface 632 restricts the shutter 64 from pivotally moving further in a direction for closing the shutter 64 (counterclockwise in FIG. 7A) from the closing position illustrated in FIG. 7A. That is, the abutment surface 632 of the fixing frame 63 functions as a restriction surface for restricting the position of the shutter 64 when being abutted by the shutter 64 at the closing position. The abutment surface 632 is an example of a restriction surface of the disclosure.

Incidentally, in the present embodiment, the fixing device 6 includes the pressure roller 62, and the heating unit 61 which includes the heater 611 and the belt 614. As an alternative, the fixing device 6 may be configured of a heat roller incorporating a heater, and a pressure roller configured to be pressed against the heat roller. Still alternatively, the fixing device 6 may be configured of a heat roller incorporating a heater, and a pressure belt urged toward the heat roller by an urging member.

<Drum Shaft 54>

Figure 9:
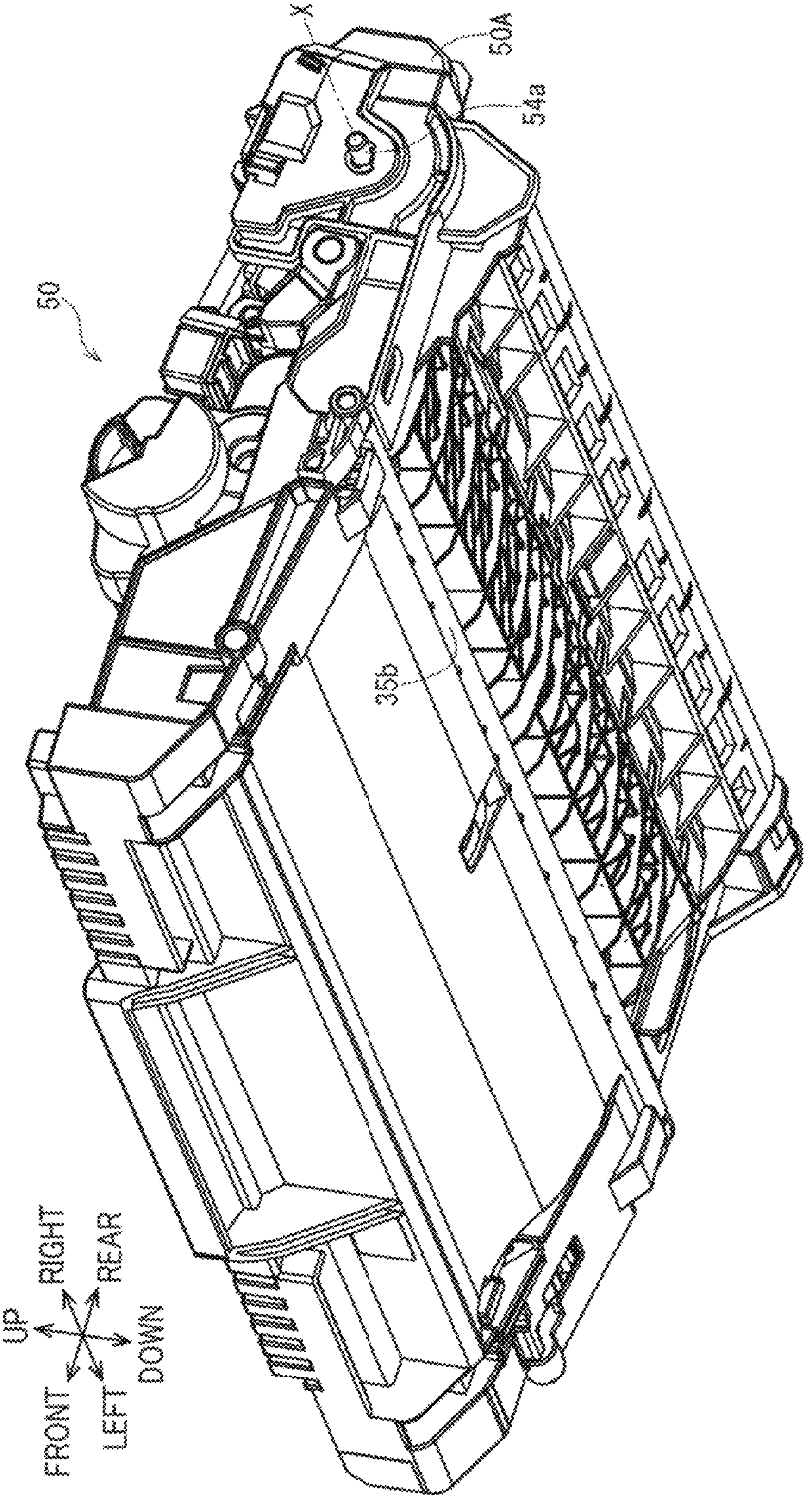
FIG. 9 is a perspective view of a process cartridge for the image-forming apparatus.
Figure 10:
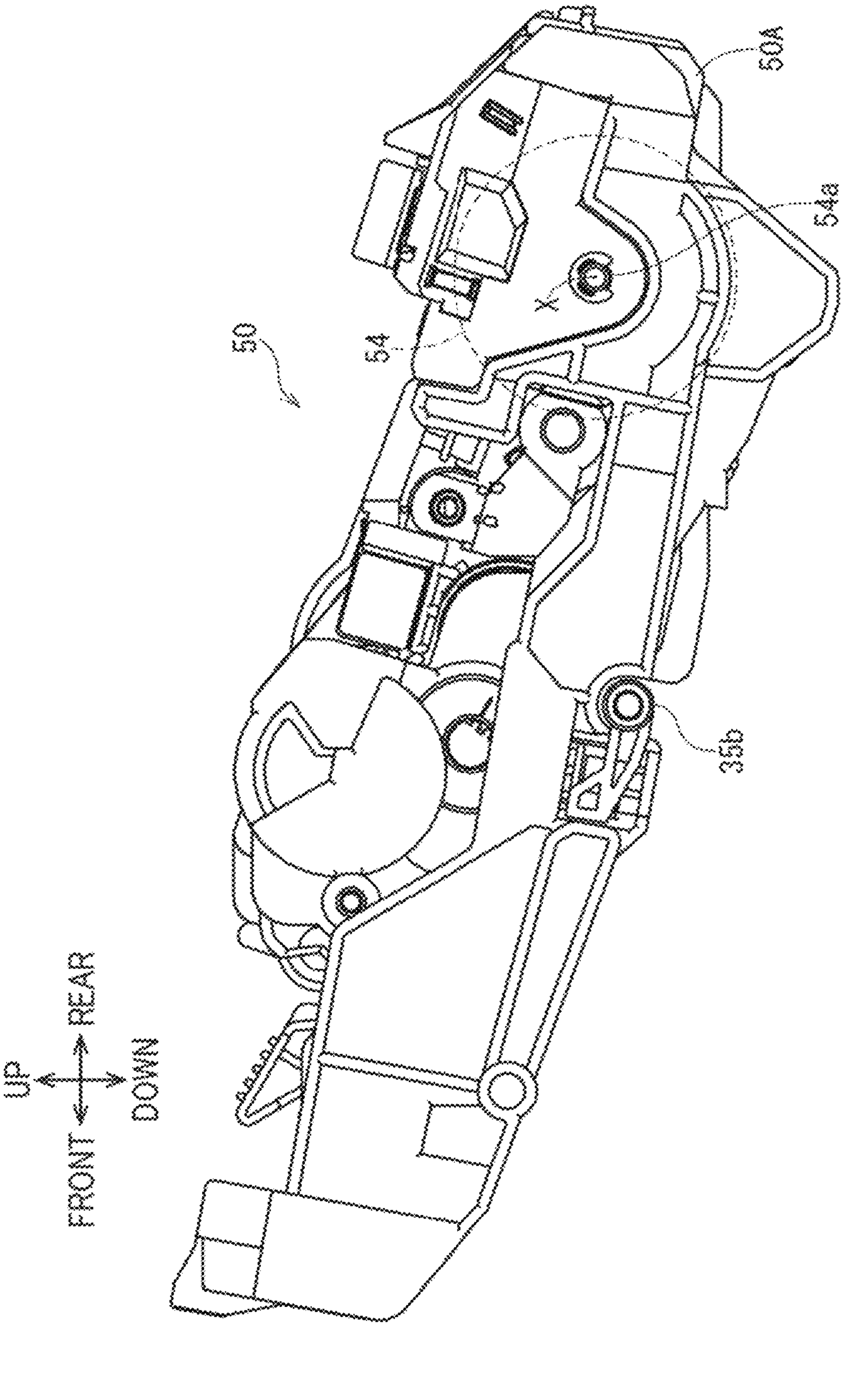
FIG. 10 is a side view of the process cartridge.

As illustrated in FIGS. 9 and 10, the drum shaft 54*a* of the photosensitive drum 54 protrudes rightward from the right end of the process cartridge 50. The drum shaft 54*a* defines the rotational axis X extending in an axial direction. That is, the drum shaft 54*a* protrudes out in the axial direction toward the first main frame 24 along the axis X.

<First Main Frame 24>

Figure 11:
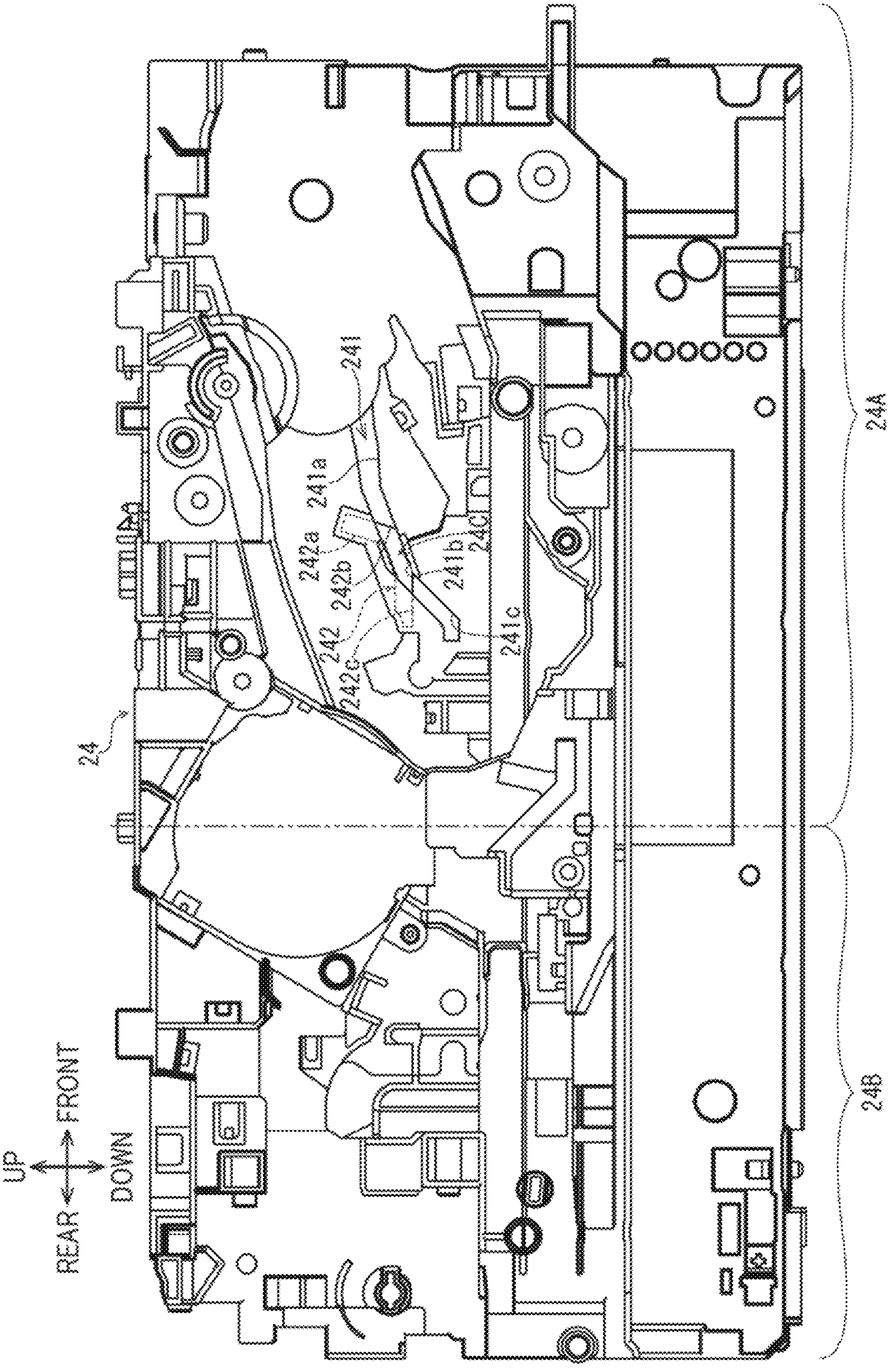
FIG. 11 is a left side view of a first main frame of the image-forming apparatus.
Figure 12:
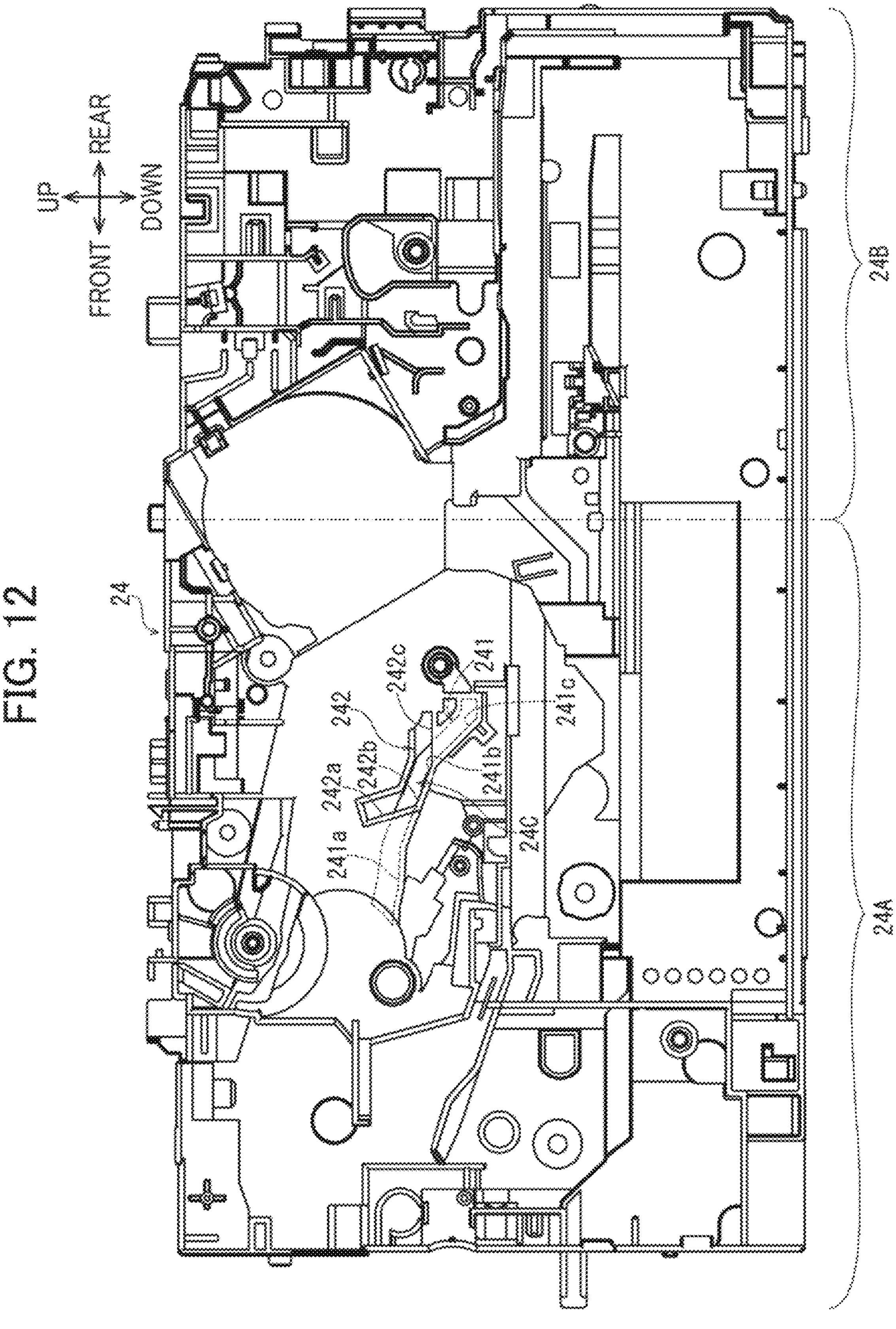
FIG. 12 is a right side view of the first main frame.

As illustrated in FIGS. 11 and 12, the first main frame 24 includes a front frame 24A constituting a frontward portion of the first main frame 24, and a rear frame 24B constituting a rearward portion of the first main frame 24 and positioned rearward of the front frame 24A. The front frame 24A and the rear frame 24B are integral with each other in the front-rear direction.

The front frame 24A of the first main frame 24 has a cartridge rail 241 and an abutment piece rail 242. The cartridge rail 241 has a groove-like shape that is open leftward. The cartridge rail 241 slopes diagonally downward and rearward, while extending generally in the front-rear direction.

The cartridge rail 241 is configured to receive the drum shaft 54*a* of the photosensitive drum 54 therein. The cartridge rail 241 functions to guide the drum shaft 54*a* during the attachment and detachment of the process cartridge 50 to and from the housing 2. The drum shaft 54*a* is inserted in the cartridge rail 241 from its left side while the drum shaft 54*a* is guided along the cartridge rail 241. Incidentally, the process cartridge 50 is attachable to the housing 2 toward the rear in the front-rear direction, and the process cartridge 50 is detachable from the housing 2 toward the front in the front-rear direction.

In this way, the cartridge rail 241 of the front frame 24A is configured to guide the movement of the drum shaft 54*a* during the attachment and detachment of the process cartridge 50 to and from the housing 2.

The abutment piece rail 242 has a groove-like shape that is open rightward. The abutment piece rail 242 slopes diagonally downward and rearward, while extending generally in the front-rear direction. The abutment piece rail 242 is positioned rightward of the cartridge rail 241 in the left-right direction. That is, the abutment piece rail 242 is positioned outward of the cartridge rail 241 in the left-right direction.

The cartridge rail 241 includes a front portion 241*a* constituting a front part of the cartridge rail 241, a rear portion 241*c* constituting a rear part of the cartridge rail 241, and an intermediate portion 241*b* positioned between the front portion 241*a* and the rear portion 241*c*. The abutment piece rail 242 includes a front portion 242*a* constituting a front part of the abutment piece rail 242, a rear portion 242*c* constituting a rear part of the abutment piece rail 242, and an intermediate portion 242*b* positioned between the front portion 242*a* and the rear portion 242*c*.

The intermediate portion 241*b* of the cartridge rail 241 and the intermediate portion 242*b* of the abutment piece rail 242 are overlapped with each other and are in communication with each other. Hence, the intermediate portion 241*b* and the intermediate portion 242*b* provide in combination a through-hole 24C extending throughout a thickness of the front frame 24A in the left-right direction.

That is, the intermediate portion 241*b* (which is a part of the cartridge rail 241) and the intermediate portion 242*b* (which is a part of the abutment piece rail 242) are overlapped with each other, so that the overlapping portion between the cartridge rail 241 and the abutment piece rail 242 forms the through-hole 24C. This overlapping arrangement between the parts of the cartridge rail 241 and the abutment piece rail 242 can realize parts sharing between the cartridge rail 241 and the abutment piece rail 242.

The drum shaft 54*a* enters the through-hole 24C when the process cartridge 50 is attached to the housing 2 as well as when the process cartridge 50 is detached from the housing 2.

The front portion 242*a* of the abutment piece rail 242 is positioned above the front portion 241*a* of the cartridge rail 241. The rear portion 242*c* of the abutment piece rail 242 is positioned above the rear portion 241*c* of the cartridge rail 241.

<Link 8>

As illustrated in FIGS. 6A, 6B, 13A, 13B, and 14, a link 8 is provided in the housing 2. The link 8 is configured to abut on the process cartridge 50, and is configured to move the shutter 64 between the opening position and the closing position. The link 8 is connected to the shutter 64.

Specifically, the link 8 is configured to move the shutter 64 from the closing position to the open position in conjunction with the attachment of the process cartridge 50 to the housing 2 due to abutment of the attached process cartridge 50 with the link 8, and move the shutter 64 from the opening position to the closing position in conjunction with the detachment of the process cartridge 50 from the housing 2 due to abutment of the process cartridge 50 with the link 8. In this way, the link 8 can move the shutter 64 between the closing position and the opening position in accordance with the attachment/detachment of the process cartridge 50 relative to the housing 2.

That is, the link 8 is configured to open and close the shutter 64 in accordance with the attachment/detachment of the process cartridge 50 relative to the housing 2. Specifically, the shutter 64 has moved to the opening position in a state where the process cartridge 50 is attached to the housing 2, whereas the shutter 64 has moved to the closing position in a state where the process cartridge 50 is detached from the housing 2. The link 8 is positioned opposite the process cartridge 50 attached to the housing 2 with respect to the front frame 24A in the left-right direction.

The link 8 is configured to shift between a first state and a second state. Specifically, the link 8 is in the first state prior to the attachment of the process cartridge 50 to the housing 2. When the link 8 is in the first state, the shutter 64 is placed at the closing position. The link 8 has shifted to the second state, from the first state, in a state where the process cartridge 50 is attached to the housing 2. When the link 8 is in the second state, the shutter 64 is placed at the opening position.

That is, the link 8 can shift between: the first state where the link 8 moves the shutter 64 to be placed at the closing position; and the second state where the link 8 moves the shutter 64 to be placed at the opening position.

The link 8 includes an abutment piece 80, a first pivot link 81, a linear motion link 82, a second pivot link 83, a third pivot link 84, a shutter link 85, and a coil spring 86. The abutment piece 80 is an example of an abutment piece of the disclosure. The linear motion link 82 is an example of a first link of the disclosure, and the first pivot link 81 is an example of a second link of the disclosure.

The abutment piece 80 is configured to abut on the drum shaft 54*a* of the photosensitive drum 54. The abutment piece 80 is movable in response to the abutment on the drum shaft 54*a* of the photosensitive drum 54. The abutment piece 80 is slidably fitted with the abutment piece rail 242. The abutment piece rail 242 is configured to guide the movement of the abutment piece 80 that is movable in response to the abutment with the drum shaft 54*a*.

Figure 15A:
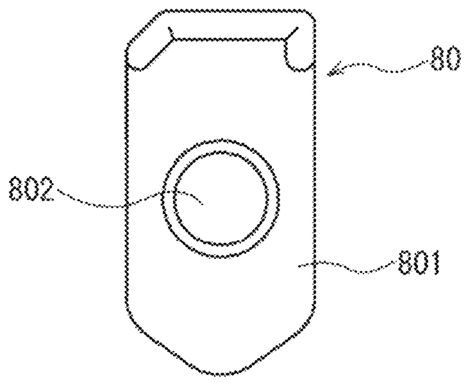
FIG. 15A is a right side view of the abutment piece.
Figure 15B:
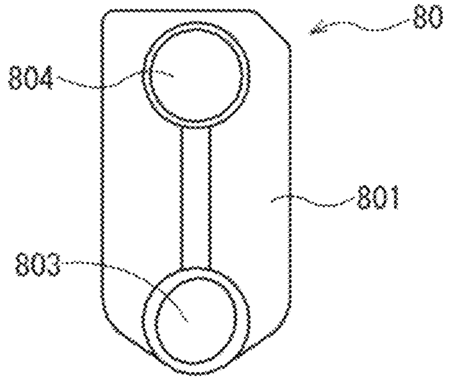
FIG. 15B is a left side view of the abutment piece.
Figure 15C:
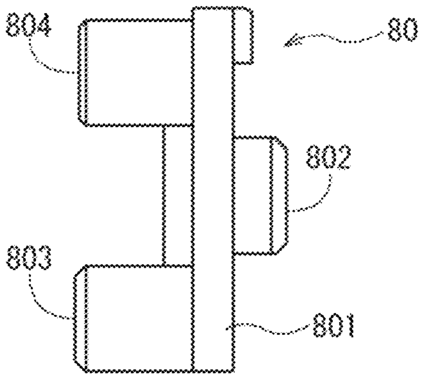
FIG. 15C is a front view of the abutment piece.

As illustrated in FIGS. 15A through 15C, the abutment piece 80 includes a base part 801, a connection part 802, a first boss 803, and a second boss 804. The base part 801 has a plate-like shape having a right surface facing rightward and a left surface facing leftward. The connection part 802 is a boss protruding rightward from the right surface of the base part 801.

The first boss 803 and the second boss 804 are protrusions protruding leftward from the left surface of the base part 801. The first boss 803 and the second boss 804 are inserted in the abutment piece rail 242 of the first main frame 24 from a right side thereof, and are guided by the abutment piece rail 242.

In a state where the first boss 803 and the second boss 804 are entered in the abutment piece rail 242, the second boss 804 is positioned upstream of the first boss 803 in an attachment direction of the process cartridge 50 to the housing 2. Here, the attachment direction is a direction in which the process cartridge 50 inserted in the housing 2 is moved to an attachment position thereof relative to the housing 2 for the attachment of the process cartridge 50 to the housing 2.

The abutment piece 80 is positioned opposite the process cartridge 50 attached to the housing 2 with respect to the front frame 24A of the first main frame 24 in the left-right direction. In the state where the first boss 803 and the second boss 804 are entered in the abutment piece rail 242, the first boss 803 and the second boss 804 do not protrude further toward the process cartridge 50 (further toward the left) from the front frame 24A.

The first boss 803 is configured to abut on the drum shaft 54*a* during the attachment of the process cartridge 50 to the housing 2, and the second boss 804 is configured to abut on the drum shaft 54*a* during the detachment of the process cartridge 50 from the housing 2. That is, the first boss 803 is configured to abut on the drum shaft 54*a* of the process cartridge 50 that is being attached to the housing 2, and the second boss 804 is configured to abut on the drum shaft 54*a* of the process cartridge 50 that is being detached from the housing 2.

In this case, the first boss 803 abuts on the drum shaft 54*a* of the process cartridge 50 that is being attached to the housing 2 through the intermediate portion 242*b* (through-hole 24C) of the abutment piece rail 242 when the first boss 803 is positioned at the intermediate portion 242*b* (through-hole 24C) of the abutment piece rail 242. Further, the second boss 804 abuts on the drum shaft 54*a* of the process cartridge 50 that is being detached from the housing 2 through the intermediate portion 242*b* (through-hole 24C) when the second protrusion 804 is positioned at the intermediate portion 242*b* (through-hole 24C) of the abutment piece rail 242.

The drum shaft 54*a* may abut on the first boss 803 and the second boss 804, respectively, through the through-hole 24C at a position within the through-hole 24C, or rightward of the through-hole 24C.

Incidentally, in the present embodiment, the abutment piece 80 is configured to be moved by the abutment with the drum shaft 54*a*. As an alternative, the abutment piece 80 may be configured to be moved by the abutment with a cartridge protrusion of the process cartridge 50 (rather than with the drum shaft 54*a*), the cartridge protrusion being a protrusion provided separately from the drum shaft 54_a_ and protruding toward the first main frame 24.

The first pivot link 81 extends generally linearly and is pivotally movably connected to the abutment piece 80. The first pivot link 81 is positioned rightward of the front frame 24A of the first main frame 24. The first pivot link 81 has a front end portion provided with a fitting portion 811, and a rear end portion provided with a boss 812 protruding leftward. The connection part 802 of the abutment piece 80 is pivotally movably fitted with the fitting portion 811 at the front end portion of the first pivot link 81. The first pivot link 81 is in such an inclined posture that the fitting portion 811 is positioned above and frontward of the boss 812. The first pivot link 81 is connected to the abutment piece 80 by the fitting engagement of the fitting portion 811 with the connection part 802, and the first pivot link 81 is pivotally movable about an axis of the boss 812 in accordance with the movement of the abutment piece 80.

The linear motion link 82 extends generally linearly in the front-rear direction. The linear motion link 82 is pivotally movably connected to the first pivot link 81. The linear motion link 82 is positioned rightward of the front frame 24A of the first main frame 24 in the left-right direction. The linear motion link 82 has a front end portion provided with a fitting portion 821 with which the boss 812 of the first pivot link 81 is pivotably fitted. The linear motion link 82 has a rear end portion formed with a connection hole 822. The linear motion link 82 is connected to the first pivot link 81 by the fitting engagement between the boss 812 and the fitting portion 821, and is linearly movable in the front-rear direction in accordance with the pivotal movement of the first pivot link 81.

The linear motion link 82 moves rearward to move the shutter 64 from the closing position to the opening position, whereas the linear motion link 82 moves frontward to move the shutter 64 from the opening position to the closing position. In the first state of the link 8, the linear motion link 82 places the shutter 64 at the closing position. In the second state of the link 8, the linear motion link 82 places the shutter 64 at the opening position. The linear motion link 82 is at a first position when the link 8 is in the first state, and the linear motion link 82 is at a second position when the link 8 is in the second state.

Specifically, the linear motion link 82 is configured to move in a first direction to move from the second position toward the first position to move the shutter 64 from the opening position to the closing position. The linear motion link 82 is configured to move in a second direction to move from the first position toward the second position to move the shutter 64 from the closing position to the opening position. That is, in the present embodiment, the first direction for moving the linear motion link 82 from the second position to the first position is frontward, and the second direction for moving the linear motion link 82 from the first position to the second position is rearward.

The second pivot link 83 is connected to the linear motion link 82, and is supported by the first main frame 24. The second pivot link 83 includes: a base support portion 831 rotatably supported by the first main frame 24; a first arm 832 extending generally downward from the base support portion 831; and a second arm 833 extending generally upward from the base support portion 831. The first arm 832 has a tip end portion provided with an engagement pin 832_a_ protruding leftward. The second arm 833 has a tip end portion formed with a connection hole 833_a_.

The engagement pin 832_a_ of the first arm 832 is inserted in the connection hole 822 of the linear motion link 82 from its right side, and is configured to engage with the connection hole 822 in accordance with the movement of the linear motion link 82 in the front-rear direction. The second pivot link 83 is connectable to the linear motion link 82 by the engagement between the engagement pin 832_a_ and the connection hole 822, and is pivotally movable about an axis of the base support portion 831 in accordance with the movement of the linear motion link 82.

The third pivot link 84 is connected to the second pivot link 83, and is pivotally movably supported by a support shaft 65 of the fixing device 6. The support shaft 65 protrudes rightward from a right end portion of the fixing frame 63 (also see FIGS. 6A and 6B).

The third pivot link 84 includes: a base portion 841 pivotally movably supported by the support shaft 65 of the fixing device 6; an engagement pin 842 protruding rightward from the base portion 841; and an operation cam 843 provided at a different position from the engagement pin 842 in a circumferential direction of the base portion 841. The operation cam 843 is formed with an engagement hole 844. The engagement hole 844 penetrates through the operation cam 843 in the left-right direction. The engagement hole 844 is an arcuate slot centered on the axis of the support shaft 65. The engagement hole 844 has a radially inner surface and a radially outer surface. The third pivot link 84 is an example of a link cam of the disclosure.

The engagement pin 842 of the third pivot link 84 is inserted in the connection hole 833_a_ of the second pivot link 83 from its left side. The engagement pin 842 is configured to be engaged with the connection hole 833_a_ in accordance with the pivotal movement of the second pivot link 83. The third pivot link 84 is configured to be connected to the second pivot link 83 by the engagement between the engagement pin 842 and the connection hole 833_a_, and is pivotally movable about an axis of the support shaft 65 in accordance with the pivotal movement of the second pivot link 83.

As illustrated in FIGS. 5A through 6B, the shutter link 85 is connected to the third pivot link 84, and is pivotally movably supported by the support shaft 65 of the fixing device 6. The shutter link 85 is movable in response to the movement of the third pivot link 84 to move the shutter 64 of the fixing device 6 between the closing position and the opening position. The shutter link 85 is positioned at the right end of the fixing device 6. The shutter link 85 is an example of a shutter link of the disclosure.

The shutter link 85 includes a base portion 851, an arm portion 852, an engagement portion 853, and an engagement pin 854.

The base portion 851 is pivotally movably supported by the support shaft 65 that protrudes rightward from the right end of the fixing device 6. The arm portion 852 extends generally frontward from the base portion 851. The arm portion 852 has a front end where the engagement portion 853 is positioned. The engagement portion 853 is formed with an engagement hole 853_a_ which has an oblong shape elongated generally in the front-rear direction. The connection shaft 642 of the shutter 64 (see FIGS. 5A, 5B) is engaged with the engagement hole 853_a_. Thus, the shutter link 85 is connected to the shutter 64 through the engagement between the engagement hole 853_a_ and the connection shaft 642.

Figure 5A:
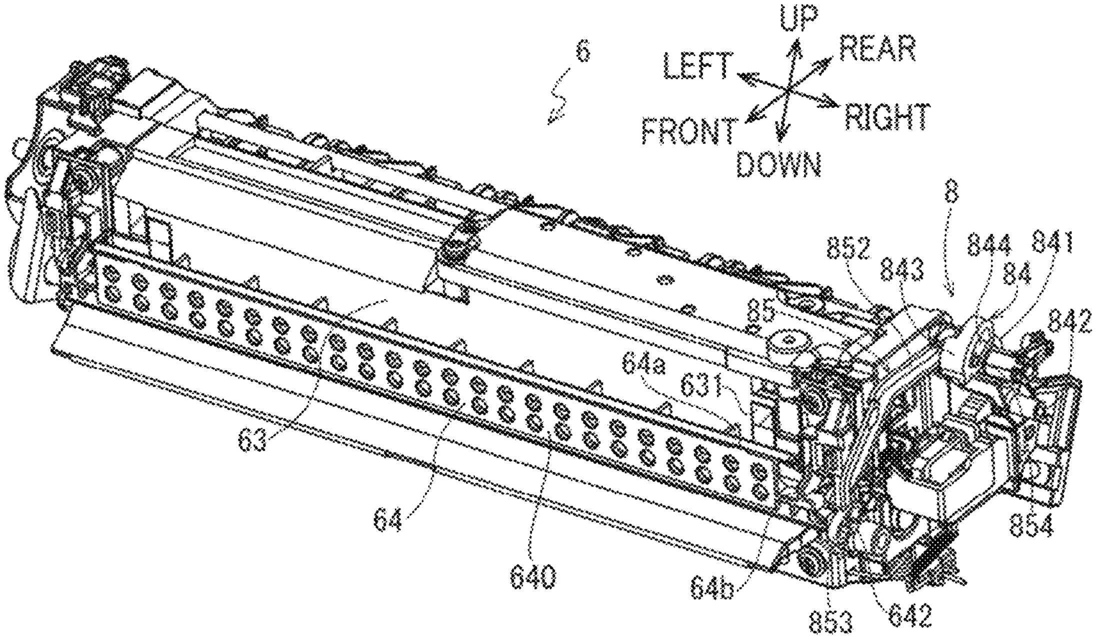
FIG. 5A is a perspective view of the fixing device in a state where a shutter is at a closing position thereof.
Figure 5B:
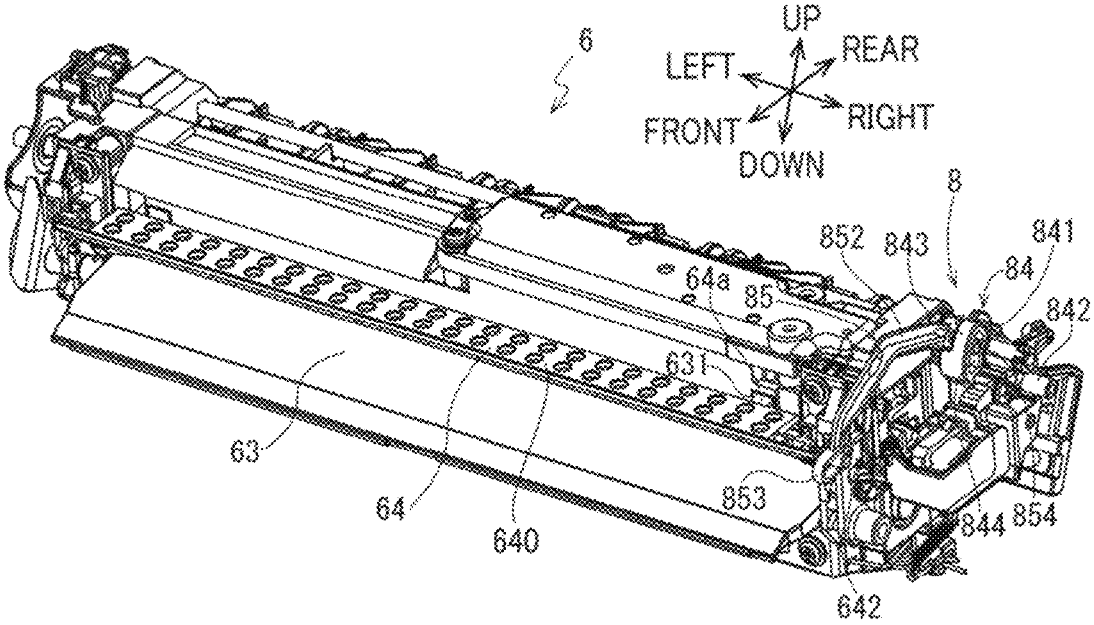
FIG. 5B is a perspective view of the fixing device in a state where the shutter is at an opening position thereof.
Figure 6A:
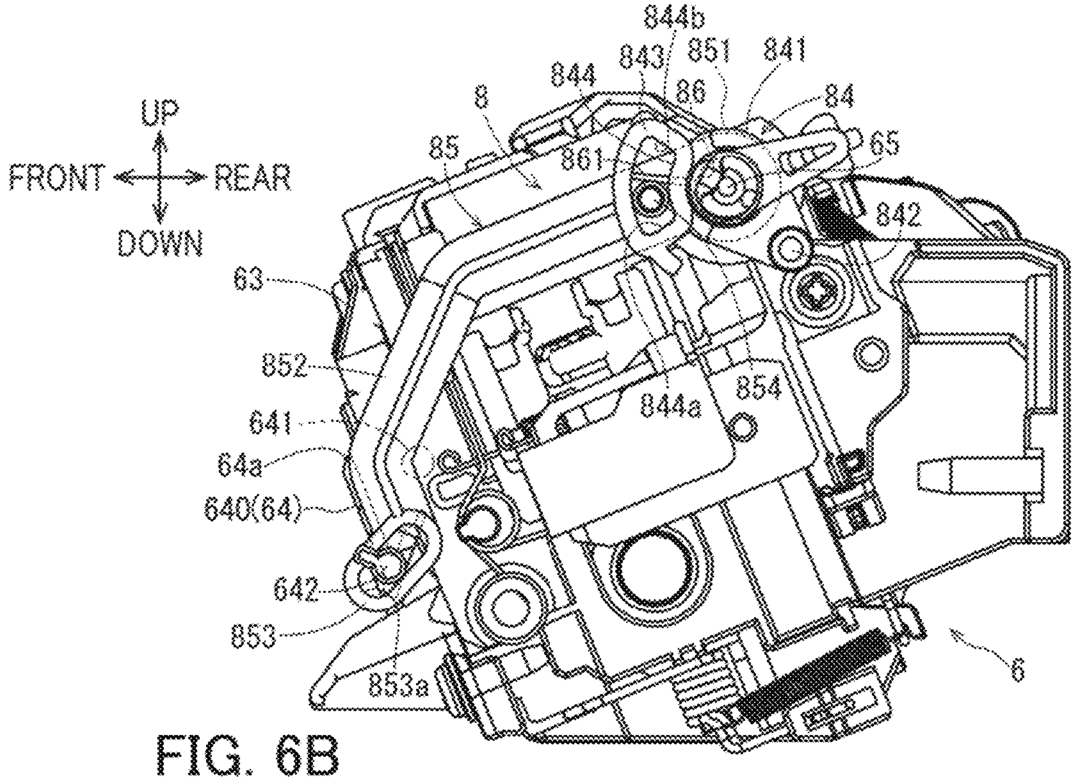
FIG. 6A is a side view of the fixing device in the state where the shutter is at the closing position.
Figure 6B:
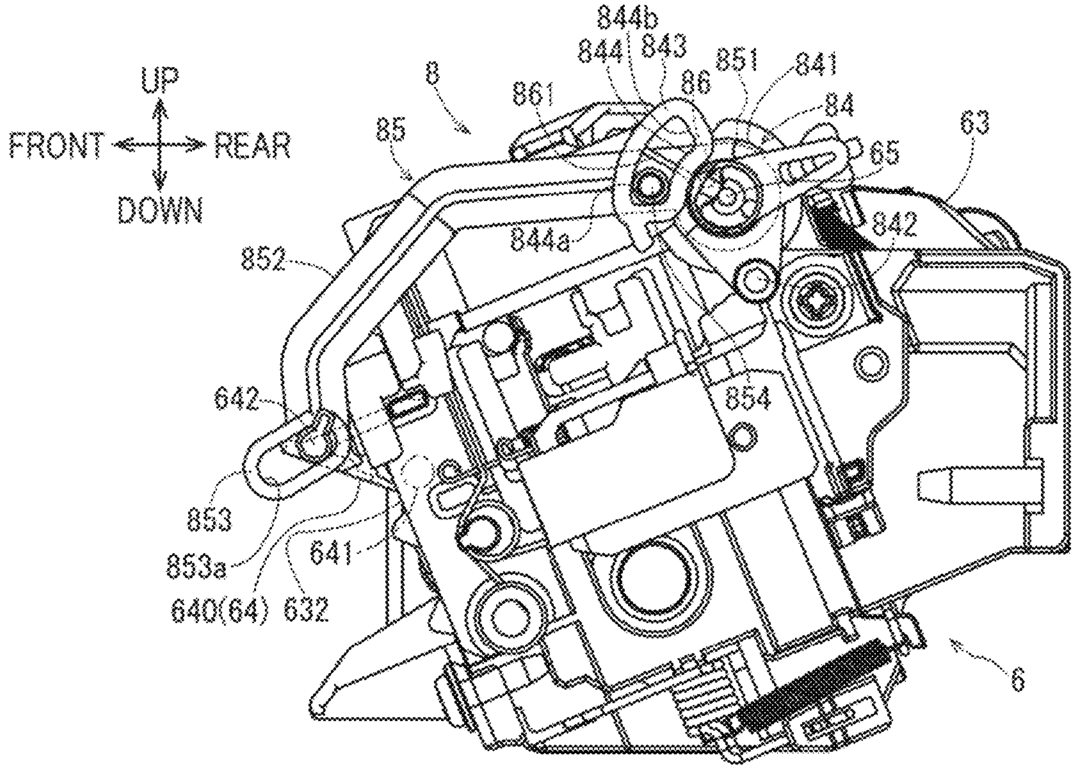
FIG. 6B is a side view of the fixing device in the state where the shutter is at the opening position.
Figure 7A:
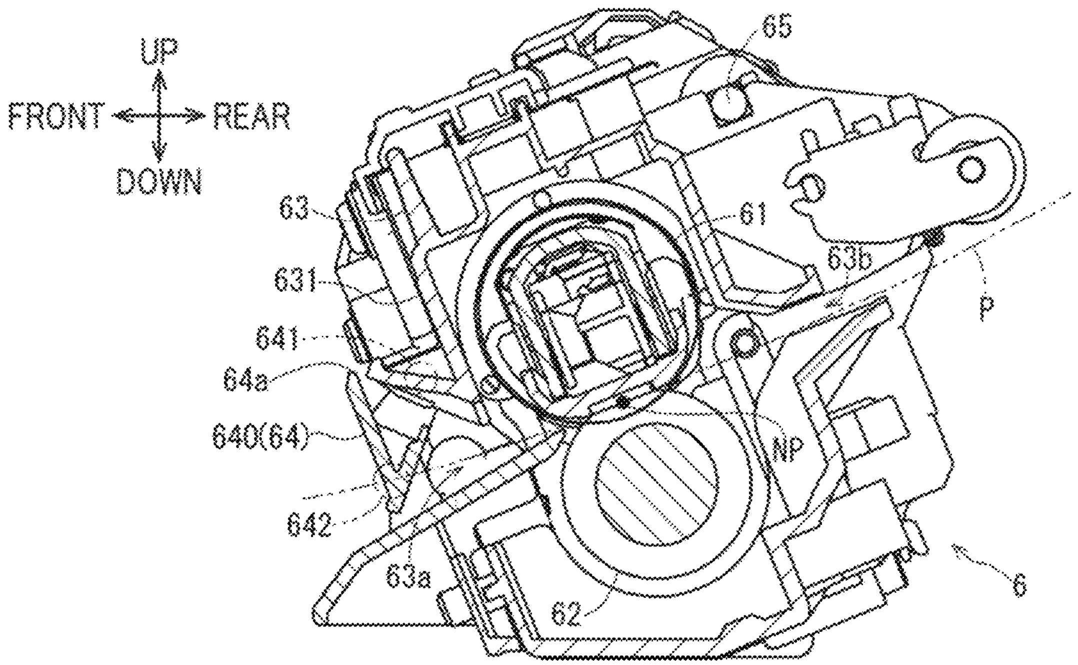
FIG. 7A is a cross-sectional side view of the fixing device in the state where the shutter is at the closing position.
Figure 7B:
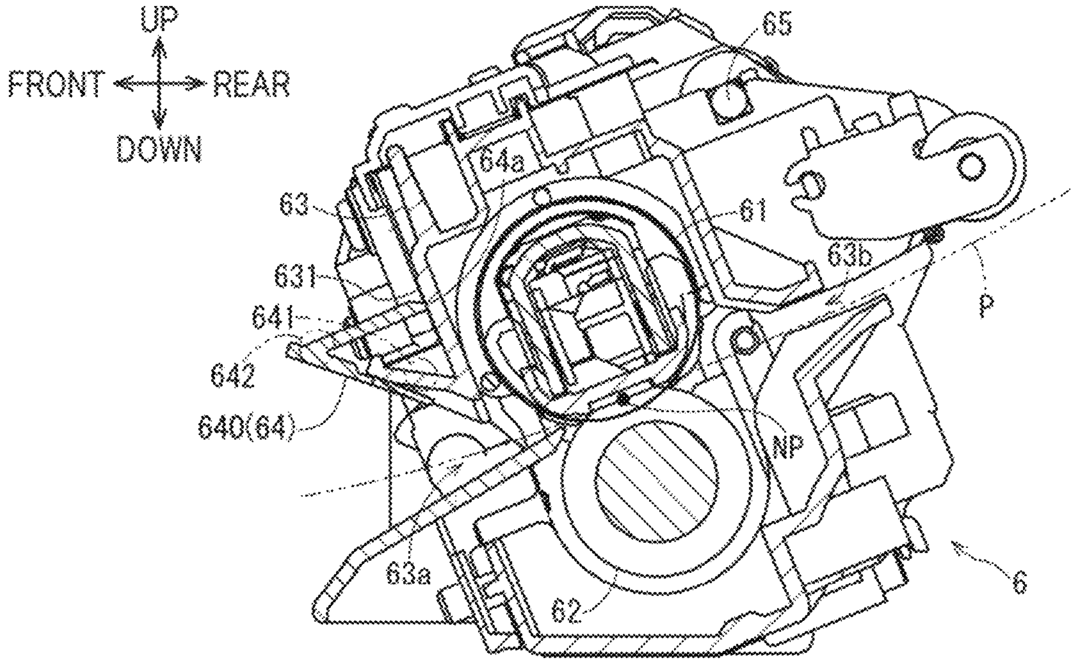
FIG. 7B is a cross-sectional side view of the fixing device in the state where the shutter is at the opening position.
Figure 8A:
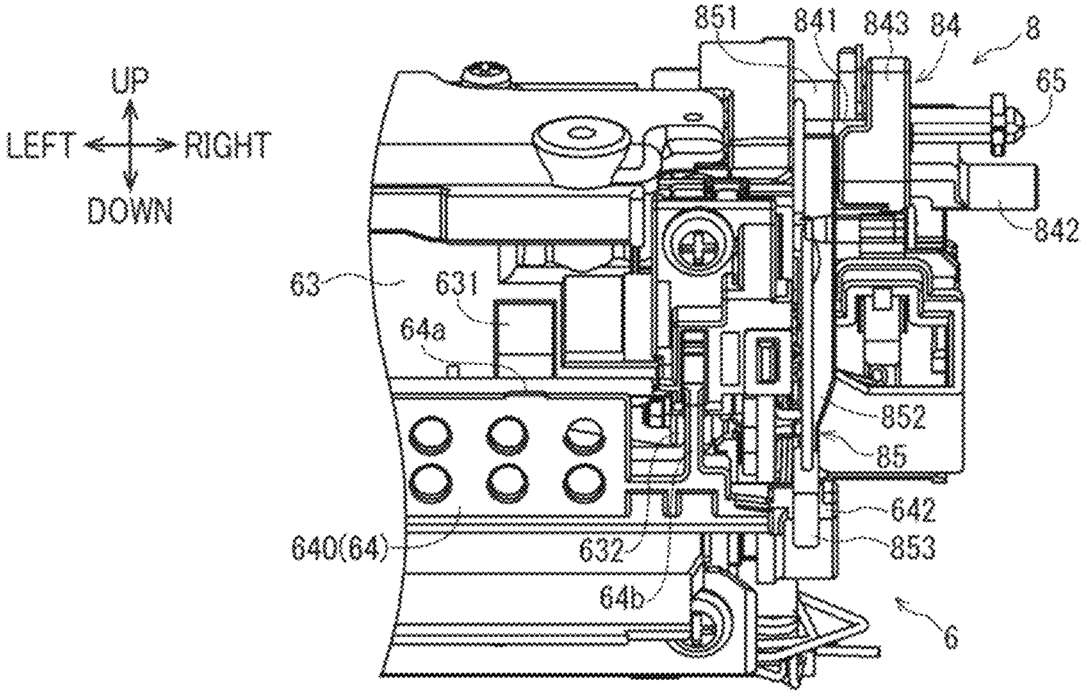
FIG. 8A is a front view of a right end portion of the fixing device in the state where the shutter is at the closing position.
Figure 8B:
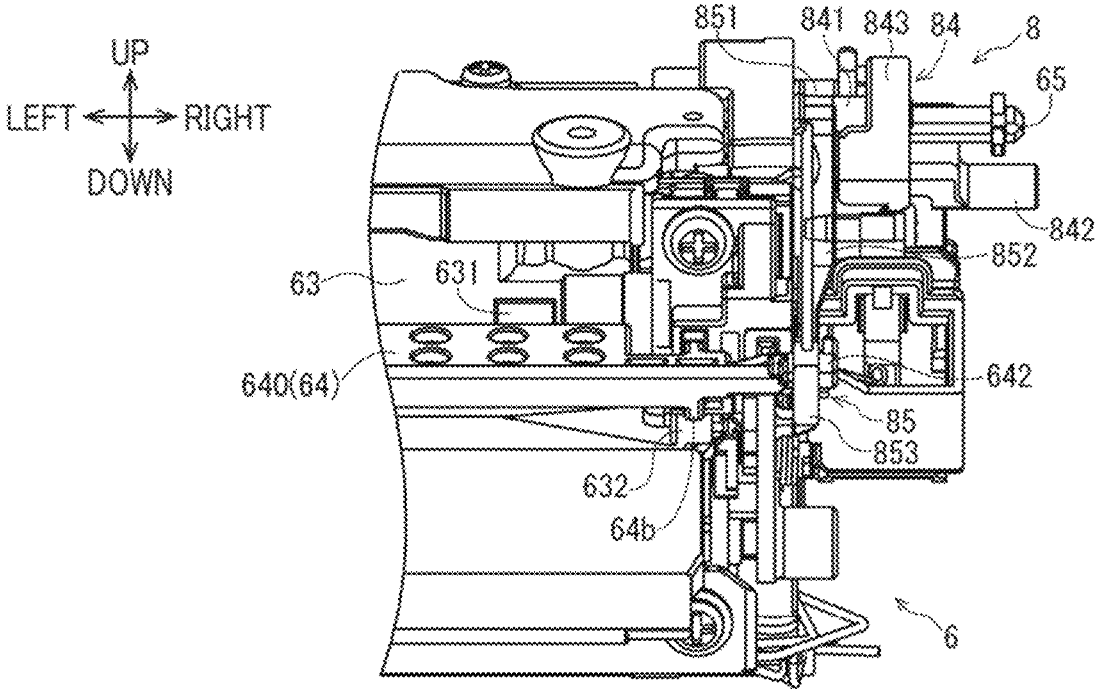
FIG. 8B is a front view of the right end portion of the fixing device in the state where the shutter is at the opening position.

The shutter link 85 is pivotally movable about a pivot axis of the base portion 851 such that the engagement portion 853 is movable in the up-down direction. As the shutter link 85 pivots to move the engagement portion 853 downward, the shutter 64 is moved to the closing position as illustrated in FIGS. 5A and 6A. As the shutter link 85 pivots to move the engagement portion 853 upward, the shutter 64 is moved to the opening position as illustrated in FIGS. 5B and 6B. That is, downward pivoting movement of the shutter link 85 moves the shutter 64 to the closing position, and upward pivoting movement of the shutter link 85 moves the shutter 64 to the opening position.

The engagement pin 854 is provided at a rear end portion of the arm portion 852 (adjacent to the base portion 851) and protrudes rightward therefrom. The engagement pin 854 is inserted in the engagement hole 844 of the third pivot link 84 from its left side.

Figure 34:
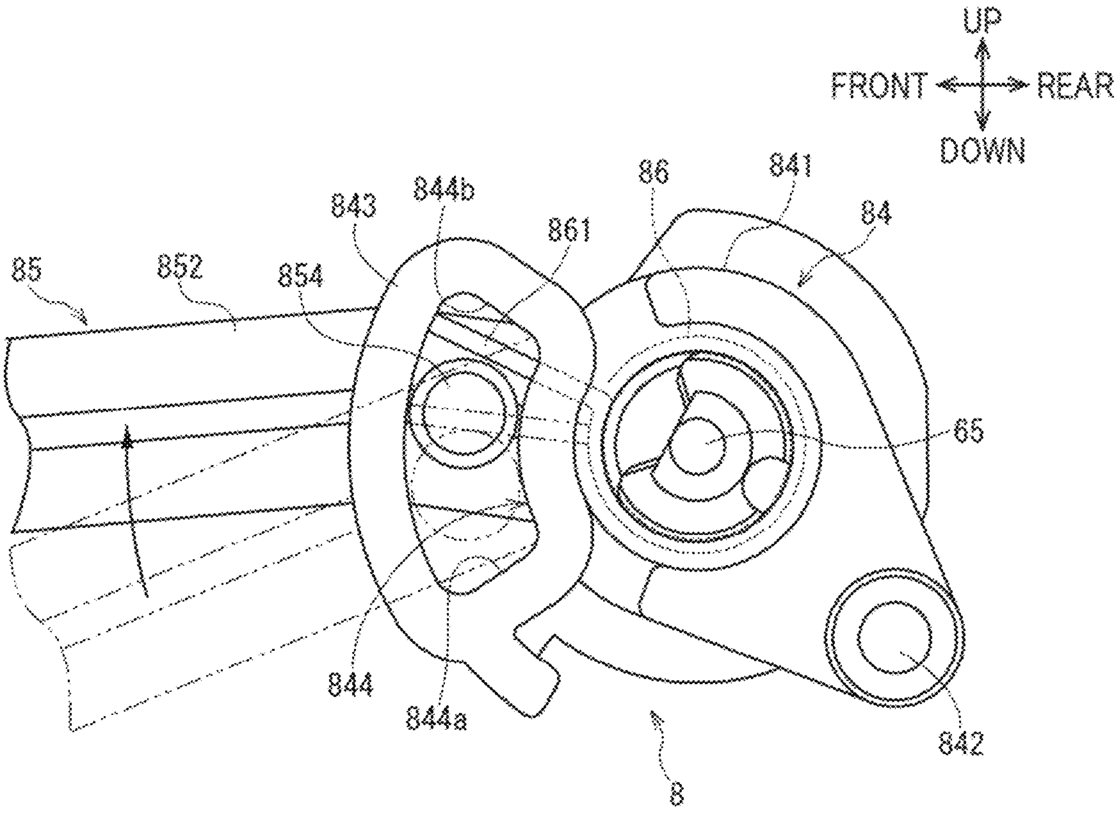
FIG. 34 is a partial side view illustrating a state where a coil arm of a coil spring is resiliently deformed upward when a shutter link is moved in a direction for opening the shutter while the shutter is at the closing position and the link is in a first state.

The coil spring 86 is supported by the base portion 841 of the third pivot link 84 (also see FIG. 34). The coil spring 86 is resiliently deformable and movable in accordance with the movement of the third pivot link 84. The coil spring 86 is an example of a link spring of the disclosure.

The coil spring 86 has a coil arm 861. The coil arm 861 extends through the engagement hole 844 to extend in a direction from the radially inner surface to the radially outer surface of the engagement hole 844.

The coil arm 861 is positioned above the engagement pin 854 in the engagement hole 844. The coil spring 86 is pivotable in accordance with the pivotal movement of the third pivot link 84. The engagement hole 844 has a lower end functioning as an engagement surface 844*a*. The engagement surface 844*a* is positioned below the engagement pin 854. The engagement hole 844 has an upper end 844*b* opposite the engagement surface 844*a* (lower end). The upper end 844*b* is positioned above the coil arm 861. A gap is formed between the upper end 844*b* and the coil arm 861.

The engagement pin 854 is brought into abutment with the engagement surface 844*a* of the engagement hole 844 by the pivotal movement of the third pivot link 84 in a direction for moving the operation cam 843 upward, as illustrated in FIG. 6B. The engagement pin 854 is brought into abutment with the coil arm 861 of the coil spring 86 by the pivotal movement of the third pivot link 84 in a direction for moving the operation cam 843 downward, as illustrated in FIG. 6A.

The shutter link 85 is connected to the third pivot link 84 by the engagement of the engagement pin 854 with the coil arm 861 or with the engagement surface 844*a*. The shutter link 85 is movable in accordance with the pivotal movement of the third pivot link 84, thereby moving the shutter 64 between the closing position and the opening position.

Specifically, in accordance with the pivotal movement of the third pivot link 84 to move the operation cam 843 downward, the shutter link 85 is depressed downward by the coil spring 86 to move the shutter 64 to the closing position. The third pivot link 84 is at a first cam position when the shutter 64 is placed at the closing position (i.e., when the link 8 is in the first state) as a result of the pivotal movement of the third pivot link 84.

In accordance with the pivotal movement of the third pivot link 84 to move the operation cam 843 upward, the shutter link 85 is urged upward by the engagement surface 844*a* of the engagement hole 844 to move the shutter 64 to the opening position. The third pivot link 84 is at a second cam position when the shutter 64 is placed at the opening position (i.e., when the link 8 is in the second state) as a result of the pivotal movement of the third pivot link 84.

In the image-forming apparatus 1, the abutment piece 80 of the link 8 is brought into contact with the drum shaft 54*a* of the process cartridge 50 during the attachment/detachment of the process cartridge 50 relative to the housing 2, so that the abutment piece 80 is caused to move along the abutment piece rail 242. In this way, a driving force is transmitted from the drum shaft 54*a* to the shutter 64 through the link 8 to move the shutter 64 between the closing position and the opening position.

In the present embodiment, the link 8 includes the abutment piece 80, the first pivot link 81, the linear motion link 82, the second pivot link 83, the third pivot link 84, the shutter link 85, and the coil spring 86. As an alternative, the link 8 may be constituted by a single link connected to the shutter 64 and configured to open and close the shutter 64 in response to abutment with the process cartridge 50. The link 8 may move differently from the pivotal/sliding movements as in the described embodiment, provided that the link 8 can function to open and close the shutter 64 in interlocking relation to the attachment and detachment of the process cartridge 50 to and from the housing 2.

<Urging Member 9>

Figure 13A:
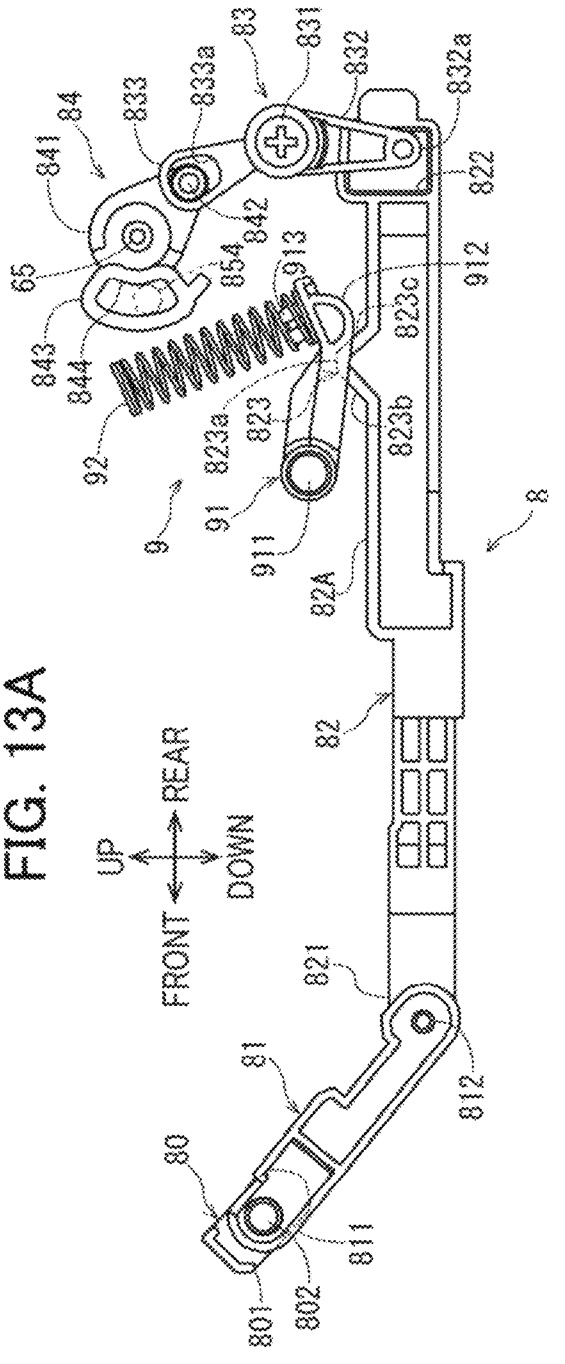
FIG. 13A is a right side view of a link in the image-forming apparatus, and particularly illustrating a state where a first boss of an abutment piece of the link is positioned in an intermediate portion of an abutment piece rail, and a second boss of the abutment piece is positioned in a front portion of the abutment piece rail.
Figure 13B:
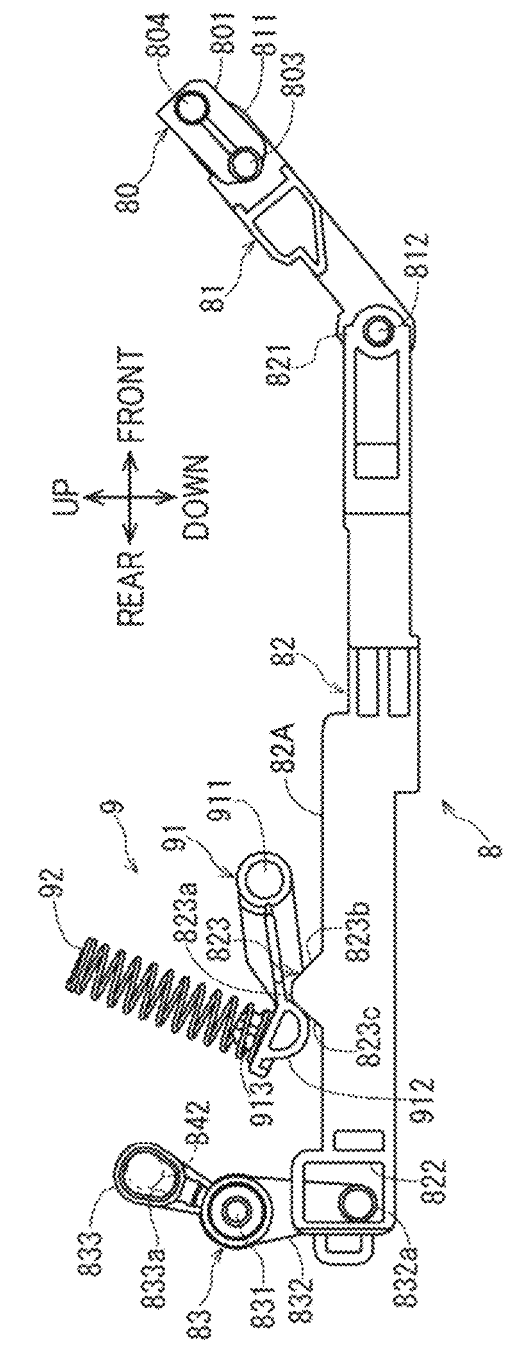
FIG. 13B is a left side view of the link in the state illustrated in FIG. 13A.

An urging member 9 is also provided in the housing 2, as illustrated in FIGS. 13A and 13B. The urging member 9 is configured to urge the link 8 in the direction for opening the shutter 64 (in the direction for moving the shutter 64 to the opening position) before the shutter 64 reaches the opening position in a process for the link 8 to move the shutter 64 from the closing position to the opening position. When the shutter 64 is at the opening position, the urging member 9 urges the linear motion link 82 in the second direction (rearward) toward the second position.

Further, the urging member 9 is configured to urge the link 8 in the direction for closing the shutter 64 (in the direction for moving the shutter 64 to the closing position) before the shutter 64 reaches the closing position in a process for the link 8 to move the shutter 64 from the opening position to the closing position. When the shutter 64 is at the closing position, the urging member 9 urges the linear motion link 82 in the first direction (frontward) toward the first position.

Further, the urging member 9 is configured to urge the link 8 so as to restrict further movement of the link 8, once the link 8 has moved the shutter 64 to the opening position or to the closing position. That is, when the shutter 64 is at the closing position, the urging member 9 urges the shutter 64 (through the link 8) such that the shutter 64 is retained at the closing position. When the shutter 64 is at the opening position, the urging member 9 urges the shutter 64 (through the link 8) such that the shutter 64 is retained at the opening position.

In this way, the urging member 9 is configured urge the link 8 to hold the shutter 64 at the closing position when the shutter 64 is at the closing position, and to hold the shutter 64 at the opening position when the shutter 64 is at the opening position. Hence, the urging member 9, a single member, can not only maintain the shutter 64 at its opening position to stably keep the shutter 64 opened, but also maintain the shutter 64 at its closing position to stably keep the shutter 64 closed. The urging member 9 is an example of an urging member of the disclosure.

The urging member 9 includes an urging spring 92 and a pressure arm 91. The pressure arm 91 is urged by the urging spring 92 and is configured to abut on the linear motion link 82 from above. The urging spring 92 urges a free end portion of the pressure arm 91 toward an upper surface 82A of the linear motion link 82. The urging member 9 can stably urge the linear motion link 82 through the pressure arm 91 that is connected to the urging spring 92. The urging spring 92 is an example of a spring of the urging member of the disclosure. The pressure arm 91 is an example of a pressing portion of the urging member of the disclosure.

The pressure arm 91 includes a base part 911, an abutment part 912, and a fitting part 913. The base part 911 is a base end portion of the pressure arm 91, and is pivotally movably supported by the first main frame 24. The abutment part 912 is the free end portion of the pressure arm 91, and is in abutment with a link protrusion 823 (described later) on the upper surface 82A of the linear motion link 82. The fitting part 913 is fitted with the locking spring 92. The pressure arm 91 extends in the front-rear direction. The base part 911 is at a front portion of the pressure arm 91, and the abutment part 912 is at a rear portion of the pressure arm 91. The fitting part 913 is positioned above the abutment part 912. The abutment part 912 is pivotally movable in the up-down direction about an axis of the base part 911.

The base part 911 is a pivot center of the pressure arm 91. Since the free end portion of the pressure arm 91 is provided with the abutment par 912, the linear motion link 82 can be smoothly urged by the pressure arm 91. The base end portion of the pressure arm 91 (base part 911) is an example of one end portion of the pressing portion of the disclosure. The free end portion of the pressure arm 91 is an example of another end portion of the pressing portion of the disclosure. The abutment part 912 is an example of an abutment part of the disclosure.

The urging spring 92 is supported by the first main frame 24. The urging spring 92 has a lower end portion fitted with the fitting part 913. The urging spring 92 urges the abutment part 912 of the pressure arm 91 downward toward the upper surface 82A of the linear motion link 82. The abutment part 912 is pressed against the link protrusion 823 on the upper surface 82A of the linear motion link 82 from above.

The linear motion link 82 has the link protrusion 823 on the upper surface 82A at a position between the fitting portion 821 and the connection hole 822. The link protrusion 823 protrudes upward from the upper surface 82A toward the urging member 9. In a side view, the link protrusion 823 has a mountain-like shape having a first depressed surface 823*a*, a second depressed surface 823*b*, and a third depressed surface 823*c*.

The third depressed surface 823*c* is a first sloped surface that is inclined with respect to the first direction, which is a moving direction of the linear motion link 82 from the second position to the first position. The second depressed surface 823*b* is a second sloped surface that is inclined with respect to the second direction, which is a moving direction of the linear motion link 82 from the first position toward the second position. The third depressed surface 823*c* and the second depressed surface 823*b* are sloped to extend in different directions from each other. The third depressed surface 823*c* is an example of a first part of the disclosure, and is also an example of a first sloped surface of the disclosure. The second depressed surface 823*b* is an example of a second part of the disclosure, and is also an example of a second sloped surface of the disclosure.

The first depressed surface 823*a* constitutes an apex part of the mountain-like shape of the link protrusion 823. The first depressed surface 823*a* extends in a horizontal direction. The second depressed surface 823*b* is positioned frontward of the first depressed surface 823*a*, and is inclined diagonally upward toward the first depressed surface 823*a*. That is, the second depressed surface 823*b* is inclined diagonally upward toward the rear. In this way, the second depressed surface 823*b* is sloped diagonally upward as extending in the second direction (the moving direction of the linear motion link 82 toward the second position from the first position). The second depressed surface 823*b* has a rear end connected to a front end of the first depressed surface 823*a*.

The third depressed surface 823*c* is positioned rearward of the first depressed surface 823*a*, and is inclined diagonally downward as extending away from the first depressed surface 823*a*. That is, the third depressed surface 823*c* is inclined diagonally downward toward the rear. In this way, the third depressed surface 823*c* is sloped diagonally upward as extending in the first direction (the moving direction of the linear motion link 82 toward the first position from the second position). The third depressed surface 823*c* has a front end connected to a rear end of the first depressed surface 823*a*. The third depressed surface 823*c* is positioned opposite the second depressed surface 823*b* with respect to the first depressed surface 823*a* in the front-rear direction.

The linear motion link 82 is movable in the front-rear direction to move the abutment part 912 of the pressure arm 91 among three different positions relative to the link protrusion 823: the abutment part 912 is on the first depressed surface 823*a* to press the same; the abutment part 912 is on the second depressed surface 823*b* to press the same; and the abutment part 912 is on the third depressed surface 823*c* to press the same. The pressure arm 91 abuts on the third depressed surface 823*c* when the linear motion link 82 is at the first position (for closing the shutter 64), and the pressure arm 91 abuts on the second depressed surface 823*b* when the linear motion link 82 is at the second position (for opening the shutter 64).

The first depressed surface 823*a* is a flat surface extending in the horizontal direction. As such, while the pressure arm 91 presses the first depressed surface 823*a* from above, the pressing force from the pressure arm 91 neither acts rearward (i.e., in the second direction for moving the linear motion link 82 toward the second position) nor frontward (i.e., in the first direction for moving the linear motion link 82 toward the first position).

The second depressed surface 823*b* is inclined diagonally upward toward the rear. As such, while the pressure arm 91 presses the second depressed surface 823*b* from above, the pressing force from the pressure arm 91 acts rearward, i.e., in the second direction for moving the linear motion link 82 toward the second position. In a state where the pressure arm 91 abuts on the second depressed surface 823*b*, the second depressed surface 823*b* converts the downward urging force of the urging spring 92 into a second force acting in the second direction for moving the linear motion link 82 from the first position toward the second position. Further, in the state where the pressure arm 91 presses the second depressed surface 823*b* from above, the abutment part 912 of the pressure arm 91 is engaged with the second depressed surface 823*b*, thereby restricting the linear motion link 82 from moving frontward.

The third depressed surface 823*c* is inclined diagonally downward toward the rear. As such, while the pressure arm 91 presses the third depressed surface 823*c* from above, the pressing force from the pressure arm 91 acts frontward. i.e., in the first direction for moving the linear motion link 82 toward the first position. In a state where the pressure arm 91 abuts on the third depressed surface 823*c*, the third depressed surface 823*c* converts the downward urging force of the urging spring 92 into a first force acting in the first direction for moving the linear motion link 82 from the second position toward the first position. Further, in the state where the pressure arm 91 presses the third depressed surface 823*c* from above, the abutment part 912 of the pressure arm 91 is engaged with the third depressed surface 823*c*, thereby restricting the linear motion link 82 from moving rearward.

With this structure, since the linear motion link 82 has the second depressed surface 823*b* and the third depressed surface 823*c*, by using the urging force of the urging spring 92 (a single component), the shutter 64 can be stably maintained at its closing position and at its opening position, so that the shutter 64 can be stably kept closed and opened.

Further, both the second depressed surface 823*b* and the third depressed surface 823*c* are inclined relative to respective moving directions (first and second directions) of the linear motion link 82. The second depressed surface 823*b* and the third depressed surface 823*c* can be easily formed on the linear motion link 82.

Further, the second depressed surface 823*b* is inclined to slope diagonally upward as extending further in the second direction (in the moving direction of the linear motion link 82 from the first position toward the second position). The third depressed surface 823*c* is inclined to slope diagonally upward as extending further in the first direction (in the moving direction of the linear motion link 82 from the second position toward the first position). With this configuration, the urging force of the urging spring 92 acting downward can be efficiently converted into the second force acting in the second direction for moving the linear motion link 82 from the first position toward the second position, as well as into the first force acting in the first direction for moving the linear motion link 82 from the second position toward the first position.

Further, in response to the movement of the linear motion link 82 in the front-rear direction, the pressure arm 91 can switch in state between a state where the pressure arm 91 presses the second depressed surface 823*b* and a state where the pressure arm 91 presses the third depressed surface 823*c*. In other words, the link 8 functions as a switching mechanism configured to switch the urging direction of the urging member 9 between a first urging direction for maintaining the closing position of the shutter 64 and a second urging direction for maintaining the opening position of the shutter 64. Thus, with the aid of the link 8 as the switching mechanism and the urging member 9, the shutter 64 at its opening position can be stably retained to keep the shutter 64 open, and the shutter 64 at its closing position can be stably retained to keep the shutter 64 closed.

The link 8 is employed as the switching mechanism of the disclosure for switching the urging direction of the urging member 9 that urges the link 8. With this structure, both opening/closing of the shutter 64 and retention of the shutter 64 at the closing and opening positions can be attained by a common structure, i.e., by the link 8 and the urging member 9 in combination.

<Operations of Link 8>

Hereinafter, operations of the link 8 will be described.

(Operations for Attachment of the Process Cartridge 5)

Firstly, operations of the link 8 at the time of attachment of the process cartridge 50 to the housing 2 will be described.

Figure 14:
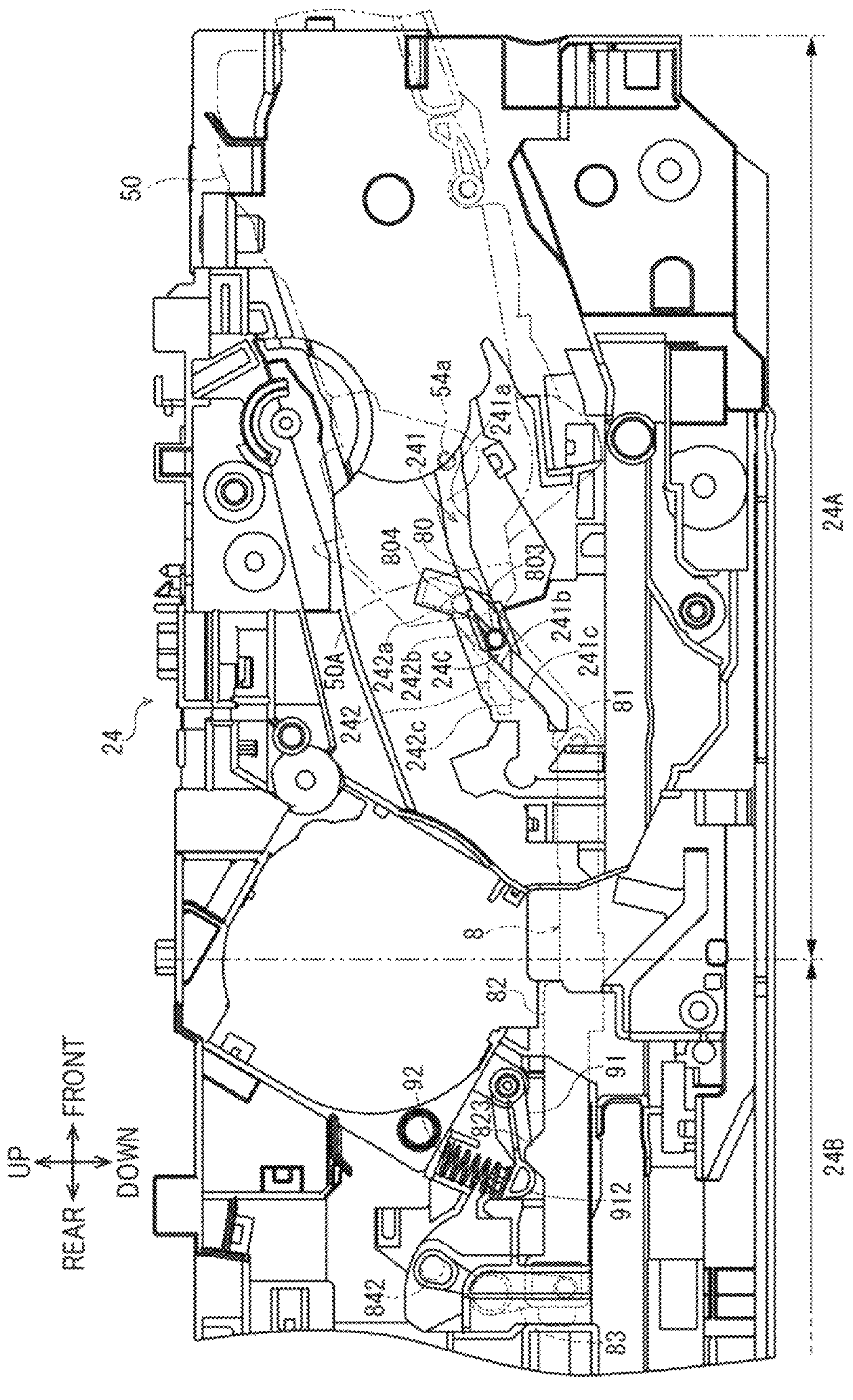
FIG. 14 is a side view of the first main frame, and particularly illustrating a state where the process cartridge is at its attachment starting position, the first boss is positioned in the intermediate portion of the abutment piece rail, and the second boss is positioned in the front portion of the abutment piece rail.

Referring to FIGS. 13A through 14, in a state prior to attachment of the process cartridge 50 to the housing 2 where the process cartridge 50 is detached from the housing 2, and in a state where the process cartridge 50 is at an attachment starting position illustrated in FIG. 14 (in a state where a leading end 50A of the process cartridge 50 in an inserting direction thereof is inserted in the housing 2), the drum shaft 54*a* is positioned frontward of and away from the abutment piece 80, and the abutment piece 80 is positioned to extend over the front portion 242*a* and the intermediate portion 242*b* of the abutment piece rail 242.

Specifically, at this time, the abutment piece 80 is fitted with the abutment piece rail 242 such that the first boss 803 is positioned in the intermediate portion 242*b* (the through-hole 24C) of the abutment piece rail 242 and the second boss 804 is positioned in the front portion 242*a* of the abutment piece rail 242. Here, the inserting direction of the process cartridge 50 is coincident with the attachment direction of the process cartridge 50.

In the state where the abutment piece 80 is at the position illustrated in FIG. 14, the shutter 64 has been moved by the link 8 to be placed at the closing position (illustrated in FIG. 6A). With this structure, even if the user inadvertently inserts his hand into housing 2 through the opening 2A in the state where the process cartridge 50 is detached from the housing 2, the shutter 64 can block the user's hand from touching the heating unit 61 of the fixing device 6.

Further, in the state where the abutment piece 80 is at the position illustrated in FIG. 14, the abutment part 912 of the pressure arm 91 is in abutment with the third depressed surface 823*c* of the linear motion link 82 (illustrated in FIG. 13), thereby restricting the linear motion link 82 from moving rearward. That is, the linear motion link 82, which has been moved to the closing position by the urging force of the urging member 9, is fixed in position at the closing position by the urging member 9. With this structure, the shutter 64 is restricted from moving unexpectedly from the closing position to the opening position, and the shutter 64 can be securely maintained at the closing position.

Further, the abutment piece rail 242 formed in the front frame 24A for guiding the abutment piece 80 is positioned outward of the cartridge rail 241 in the left-right direction, and the first boss 803 and the second boss 804 of the abutment piece 80 are so positioned not to protrude further inward toward the process cartridge 50 relative to the front frame 24A in the left-right direction. This structure can restrain the user's hand from touching the abutment piece 80 in the state where the process cartridge 50 is detached from the housing 2, thereby suppressing accidental opening of the shutter 64 due to unexpected movement of the link 8.

Figure 16:
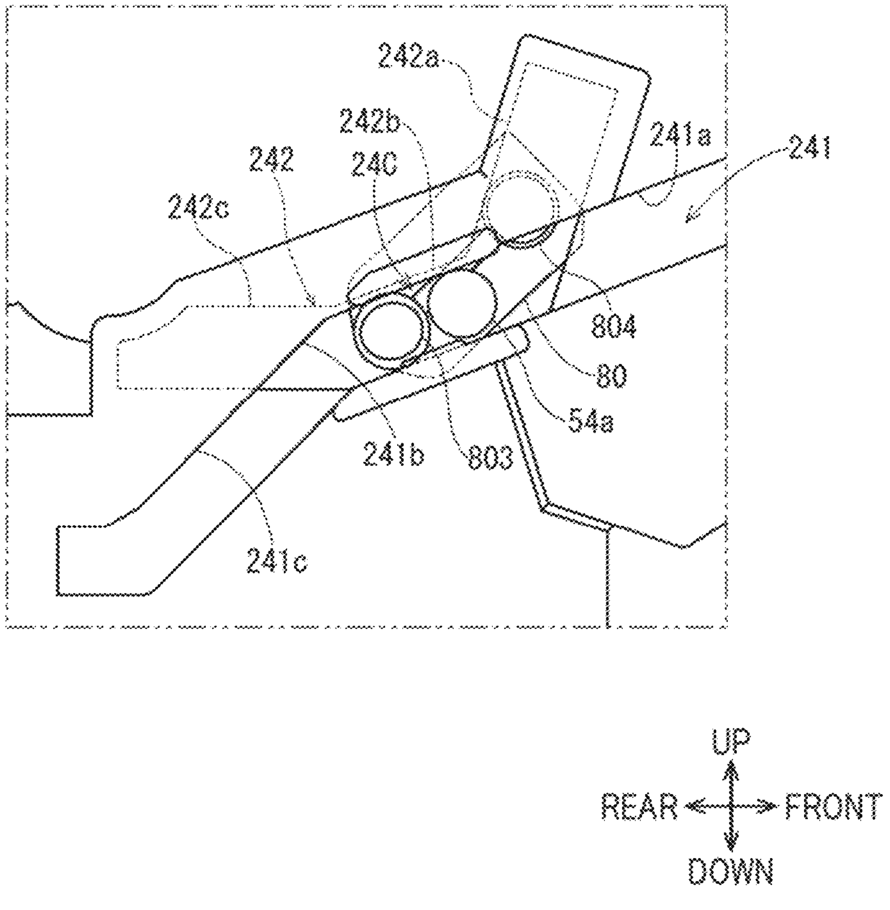
FIG. 16 is an enlarged side view of the first main frame, and particularly illustrating a state where a drum shaft of the process cartridge having reached an intermediate portion of a cartridge rail abuts on the first boss of the abutment piece.
Figures 17A, 17B:
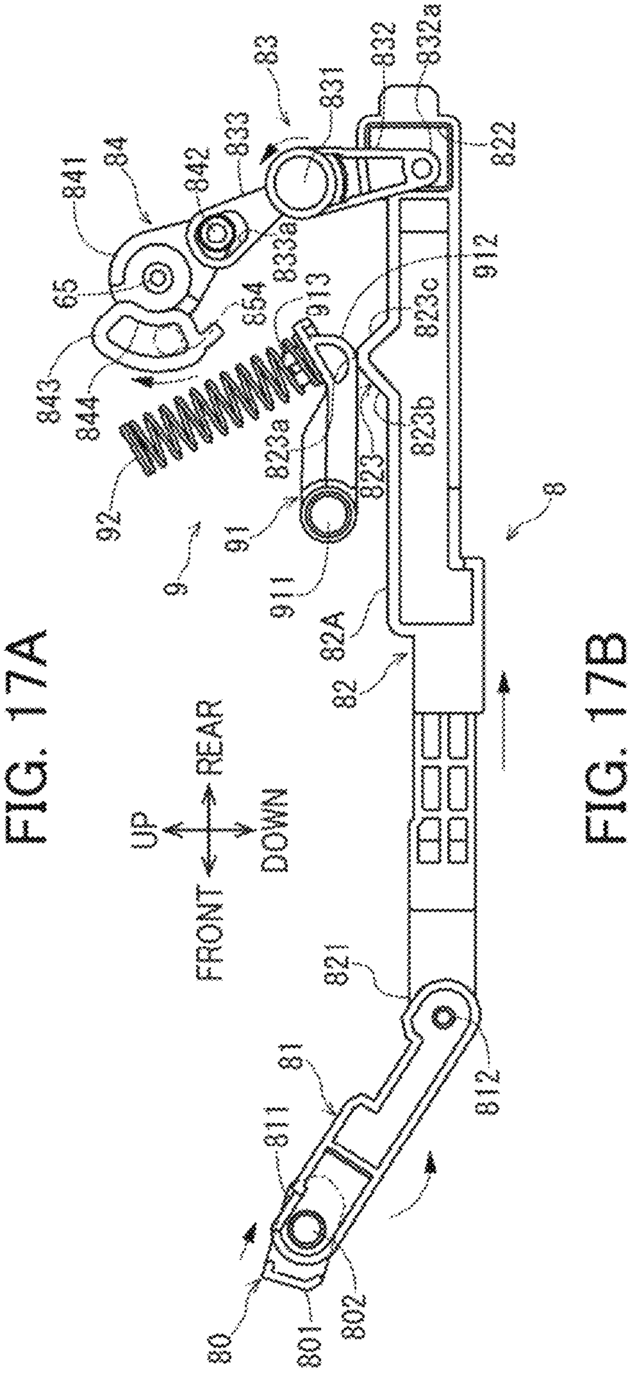
FIG. 17A is a right side view of the link, and particularly illustrating a state where the drum shaft abuts on the abutment piece, a rear part of the first boss of the abutment piece is positioned in a rear portion of the abutment piece rail, and the second boss is positioned in the intermediate portion of the abutment piece rail.
FIG. 17B is a left side view of the link in the state illustrated in FIG. 17A.

As the process cartridge 50 at the attachment starting position is further inserted in the attachment direction toward the attachment position, the drum shaft 54*a* enters the front portion 241*a* of the cartridge rail 241 and moves along the cartridge rail 241. As illustrated in FIG. 16, when the drum shaft 54*a* moving along the cartridge rail 241 enters the intermediate portion 241*b* (the through-hole 24C), the drum shaft 54*a* abuts on the first boss 803 of the abutment piece 80.

As illustrated in FIGS. 17A through 19, when being abutted by the drum shaft 54*a* that is moving in the intermediate portion 241*b* (the through-hole 24C) of the cartridge rail 241, the abutment piece 80 is depressed by the drum shaft 54*a* and is moved toward downstream in the attachment direction of the process cartridge 50, i.e., toward the rear.

While the abutment piece 80 is being moved by the drum shaft 54*a* that is moving in the intermediate portion 241*b* (through-hole 24C), the first boss 803 is positioned such that: a rear part of the first boss 803 is positioned in the rear portion 242*c* of the abutment piece rail 242; and a remaining part of the first boss 803 is positioned in the intermediate portion 242*b* (the through-hole 24C) of the abutment piece rail 242. Further, the second boss 804 is positioned in the intermediate portion 242*b* (through-hole 24C) of the abutment piece rail 242.

In accordance with the movement of the abutment piece 80, the first pivot link 81 connected to the abutment piece 80 is pivotally moved downward to reduce an inclination angle of the first pivot link 81 with respect to the horizontal direction (see FIGS. 17A and 17B), and is moved rearward. In response to the pivotal movement and rearward movement of the first pivot link 81, the linear motion link 82 connected to the first pivot link 81 is linearly moved rearward.

In response to the rearward movement of the linear motion link 82, the connection hole 822 of the linear motion link 82 is brought into engagement with the engagement pin 832*a* of the second pivot link 83, thereby pivotally moving the second pivot link 83 about the axis of the base support portion 831 such that the engagement pin 832*a* is moved rearward. In response to the pivotal movement of the second pivot link 83, the connection hole 833*a* of the second pivot link 83 is brought into engagement with the engagement pin 842 of the third pivot link 84, thereby pivotally moving the third pivot link 84 about the support shaft 65 such that the engagement pin 842 is moved frontward.

In accordance with the rearward movement of the linear motion link 82, the abutment part 912 of the pressure arm 91 of the urging member 9 climbs up the third depressed surface 823*c* of the link protrusion 823 against the urging force of the urging spring 92 and moves onto the first depressed surface 823*a* from the third depressed surface 823*c*. That is, the pressure arm 91 abuts on the first depressed surface 823*a* after abutting on the third depressed surface 823*c* in the process for attaching the process cartridge 50 to the housing 2. In a state where the pressure arm 91 is in abutment with the first depressed surface 823*a* which is a horizontal plane, the urging member 9 does not restrict the shutter 64 from moving from the closing position to the opening position.

With this structure, in the process for attaching the process cartridge 50 to the housing 2, the linear motion link 82 moves rearward (in the second direction) against the pressing force of the pressure arm 91. As a result of the rearward movement of the linear motion link 82, the shutter 64, which has been held at the closing position, is now ready to shift into the opening position from the closing position. That is, the shutter 64 is now switchable in state from the closing state to the opening state.

Figure 18:
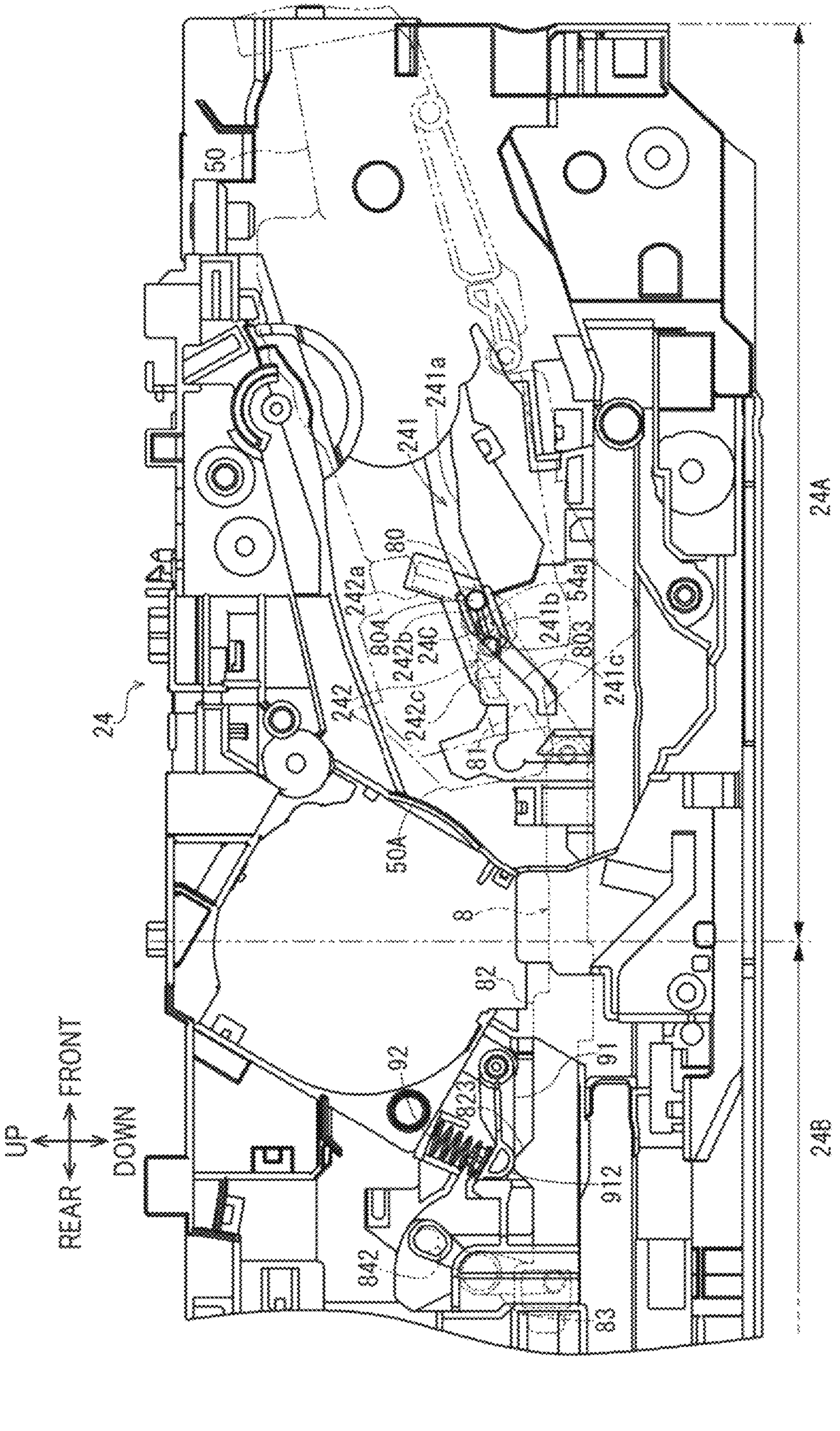
FIG. 18 is a side view of the first main frame, and particularly illustrating the state where the drum shaft abuts on the abutment piece, the rear part of the first boss is positioned in the rear portion of the abutment piece rail, and the second boss is positioned in the intermediate portion of the abutment piece rail.
Figure 19:
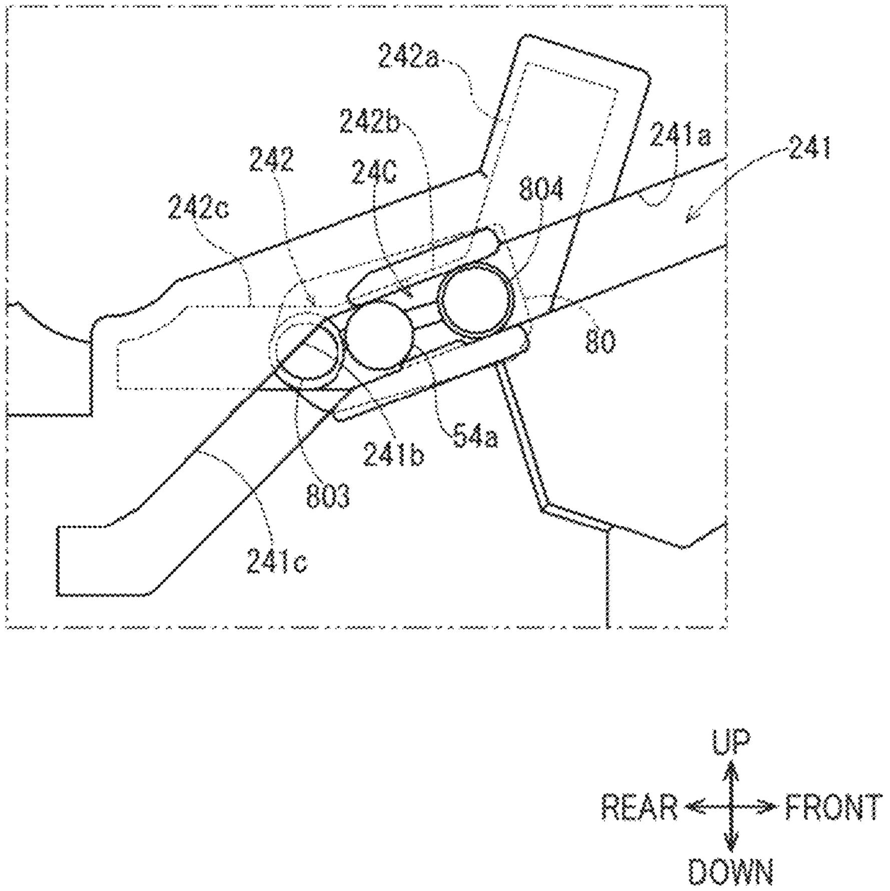
FIG. 19 is an enlarged side view of the first main frame, and particularly illustrating the state where the drum shaft abuts on the abutment piece, the rear part of the first boss is positioned in the rear portion of the abutment piece rail, and the second boss is positioned in the intermediate portion of the abutment piece rail.
Figure 21:
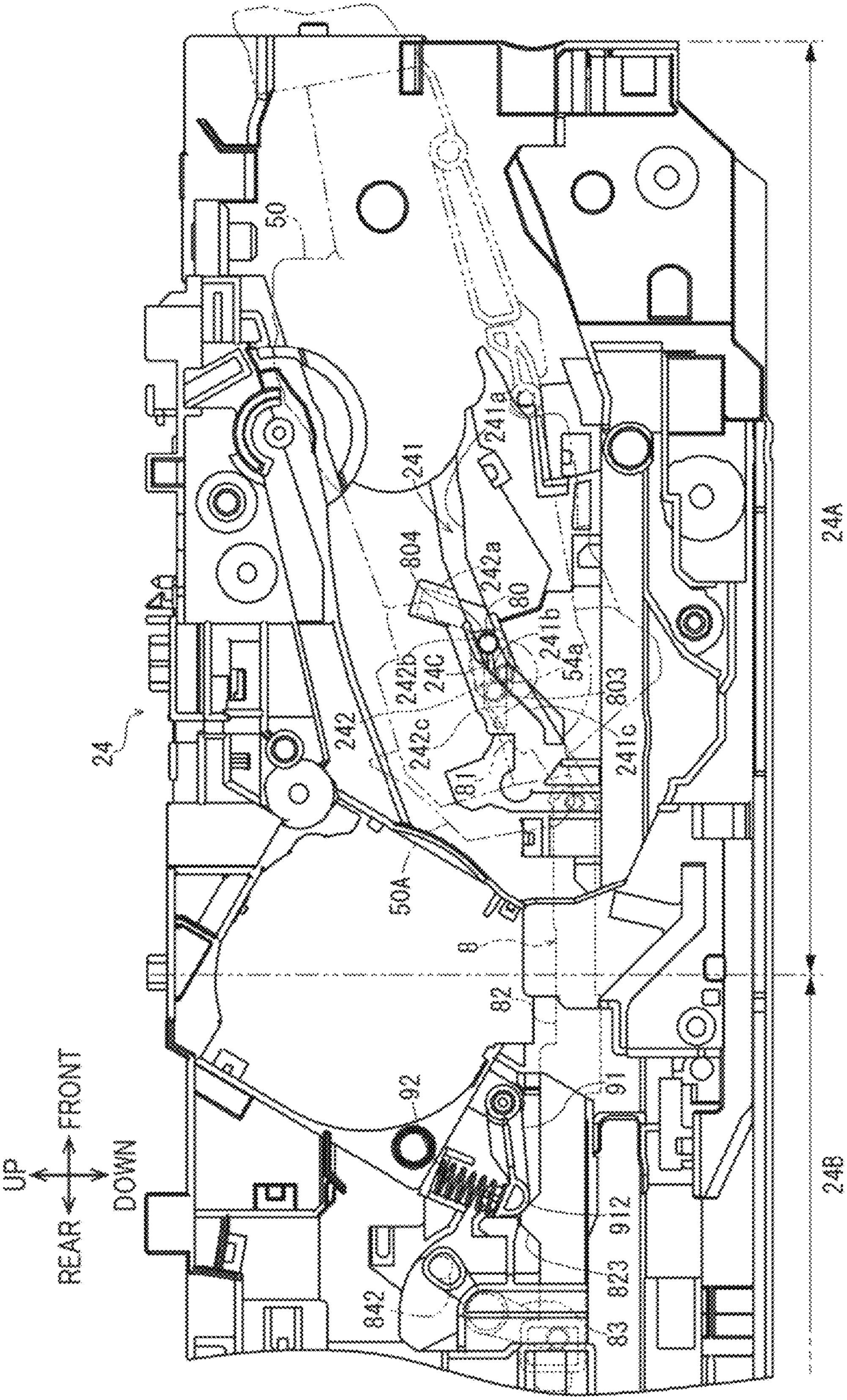
FIG. 21 is a side view of the first main frame, and particularly illustrating the state where the drum shaft abuts on the abutment piece, the first boss is positioned in the rear portion of the abutment piece rail, and the second boss is positioned in the intermediate portion of the abutment piece rail.

As the process cartridge 50 is further inserted toward the attachment position from the position illustrated in FIG. 18, the abutment piece 80 is further moved toward downstream in the attachment direction by the drum shaft 54*a* that is moving along the intermediate portion 241*b* (the through-hole 24C) of the cartridge rail 241, as illustrated in FIG. 21. At this time, as illustrated in FIG. 21, the first boss 803 of the abutment piece 80 is positioned in the rear portion 242*c* of the abutment piece rail 242, and the second boss 804 of the abutment piece 80 is positioned in the intermediate portion 242*b* (the through-hole 24C) of the abutment piece rail 242.

Figure 22:
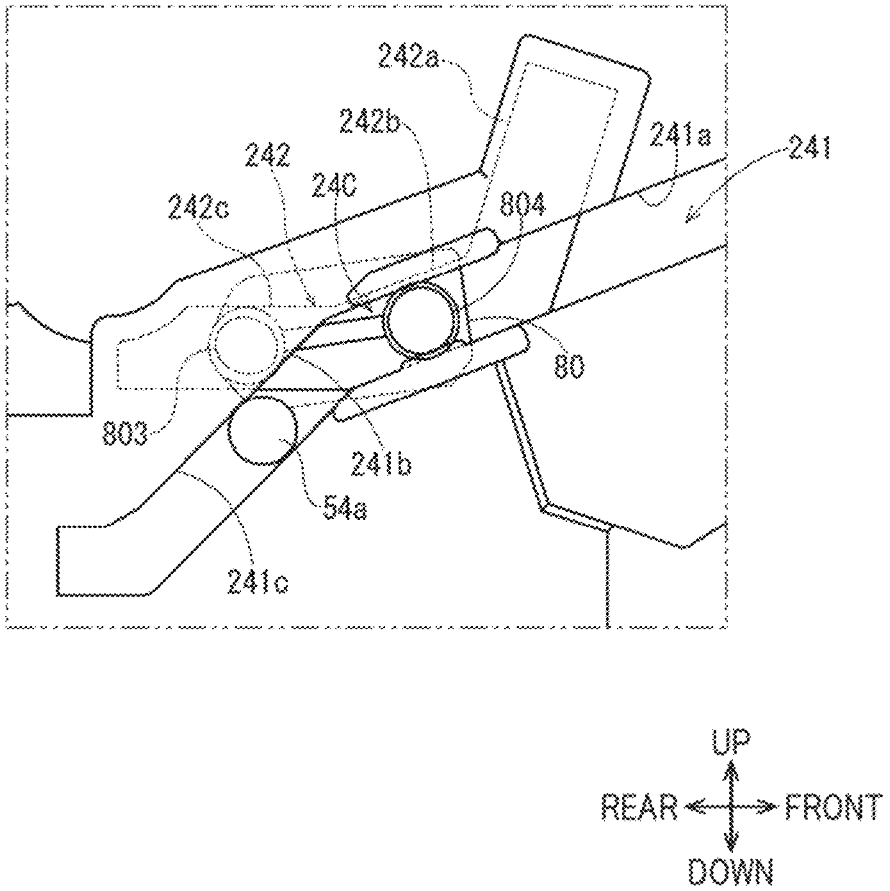
FIG. 22 is an enlarged side view of the first main frame, and particularly illustrating a state where the drum shaft has moved from the intermediate portion to a rear portion of the cartridge rail and is separated away from the abutment piece.

As illustrated in FIG. 22, the drum shaft 54*a* has now moved into the rear portion 241*c* from the intermediate portion 241*b* in the cartridge rail 241, after pushing and moving the first boss 803 into the rear portion 242*c* of the abutment piece rail 242. Hence, the drum shaft 54*a* is now separated from the abutment piece 80.

Figure 20A:
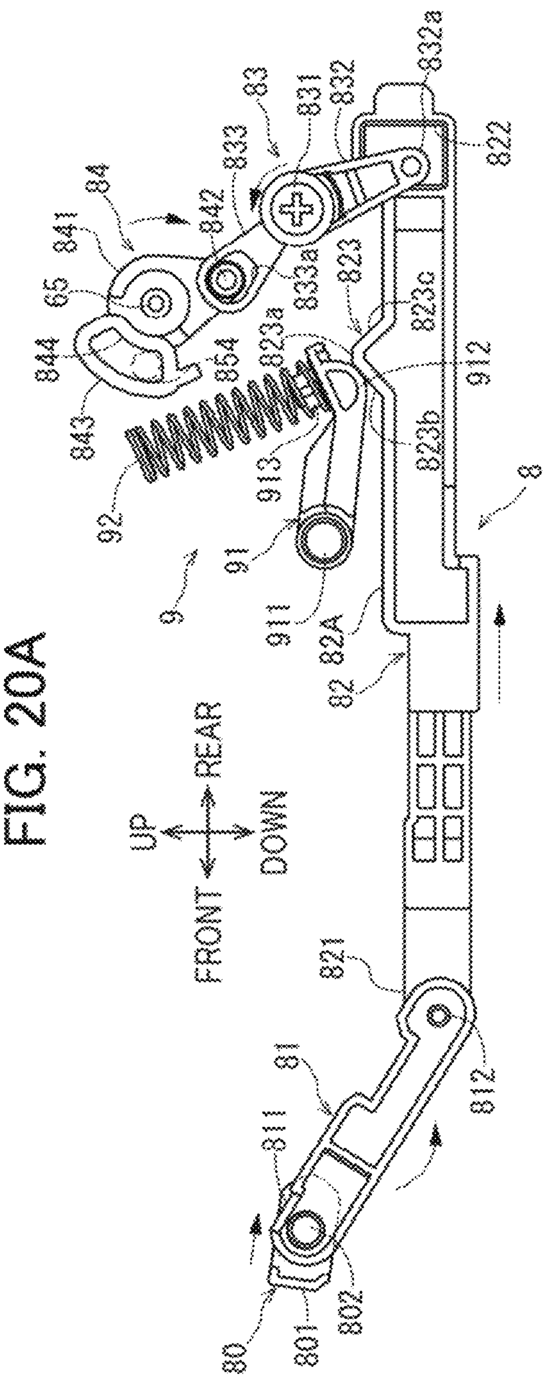
FIG. 20A is a right side view of the link, and particularly illustrating a state where the drum shaft abuts on the abutment piece, the first boss is positioned in the rear portion of the abutment piece rail, and the second boss is positioned in the intermediate portion of the abutment piece rail.
Figure 20B:
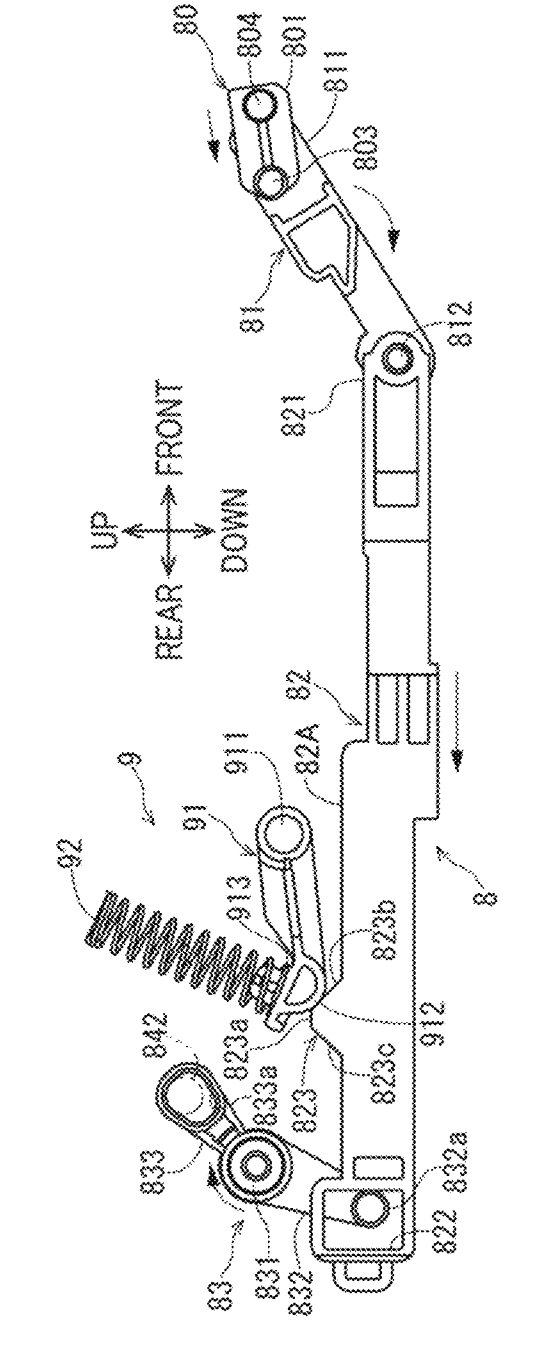
FIG. 20B is a left side view of the link in the state illustrated in FIG. 20A.

In accordance with the movement of the abutment piece 80, the first pivot link 81 is pivotally moved downward to further reduce the inclination angle of the first pivot link 81 with respect to the horizontal direction, and at the same time the first pivot link 81 is moved further rearward, as illustrated in FIGS. 20A and 20B. In response to the pivotal movement and rearward movement of the first pivot link 81, the linear motion link 82 is further linearly moved rearward. In response to the rearward movement of the linear motion link 82, the second pivot link 83 is further pivotally moved such that the engagement pin 832*a* is moved rearward. In response to the pivotal movement of the second pivot link 83, the third pivot link 84 is further pivotally moved such that the engagement pin 842 is moved frontward.

In response to the pivotal movement of the third pivot link 84, the engagement surface 844*a* of the engagement hole 844 in the operation cam 843 is brought into engagement with the engagement pin 854 of the shutter link 85 from below. Due to the engagement of the engagement surface 844*a* with the engagement pin 854, the shutter link 85 is pivotally moved in such a direction that the engagement portion 853 is moved upward, thereby moving the shutter 64 from the closing position toward the opening position.

In this case, since the movement of the abutment piece 80 attributed to the movement of the drum shaft 54*a* is transmitted to the linear motion link 82 through the first pivot link 81, the driving force can be efficiently transmitted from the abutment piece 80 to the shutter 64 even if the process cartridge 50 at the attachment position in the housing 2 is apart from the shutter 64.

When the drum shaft 54*a* moves the abutment piece 80 until the first boss 803 reaches the rear portion 242*c* of the abutment piece rail 242, as illustrated in FIG. 22, the linear motion link 82 moves further rearward, which then causes the abutment part 912 of the pressure arm 91 of the urging member 9 to move from the first depressed surface 823*a* to the second depressed surface 823*b* of the linear motion link 82 due to the urging force of the urging spring 92 (see FIGS. 20A and 20B).

Here, in a state where the abutment piece 80 has moved until the first boss 803 is in the rear portion 242*c* of the abutment piece rail 242, the position of the abutment part 912 of the pressure arm 91 on the second depressed surface 823*b* (at which position the abutment part 912 abuts on the second depressed surface 823*b*) is subject to a dimensional tolerance of each component constituting the link 8 and a tolerance in connecting position between the components.

In this connection, a positional relationship between the pressure arm 91 and the link 8 is so designed that the abutment part 912 of the pressure arm 91 abuts on the second depressed surface 823*b* without fail in the state where the abutment piece 80 has moved to such a position that the first boss 803 is located in the rear portion 242*c* of the abutment piece rail 242. Further, within the dimensional tolerance of each component constituting the link 8, the pressure arm 91 and the link 8 are so designed that the abutment part 912 does not contact a flat part of the upper surface 82A of the linear motion link 82 even in a case where the abutment part 912 abuts on the second depressed surface 823*b* at a lowermost end thereof, the flat part being positioned frontward of the second depressed surface 823*b*.

After the abutment part 912 abuts on the second depressed surface 823*b* (after the abutment piece 80 has moved until the first boss 803 reaches the rear portion 242*c* of the abutment piece rail 242), the drum shaft 54*a* no longer moves the abutment piece 80 since the drum shaft 54*a* is separated away from the first boss 803 of the abutment piece 80. However, since the abutment part 912 is in abutment with the second depressed surface 823*b* as illustrated in FIGS. 23A and 23B, the pressing force from the pressure arm 91 is applied to the linear motion link 82 in a direction urging the linear motion link 82 toward the second position, thereby causing the linear motion link 82 to move rearward.

As illustrated in FIG. 6B, in accordance with the rearward movement of the linear motion link 82 due to the pressing force applied from the pressure arm 91, the shutter link 85 is pivotally moved in such a direction that the engagement portion 853 is moved upward, thereby moving the shutter 64 to the opening position.

Figure 23A:
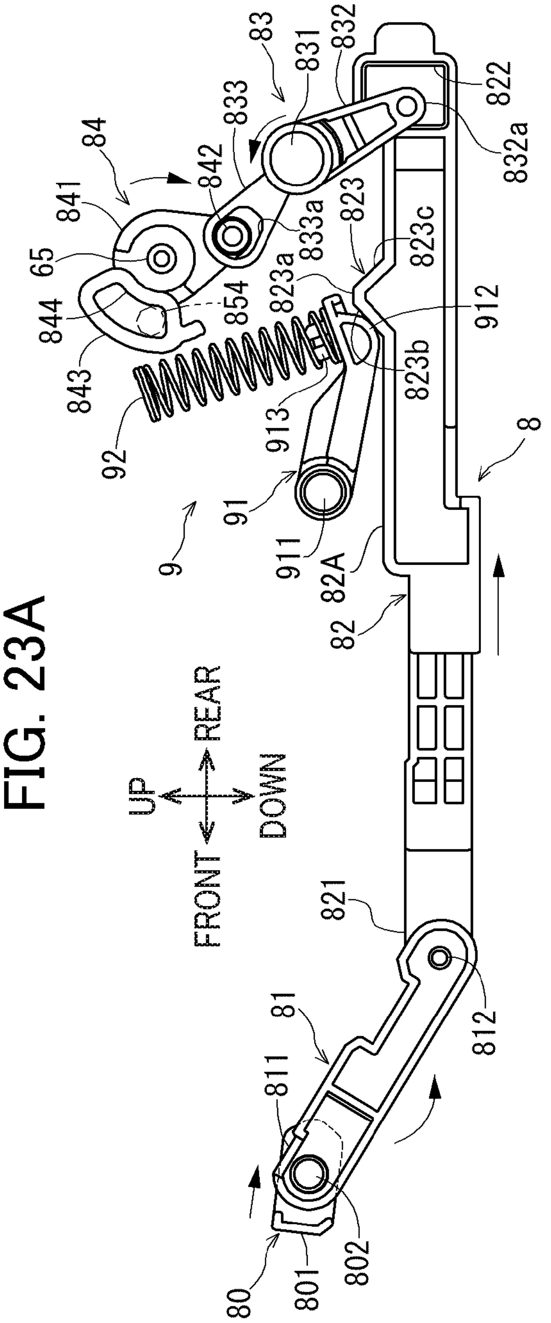
FIG. 23A is a right side view of the link, and particularly illustrating a state where a linear motion link is moved rearward by a pressing force of a pressure arm from the position illustrated in FIG. 19.
Figure 23B:
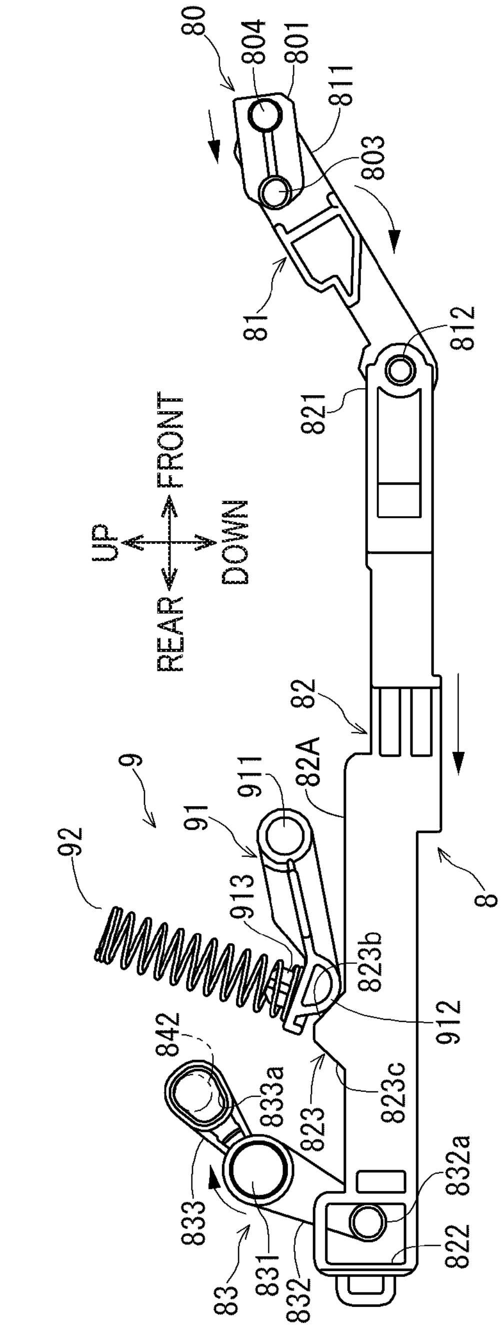
FIG. 23B is a left side view of the link in state illustrated in FIG. 23A.

Here, the pressure arm 91 and the link 8 are so designed that the abutment part 912 of the pressure arm 91 does not contact the flat part of the upper surface 82A positioned frontward of the second depressed surface 823*b* even in a case where the linear motion link 82 has been moved rearward by the pressing force of the pressure arm 91 until the shutter 64 is moved to the opening position (see FIGS. 23A and 23B). With this structure, the shutter 64 can be maintained at its opening position by the pressing force from the pressure arm 91.

Figure 24:
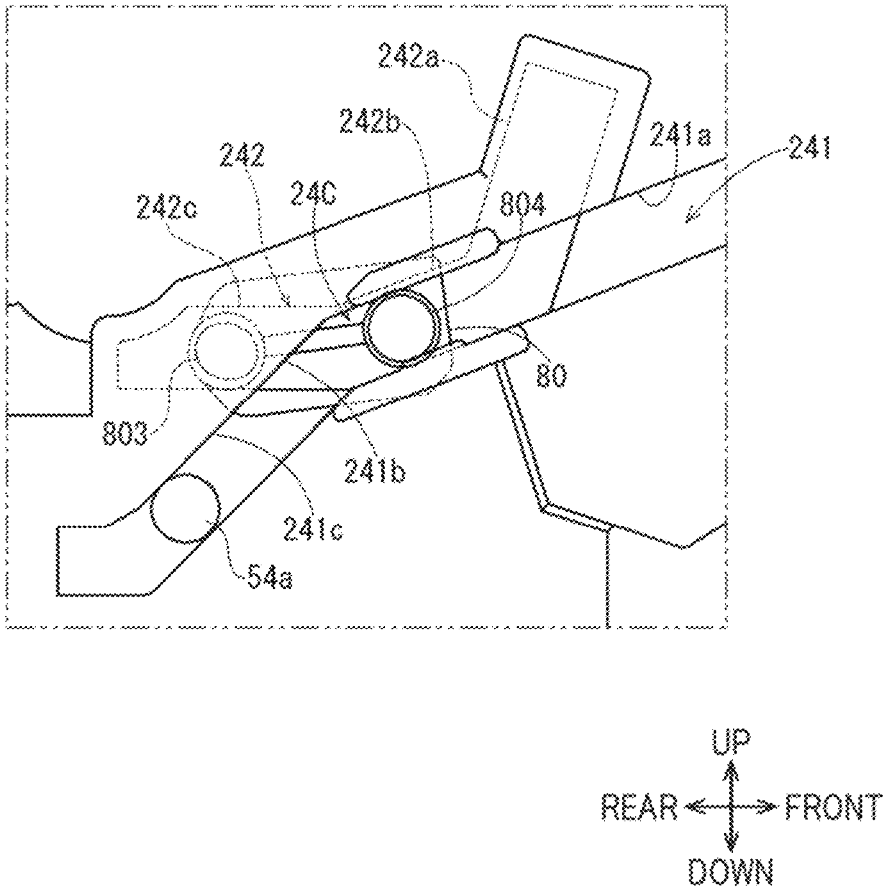
FIG. 24 is an enlarged side view of the first main frame, and particularly illustrating a state where the first boss of the abutment piece has moved rearward from the position illustrated in FIG. 21.

Further, as the linear motion link 82 moves rearward by the pressing force applied from the pressure arm 91, the abutment piece 80 is pulled by the first pivot link 81 to be moved rearward, so that the first boss 803 of the abutment piece 80 moves from the position illustrated in FIG. 22 to the position illustrated in FIG. 24 along the rear portion 242*c* of the abutment piece rail 242.

When the shutter 64 has moved to the opening position, the abutment end part 64*a* of the shutter 64 abuts on the abutment surface 631 of the fixing frame 63, thereby restricting further pivoting of the shutter 64 and terminating further movement of the link 8. Since the further movement of the shutter 64 is restricted due to the abutment with the abutment surface 631, the shutter 64 can be maintained at the opening position. Further, since the movement of the link 8 is also terminated, a movable range of the link 8 can be set smaller.

Further, in a state where the pressure arm 91 is in abutment with the second depressed surface 823*b*, the abutment part 912 of the pressure arm 91 is engaged with the second depressed surface 823*b* to restrict the linear motion link 82 from moving frontward. The linear motion link 82 is thus fixed in position by the urging member 9 in a state where the shutter 64 is at the opening position, thereby restraining the shutter 64 from unexpectedly moving from the opening position toward the closing position.

In this way, the image forming apparatus 1 is so configured that: the abutment piece 80 is contacted by the drum shaft 54*a* of the process cartridge 50 that is being attached to the housing 2, and is moved by the drum shaft 54*a* to move the shutter 64 from the closing position toward the opening position; the abutment piece 80 is then separated from the drum shaft 54*a* before the shutter 64 arrives at the opening position; and the abutment piece 80 separated from the drum shaft 54*a* then moves further to move the shutter 64 to the opening position.

With this structure, when the shutter 64 arrives at the opening position, the link 8 including the abutment piece 80 and the process cartridge 50 including the drum shaft 54*a* are separated from each other. Therefore, a user's operation to the process cartridge 50 does not affect opening/closing states of the shutter 64. Further, since there is no need to move the link 8 after the shutter 64 has moved to the opening position, the movable range of the link 8 can be set smaller.

Further, in the process for attachment of the process cartridge 50 to the housing 2, the process cartridge 50 abuts on the link 8, and the link 8 and the process cartridge 50 are then separated from each other, and, thereafter, the linear motion link 82 is urged to move toward the second position by the pressure arm 91 of the urging member 9.

With this structure, the link 8 is configured to be urged toward the second state by the urging member 9 after the link 8 is separated from the process cartridge 50, thereby moving the shutter 64 to the opening position by the link 8 that is urged by the urging member 9.

In particular, the link 8 can shift to the second state by the pressing of the pressure arm 91 on the second depressed surface 823*b* of the linear motion link 82, thereby moving the shutter 64 to the opening position.

Further, the pressure arm 91 is configured to abut on the first depressed surface 823*a* of the link 8 when the abutment piece 80 of the link 8 is abutted by the process cartridge 50 that is being attached to the housing 2, and the link 8 is configured to shift toward the second state so that the pressure arm 91 abuts on the second depressed surface 823*b* of the link 8 before the link 8 and the process cartridge 50 are separated from each other.

With this structure, since the pressure arm 91 is in abutment with the second depressed surface 823*b* when the link 8 and the process cartridge 50 are separated from each other, the link 8 can reliably move the shutter 64 to the opening position even after the link 8 is separated from the process cartridge 50.

As the process cartridge 50 is further inserted toward the attachment position from the position illustrated in FIG. 21, the drum shaft 54*a* moves from the intermediate portion 241*b* to the rear portion 241*c* of the cartridge rail 241, and then moves in the attachment direction toward the attachment position within the rear portion 241*c*. Thereafter, the process cartridge 50 reaches the attachment position illustrated in FIG. 25, where attachment of the process cartridge 50 to the housing 2 is completed.

(Operations for Detachment of the Process Cartridge 50)

Next, operations of the link 8 at the time of detachment of the process cartridge 50 at the attachment position from the housing 2 will be described. For detachment of the process cartridge 50, the operations performed for attaching the process cartridge 50 to the housing 2 are performed in reverse.

Figure 25:
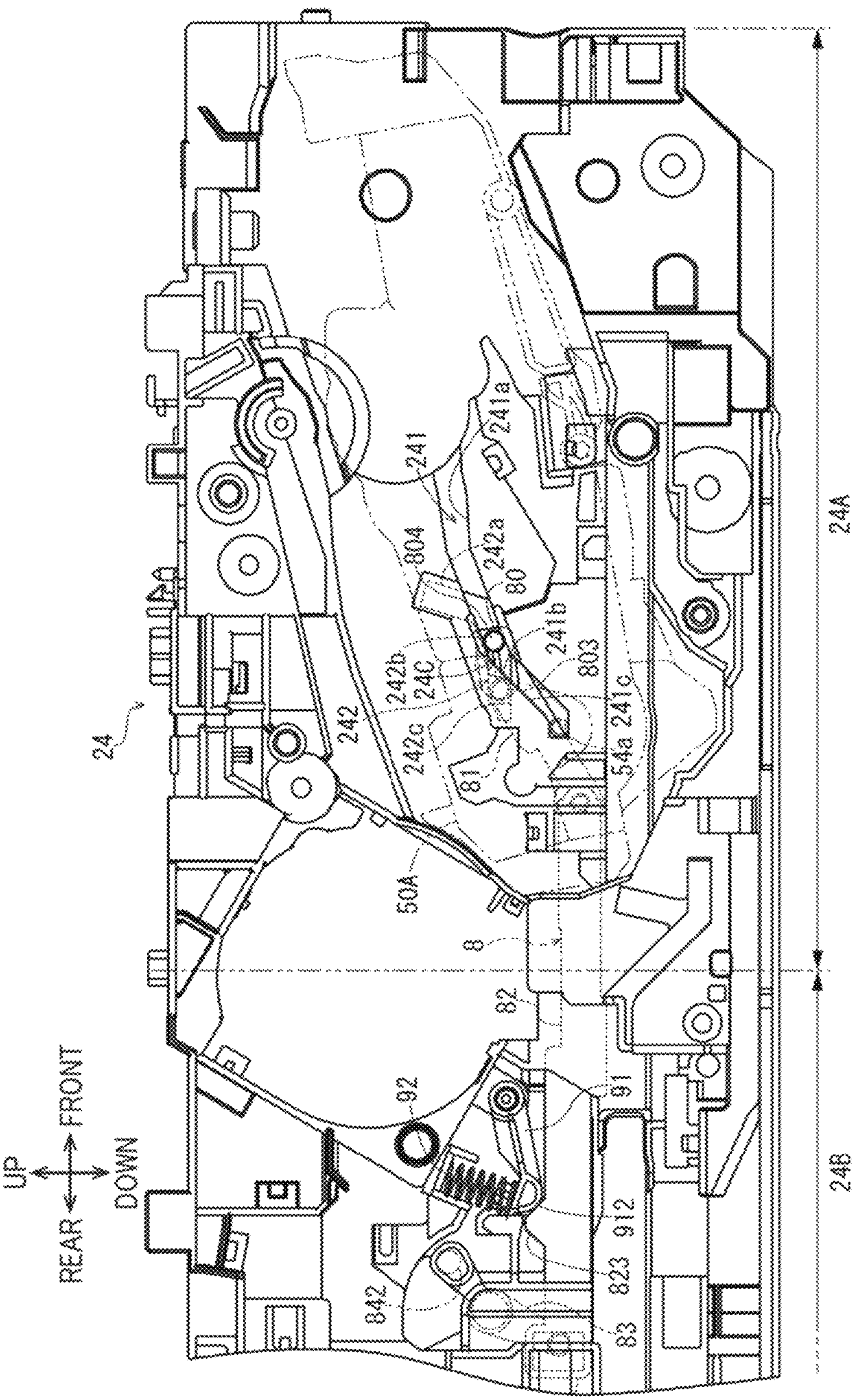
FIG. 25 is a side view of the first main frame, and particularly illustrating a state where the process cartridge reaches its attachment position after the drum shaft is separated from the abutment piece.

As illustrated in FIG. 25, in the state where the process cartridge 50 is attached to the housing 2 (i.e., at the attachment position), the drum shaft 54*a* is positioned rearward and separated away from the abutment piece 80, while the abutment piece 80 is positioned to extend over the rear portion 242*c* and the intermediate portion 242*b* of the abutment piece rail 242. Specifically, the first boss 803 of the abutment piece 80 is positioned in the rear portion 242*c* of the abutment piece rail 242, and the second boss 804 is positioned in the intermediate portion 242*b* (through-hole 24C) of the abutment piece rail 242. When the abutment piece 80 is located at the position indicated in FIG. 25, the shutter 64 has moved to the opening position (illustrated in FIG. 6B) by the link 8.

Further, when the abutment piece 80 is at the position indicated in FIG. 25, the abutment part 912 of the pressure arm 91 abuts on the second depressed surface 823*b* of the linear motion link 82, as illustrated in FIGS. 23A and 23B, and hence, frontward movement of the linear motion link 82 is restricted. Since the linear motion link 82 is urged by the urging member 9 while the shutter 64 is at the opening position, the shutter 64 is less likely to move accidentally from the opening position toward the closing position, thereby stably maintaining the opening position of the shutter 64.

Figure 26:
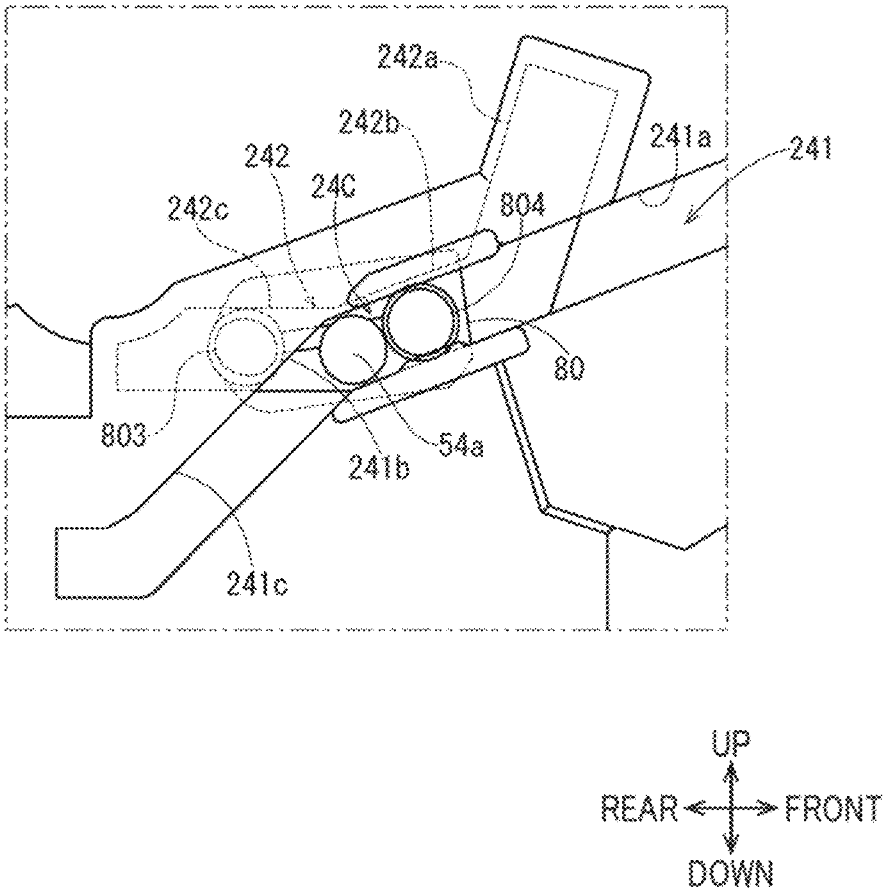
FIG. 26 is an enlarged view of the first main frame, and particularly illustrating a state where the drum shaft reaches the intermediate portion of the cartridge rail and abuts on the second boss of the abutment piece.

When the process cartridge 50 at the attachment position illustrated in FIG. 25 is moved frontward relative to the housing 2 for detachment of the process cartridge 50, the drum shaft 54*a* moves toward downstream in a detachment direction thereof along the rear portion 241*c* of the cartridge rail 241. Here, the detachment direction represents a direction in which the process cartridge 50 is moved toward the outside of the housing 2 for withdrawal of the process cartridge 50 from the housing 2. As illustrated in FIG. 26, when the drum shaft 54*a* moving along the cartridge rail 241 reaches the intermediate portion 241*b* (the through-hole 24C), the drum shaft 54*a* comes into contact with the second boss 804 of the abutment piece 80.

In a case where the process cartridge 50 in the attachment position illustrated in FIG. 25 is pulled frontward, the drum shaft 54*a* is moved downstream along the rear portion 241*c* in a detachment direction of the process cartridge 50. Incidentally, the detachment direction is the pulling out direction of the process cartridge 50 toward an outside of the housing 2 in the process of detaching the process cartridge 50 from the housing 2. As illustrated in FIG. 26, as soon as the drum shaft 54*a* moving in the cartridge rail 241 reaches the intermediate portion 241*b* (through-hole 24C), the drum shaft 54*a* abuts on the second boss 804 of the abutment piece 80.

Figure 27:
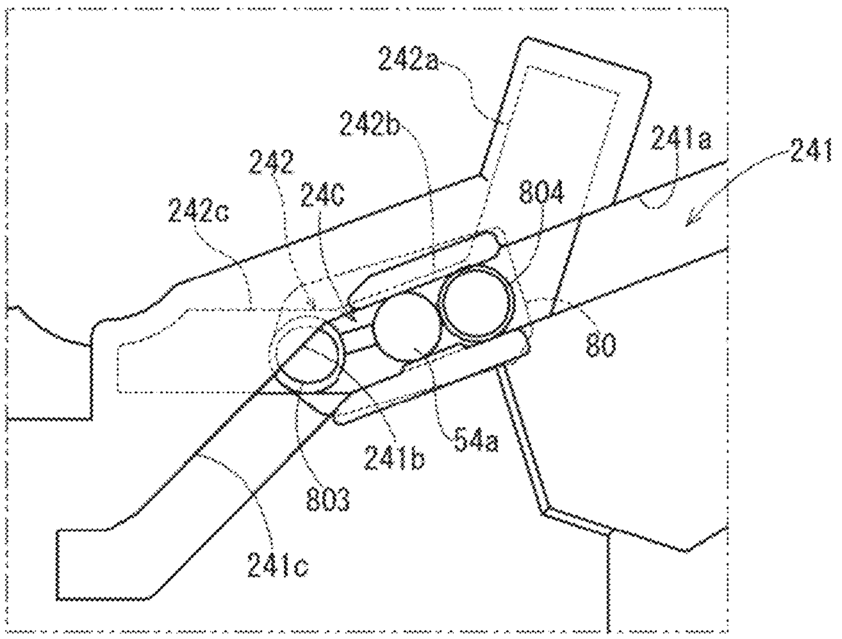
FIG. 27 is an enlarged side view of the first main frame, and particularly illustrating a state where the second boss of the abutment piece in abutment with the drum shaft is being moved forward toward the front portion from the intermediate portion of the abutment piece rail.
Figure 27:
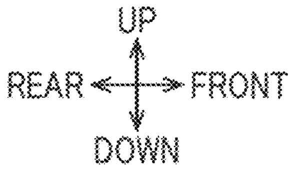

As illustrated in FIG. 27, the abutment piece 80 is pushed by the drum shaft 54*a* when contacted by the drum shaft 54*a*, and is moved by the drum shaft 54*a* toward further downstream in the detachment direction of the process cartridge 50. That is, the first boss 803 of the abutment piece 80 moves from the rear portion 242*c* to the intermediate portion 242*b* (through-hole 24C) of the abutment piece rail 242. Concurrently, the second boss 804, which is being pushed by the drum shaft 54*a*, moves from the intermediate portion 242*b* (through-hole 24C) toward the front portion 242*a* of the abutment piece rail 242.

Figure 28A:
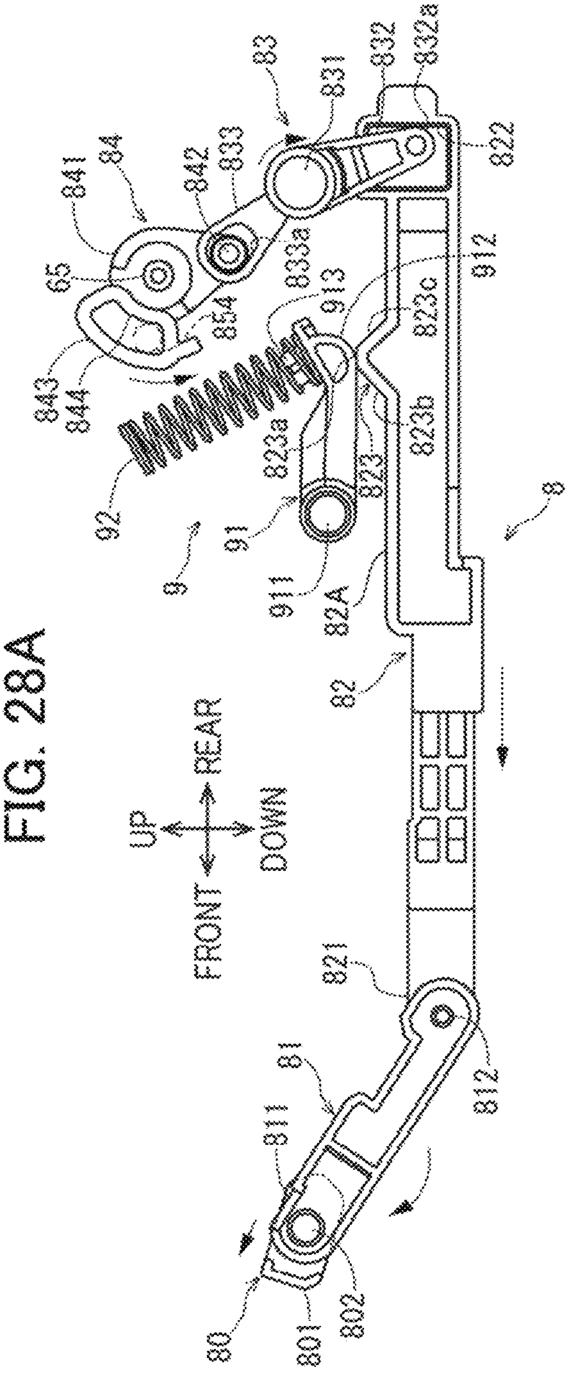
FIG. 28A is a right side view of the link, and particularly illustrating a state where the second boss of the abutment piece in abutment with the drum shaft is moved from the intermediate portion toward the front portion of the abutment piece rail, causing the liner motion link to move frontward so that the pressure arm moves onto a first depressed surface from a second depressed surface of the linear motion link.
Figure 28B:
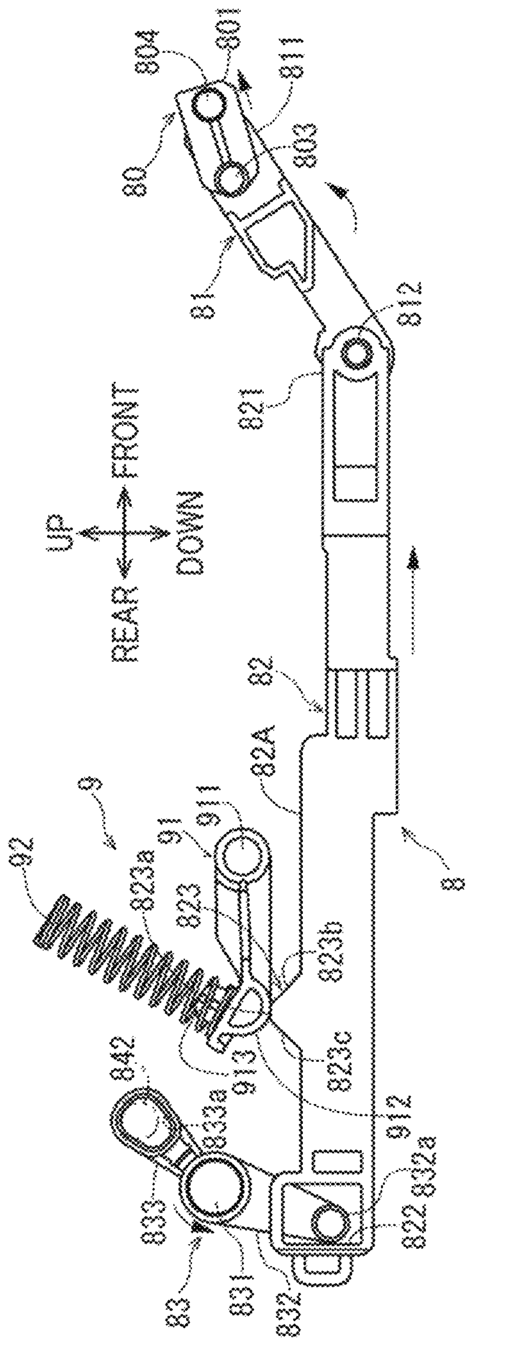
FIG. 28B is a left side view of the link in the state illustrated in FIG. 28A.

As illustrated in FIGS. 28A and 28B, in accordance with the movement of the abutment piece 80, the first pivot link 81 is pivotally moved frontward to increase the inclination angle of the first pivot link 81 with respect to the horizontal direction. In response to the pivotal movement and frontward movement of the first pivot link 81, the linear motion link 82 is linearly moved frontward. That is, the drum shaft 54*a* of the process cartridge 50 that is being detached from the housing 2 abuts on the abutment piece 80 to move the linear motion link 82 frontward, i.e., in a direction for moving the linear motion link 82 from the second position toward the first position.

In this case, due to the frontward movement of the linear motion link 82, the abutment part 912 of the pressure arm 91 climbs up the second depressed surface 823*b* against the urging force of the urging spring 92 and moves onto the first depressed surface 823*a* from the second depressed surface 823*b*. That is, in the process for detaching the process cartridge 50 from the housing 2, the pressure arm 91 abuts on the first depressed surface 823*a* after abutting on the second depressed surface 823*b*. In the state where the pressure arm 91 is in abutment with the first depressed surface 823*a* which is a horizontal surface, the urging member 9 no longer restricts the shutter 64 from moving from the opening position toward the closing position.

As the linear motion link 82 moves further frontward, the connection hole 822 of the linear motion link 82 is brought into engagement with the engagement pin 832*a* of the second pivot link 83, thereby pivotally moving the second pivot link 83 in such a direction that the engagement pin 832*a* moves frontward. In accordance with the pivotal movement of the second pivot link 83, the connection hole 833*a* of the second pivot link 83 is brought into engagement with the engagement pin 842 of the third pivot link 84, thereby pivotally moving the third pivot link 84 in such a direction that the engagement pin 842 moves rearward.

Figure 29:
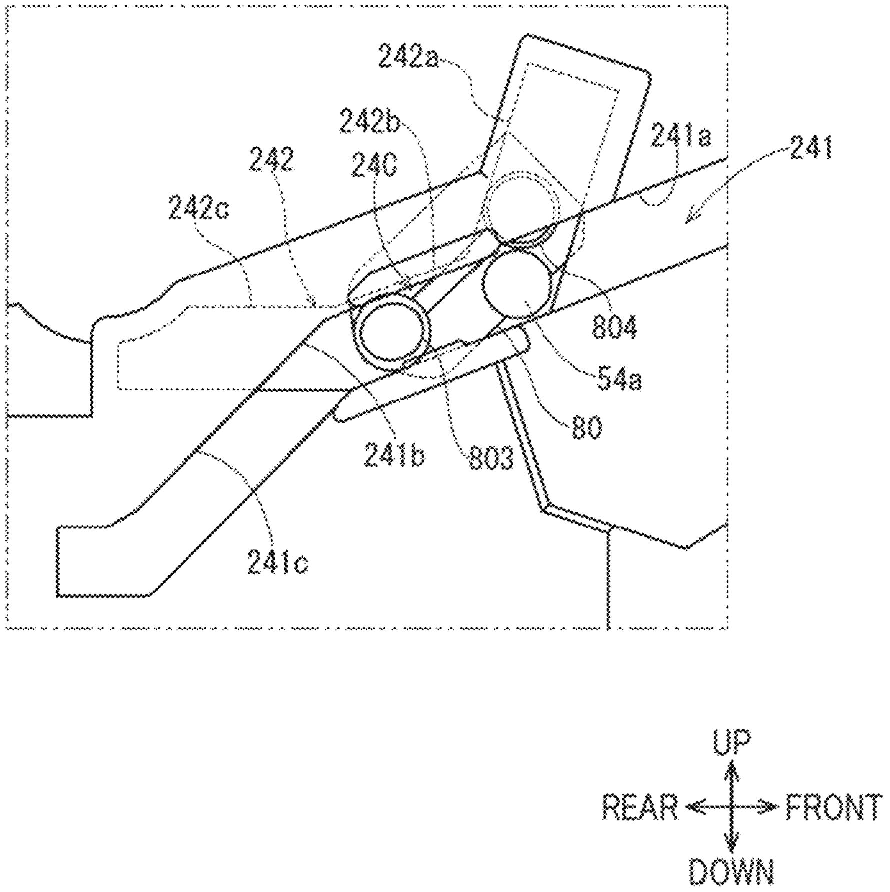
FIG. 29 is an enlarged side view of the first main frame, and particularly illustrating a state where the first boss of the abutment piece, which is being pushed by the drum shaft, is positioned in the intermediate portion of the abutment piece rail and the second boss is positioned in the front portion of the abutment piece rail.

As the process cartridge 50 is further moved from the housing 2 in the detachment direction, the abutment piece 80 is further moved downstream in the detachment direction by the drum shaft 54*a* that is moving along the intermediate portion 241*b* (through-hole 24C) of the cartridge rail 241, as illustrated in FIG. 29. In the state illustrated in FIG. 29, the first boss 803 is positioned in the intermediate portion 242*b* (through-hole 24C) of the abutment piece rail 242 and the second boss 804 is positioned in the front portion 242*a* of the abutment piece rail 242.

Figure 30A:
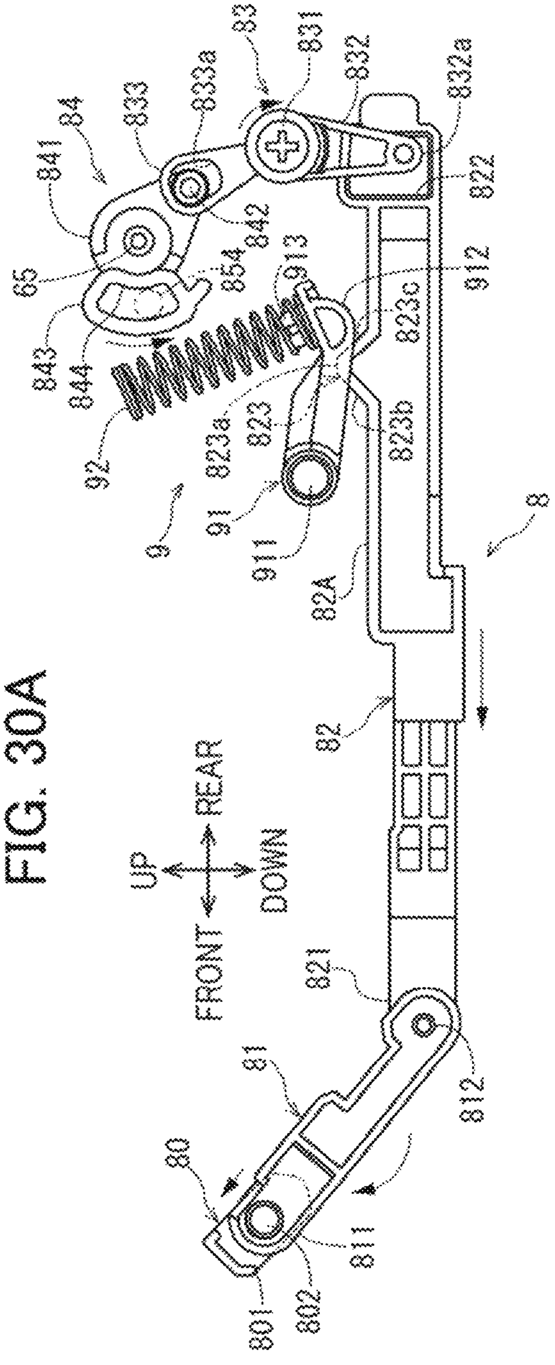
FIG. 30A is a right side view of the link, and particularly illustrating a state where the pressure arm has moved from the first depressed surface to a third depressed surface of the linear motion link in accordance with further frontward movement of the liner motion link.
Figure 30B:
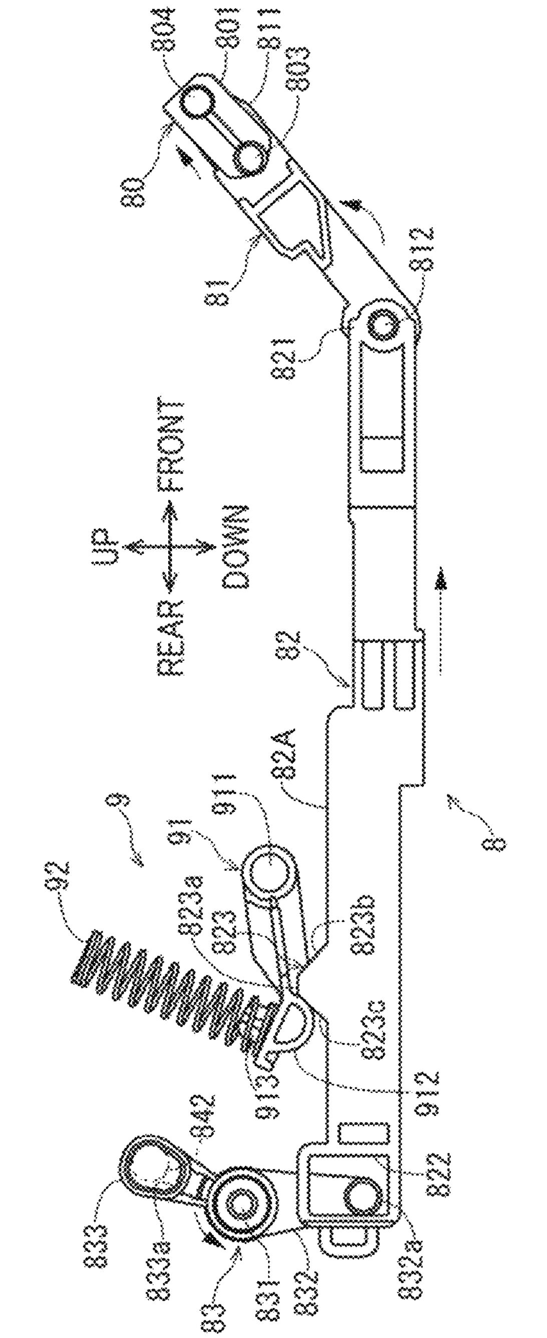
FIG. 30B is a left side view of the link in the state illustrated in FIG. 30A.

In accordance with the movement of the abutment piece 80, the first pivot link 81 is further pivotally moved frontward to increase the inclination angle of the first pivot link 81 with respect to the horizontal direction, as illustrated in FIGS. 30A and 30B. In response to the pivotal movement and frontward movement of the first pivot link 81, the linear motion link 82 linearly moves further frontward. In accordance with the frontward movement of the linear motion link 82, the second pivot link 83 is pivotally moved further in such a direction that the engagement pin 832*a* moves frontward. In accordance with the pivotal movement of the second pivot link 83, the third pivot link 84 is further pivotally moved in such a direction that the engagement pin 842 moves rearward.

In accordance with the pivotal movement of the third pivot link 84, the coil spring 86 is pivotally moved, so that the coil arm 861 of the coil spring 86 comes into engagement with the engagement pin 854 of the shutter link 85 from above, as illustrated in FIG. 6A. Due to this engagement between the coil arm 861 and the engagement pin 854, the shutter link 85 is pivotally moved to move the engagement portion 853 downward. In this way, the shutter 64 is moved from the opening position toward the closing position.

In this case, since the movement of the abutment piece 80 caused by the drum shaft 54*a* is transmitted to the linear motion link 82 through the first pivot link 81, the driving force can be efficiently transmitted from the abutment piece 80 to the shutter 64 even if the process cartridge 50 at the attachment position in the housing 2 is located apart from the shutter 64.

When the drum shaft 54*a* moves the abutment piece 80 until the first boss 803 reaches the front portion 242*a* of the abutment piece rail 242, the linear motion link 82 moves further rearward, which then causes the abutment part 912 of the pressure arm 91 of the urging member 9 to move from the first depressed surface 823*a* to the third depressed surface 823*c* of the linear motion link 82 due to the urging force of the urging spring 92 (see FIGS. 30A and 30B).

Here, the positional relationship between the pressure arm 91 and the link 8 is so designed that the abutment part 912 of the pressure arm 91 abuts on the third depressed surface 823*c* without fail in a state where the abutment piece 80 has moved to such a position that the second boss 804 is positioned in the front portion 242*a* of the abutment piece rail 242. Further, within the dimensional tolerance of each component constituting the link 8, the pressure arm 91 and the link 8 are so designed that the abutment part 912 does not contact a flat part of the upper surface 82A of the linear motion link 82 even in a case where the abutment part 912 abuts on the third depressed surface 823*c* at a lowermost end thereof, the flat part being positioned rearward of the third depressed surface 823*c*.

After the abutment part 912 abuts on the third depressed surface 823*c* (after the drum shaft 54*a* moves the abutment piece 80 until the second boss 804 reaches the front portion 242*a* of the abutment piece rail 242), the drum shaft 54*a* moves from the intermediate portion 241*b* to the front portion 241*a* of the cartridge rail 241, so that the drum shaft 54*a* is separated away from the abutment piece 80.

At a time when the drum shaft 54*a* separates from the abutment piece 80, the shutter 64 has not yet arrived at the closing position. That is, the drum shaft 54*a* and the abutment piece 80 are separated from each other before the linear motion link 82, which is moving from the second position toward the first position by being pushed by the drum shaft 54*a*, reaches the first position.

After the drum shaft 54*a* moves the abutment piece 80 to such a position that the second boss 804 reaches the front portion 242*a* of the abutment piece rail 242 and after the abutment part 912 abuts on the third depressed surface 823*c*, the drum shaft 54*a* no longer moves the abutment piece 80, since the second boss 804 and the drum shaft 54*a* are separated from each other.

However, since the abutment part 912 of the pressure arm 91 is in abutment with the third depressed surface 823*c* as illustrated in FIGS. 30A and 30B, the pressure arm 91 applies the pressing force to the linear motion link 82 urging the linear motion link 82 to move toward the first position. Hence, the linear motion link 82 is moved frontward. That is, the linear motion link 82 is urged by the urging member 9 reaches the first position after the abutment piece 80 is separated from the drum shaft 54*a*.

As illustrated in FIG. 6A, when the linear motion link 82 moves frontward to reach the first position by the pressing force from the pressure arm 91, the shutter link 85 is pivotally moved such that the engagement portion 853 moves downward, thereby moving the shutter 64 to the closing position.

As such, the abutment piece 80 has already been separated from the process cartridge 50 by the time when the linear motion link 82 reaches the first position and the shutter 64 has moved to the closing position. Hence, the closing position of the shutter 64 can be stably maintained, irrespective of the position of the process cartridge 50 after separation from the abutment piece 80.

Figure 32:
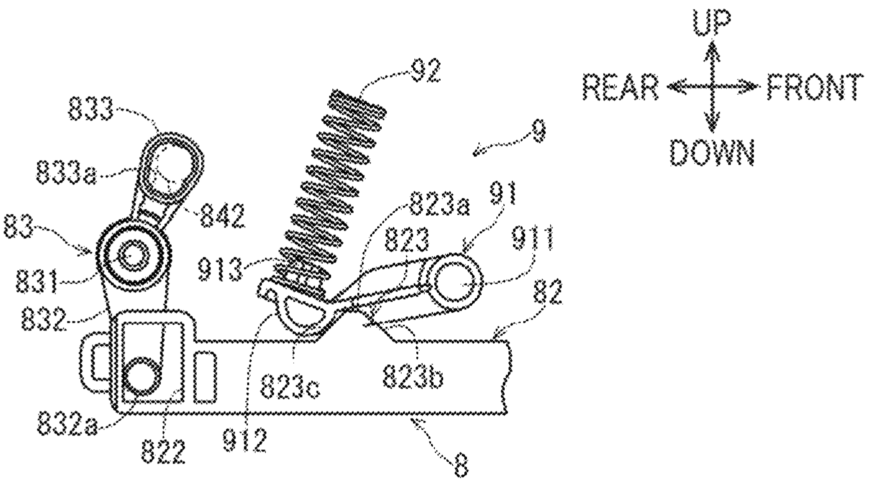
FIG. 32 is a partial side view of the link, and particularly illustrating a state where the linear motion link is moved frontward by the pressing force of the pressure arm until the shutter reaches the closing position.

Further, in a case where the linear motion link 82 is moved frontward by the pressing force from the pressure arm 91 to move the shutter 64 to the closing position, the abutment part 912 of the pressure arm 91 is configured not to contact the flat part of the upper surface 82A of the linear motion link 82 positioned rearward of the third depressed surface 823*c*, as illustrated in FIG. 32. Hence, the closing position of the shutter 64 can be maintained by the pressing force from the pressure arm 91.

Figure 31:
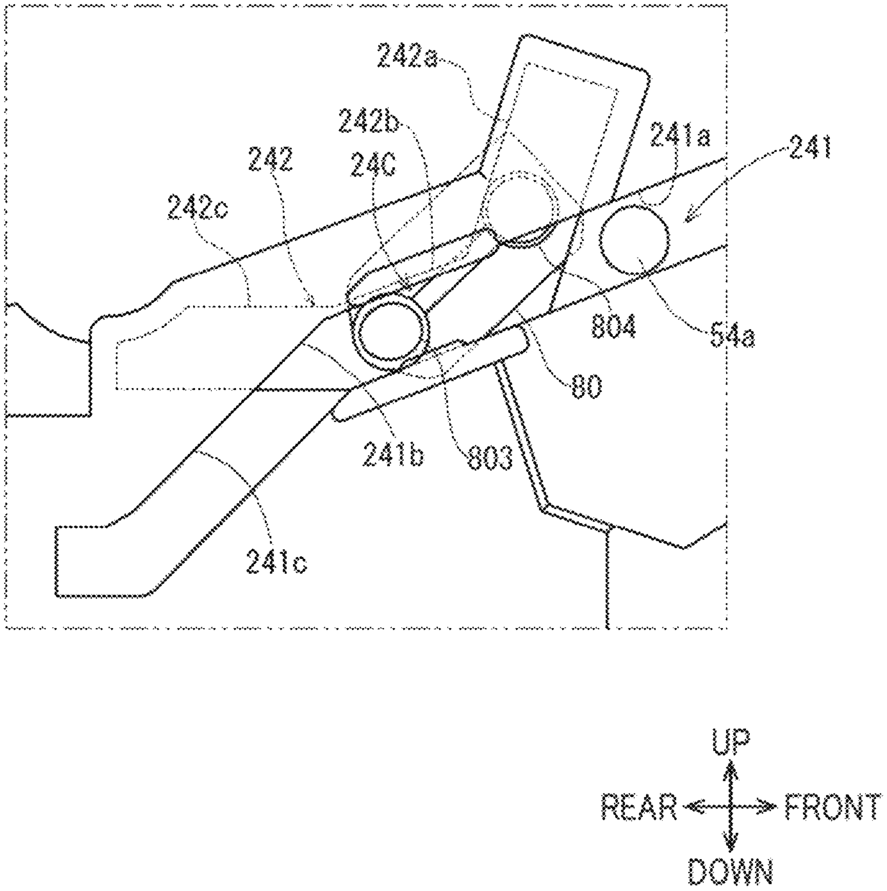
FIG. 31 is an enlarged side view of the first main frame, and particularly illustrating a state where the second boss has moved to the front portion of the abutment piece rail and the drum shaft is separated from the abutment piece.
Figure 33:
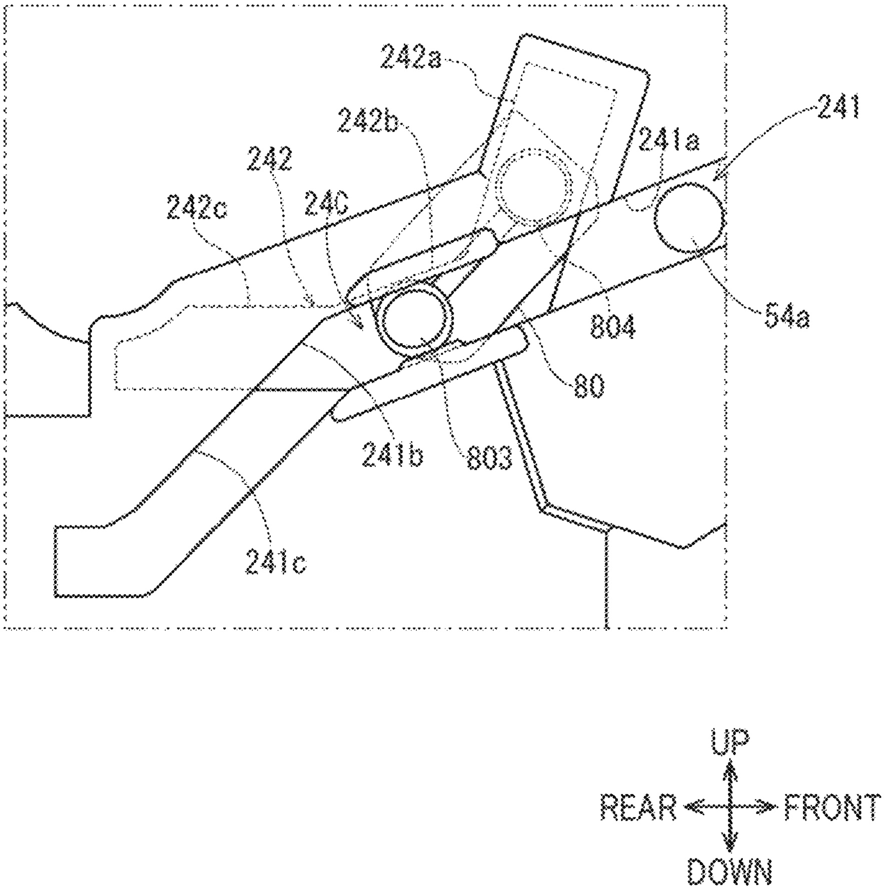
FIG. 33 is an enlarged side view of the first main frame, and particularly illustrating a state where the second boss has moved further frontward along the front portion of the abutment piece rail from the position indicated in FIG. 31, in response to the frontward movement of the linear motion link by the pressing force of the pressure arm.

Further, as illustrated in FIG. 33, in accordance with the frontward movement of the linear motion link 82 by the pressing force from the pressure arm 91, the abutment piece 80 is pushed frontward by the first pivot link 81 such that the second boss 804 of the abutment piece 80 moves frontward along the front portion 242*a* of the abutment piece rail 242 from the position illustrated in FIG. 31.

Upon arrival of the shutter 64 at the closing position, the abutment part 64*b* abuts on the abutment surface 632 of the fixing frame 63. With this structure, since the shutter 64 is restricted from moving further, the shutter 64 can be retained at the closing position.

In this way, during the detachment of the process cartridge 50 at its attachment position from the housing 2, the drum shaft 54*a* of the process cartridge 50 abuts on the abutment piece 80 of the link 8, which in turn moves the link 8 such that the shutter 64 at the opening position is moved toward the closing position. Hence, the shutter 64 can move to the closing position in association with the detaching operation to the process cartridge 50 from the housing 2.

As described above, in the image-forming apparatus 1 according to the embodiment, the drum shaft 54*a* abuts on the first boss 803 of the abutment piece 80, thereby causing the link 8 to operate such that the shutter 64 can move from the closing position to the opening position during the attachment of the process cartridge 50 to the housing 2, whereas the drum shaft 54*a* abuts on the second boss 804 of the abutment piece 80, thereby causing the link 8 to operate such that the shutter 64 can move from the opening position to the closing position during the detachment of the process cartridge 50 from the housing 2.

That is, in the image-forming apparatus 1, the shutter 64 is configured to move to the opening position in a state where the process cartridge 50 is attached to the housing 2, and the shutter 64 is configured to move to the closing position in a state where the process cartridge 50 is detached from the housing 2. In other words, the shutter 64 is movable between the opening position and the closing position in accordance with the user's attaching and detaching operations of the process cartridge 50 relative to the housing 2. Further, the link 8 can be operated in association with both the attachment and detachment of the process cartridge 50 to and from the housing 2, through a simple structure.

Further, in the image-forming apparatus 1, displacement of the link 8 can be performed in association with the movement of the process cartridge 50 which is subject to user's operations. That is, the opening and closing of the shutter 64 can be performed in interlocking relation to the user's operations.

<How the Shutter 64 at the Closing Position Operates when Applied with Force Urging Toward the Opening Position>

As illustrated in FIG. 6A, in a state where the link 8 is in the first state and the shutter 64 is at the closing position, the engagement pin 854 of the shutter link 85 is urged by the coil arm 861 of the coil spring 86 in such a direction that the shutter 64 moves to the closing position.

That is, in a state where the third pivot link 84 is at the first cam position, the coil spring 86 abuts on the shutter link 85 to urge the shutter link 85 in the direction for moving the shutter 64 to the closing position. In this state, a gap exists between the coil arm 861 of the coil spring 86 and the upper end 844*b* of the engagement hole 844.

Further, in the state where the link 8 is in the first state and the shutter 64 is at the closing position, the linear motion link 82 of the link 8 is urged by the urging member 9 in the direction for moving the shutter 64 to the closing position.

Here, the urging force of the urging member 9 to urge the linear motion link 82 in the direction for moving the shutter 64 to the closing position is set greater than the urging force of the coil spring 86 to urge the engagement pin 854 of the shutter link 85 in the direction for moving the shutter 64 to the closing position.

In a case where the shutter 64 is applied with an external force acting in a direction for moving the shutter 64 toward the opening position in the state where the link 8 is in the first state and the shutter 64 is at the closing position, the shutter link 85 may move in such a direction that the shutter 64 moves toward the opening position against the urging force of the coil spring 86 applied to the shutter link 85, if the external force is greater than the urging force of the coil spring 86.

Even when the shutter link 85 moves in the direction to move the shutter 64 toward the opening position, the third pivot link 84 connected to the linear motion link 82 does not pivotally move, since the urging force of the urging member 9 is set greater than the urging force of the coil spring 86. Rather, the coil arm 861 of the coil spring 86 is resiliently deformed upward, as illustrated in FIG. 34. In this case, since the gap is formed between the coil arm 861 and the upper end 844*b* of the engagement hole 844, mechanical interference does not occur between the upper end 844*b* and the coil arm 861 that has moved upward toward the upper end 844*b*.

That is, when the shutter 64 movers from the closing position toward the opening position while the third pivot link 84 is at the first cam position, the coil spring 86 in abutment with the shutter link 85 is resiliently deformed whereas the first cam position of the third pivot link 84 is maintained. As such, the third pivot link 84 of the link 8 is configured not to move from the first cam position toward the second position even when an external force urging the shutter 64 toward the opening position is applied to the shutter 64 at the closing position.

Here, suppose that the third pivot link 84 is configured to move from the first cam position toward the second cam position in response to the movement of the shutter 64 from the closing position toward the opening position while the third pivot link 84 is at the first cam position. In this case, in accordance with the movement of the third pivot link 84, the abutment piece 80 would move through the linear motion link 82 connected to the third pivot link 84 and the first pivot link 81 connected to the linear motion link 82.

If the abutment piece 80 were moved, the second boss 804 of the abutment piece 80, which is located at the front portion 242*a*, were introduced in the intermediate portion 242*b* (through-hole 24C). If this is the case, the drum shaft 54*a* would mechanically interfere with the second boss 804 in the process for attachment of the process cartridge 50, thereby preventing the drum shaft 54*a* from abutting on the first boss 803. As a result, the link 8 could be hindered from operating normally.

However, in the image-forming apparatus 1 according to the present embodiment, even when the shutter 64 at the closing position is moved toward the opening position while the third pivot link 84 is at the first cam position, the coil spring 86 in abutment with the shutter link 85 is resiliently deformed to restrict the third pivot link 84 from pivoting and to maintain the third pivot link 84 at the first cam position. Accordingly, this configuration does not hinder subsequent operations of the link 8.

<Variations and Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the described embodiment, the link 8 is configured of the abutment piece 80, the first pivot link 81, the linear motion link 82, the second pivot link 83, the third pivot link 84, the shutter link 85, and the coil spring 86. As an alternative, a single link member connected to the shutter 64 may be so configured to abut on the process cartridge 50. Further, each link need not move pivotally or linearly, but may move differently rather than pivotally or linearly.

Further, in the described embodiment, the drum shaft 54*a* of the process cartridge 50 is configured to abut on the abutment piece 80 of the link 8 to open and close the shutter 64. However, a component of the process cartridge 50 other than the drum shaft 54*a* may be configured to abut on the link 8.

Further, in the described embodiment, the urging member 9 includes the urging spring 92 and the pressure arm 91 urged by the urging spring 92, and the pressure arm 91 is configured to abut on the linear motion link 82 from above. As an alternative, the urging member of the disclosure may be provided in a form of a component(s) other than a spring and a pressure arm as long as the urging member is configured to urge the link 8. Further, the urging direction of the urging spring 92 need not be downward, but may be leftward, rightward, upward, frontward, or rearward, for example.

Further, in the described embodiment, once the shutter 64 has moved to the opening position, the shutter 64 is configured to be held at the opening position due to the abutment of the abutment end part 64*a* with the abutment surface 631 of the fixing frame 63. Alternatively, the position of the shutter 64 may be fixed at the opening position by an abutment of a part of the link 8. For example, the linear motion link 82 and/or the shutter link 85 may be configured to abut on an abutment surface of the housing 2 in a state where the shutter 64 is fully opened by the second pivot link 83 and the shutter link 85. Likewise, in the present embodiment, the shutter 64 is fixed at the closing position due to abutment of the abutment part 64*b* and the abutment surface 632 of the fixing frame 63 once the shutter 64 has moved to the closing position. However, the position of the shutter 64 may be fixed at the closing position by an abutment of a part of the link 8 with the housing 2 once the shutter 64 has moved to the fully closing position.

Second Embodiment

Figure 35:
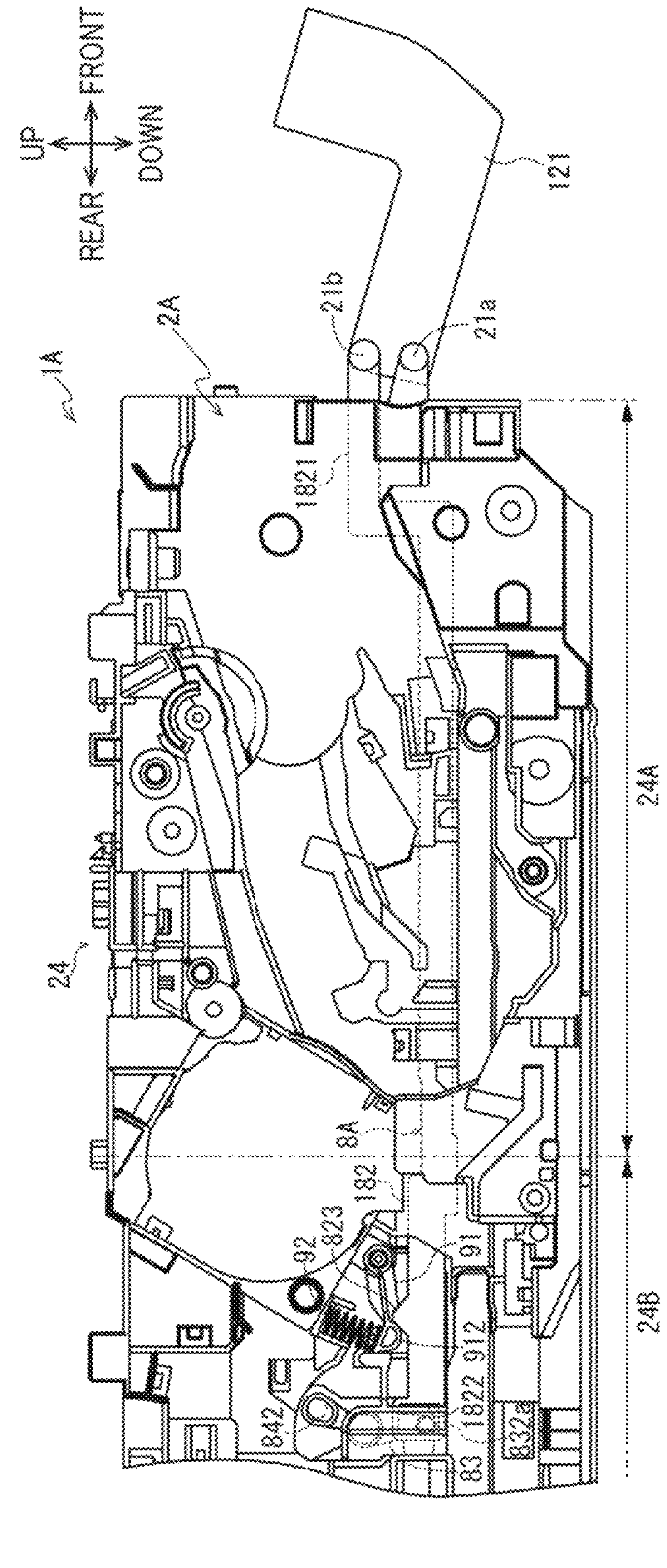
FIG. 35 is a side view of a first main frame in an image-forming apparatus according to a second embodiment in which a front cover thereof serves as an operation member for shifting a link.

An image-forming apparatus 1A according to a second embodiment will be described next with reference to FIG. 35, in which like parts and components are designated by the same reference numerals as those of the first embodiment to avoid duplicating description.

According to the first embodiment, the process cartridge 50 functions as an operation member of the disclosure for shifting the link 8 between the first state and the second state. In the second embodiment, a front cover 121 functions as the operation member for shifting a link 8A between the first state (to move the shutter 64 to the closing position) and the second state (to move the shutter 64 to the opening position). The front cover 121 is an example of a cover serving as another example of the operation member of the disclosure.

Specifically, in the image-forming apparatus 1A, the link 8A can be displaced between the first state and the second state in accordance with user's operations to the front cover 121. The link 8A of the second embodiment is different from the link 8 in that, the link 8A does not includes the abutment piece 80 and the first pivot link 81, but includes a linear motion link 182 instead of the linear motion link 82.

The front cover 121 is pivotally movable about the axis of the pivot shaft 21*a* between the open position and the closed position. The front cover 121 is provided with a boss 21*b*.

The linear motion link 182 is a generally linear member extending in the front-rear direction. The linear motion link 182 is pivotally movably connected to the front cover 121.

The linear motion link 182 has a front end portion provided with a fitting part 1821, and a rear end portion formed with a connection hole 1822. The boss 21*b* of the front cover 121 is rotatably fitted with the fitting part 1821. The linear motion link 182 thus is connected to the front cover 121 by the fitting engagement between the boss 21*b* and the fitting part 1821. The linear motion link 182 is linearly movable in the front-rear direction in accordance with the pivotal movement of the front cover 121.

The linear motion link 182 is configured to move rearward in accordance with the pivotal movement of the front cover 121 from the open position to the closed position, thereby causing the link 8A to move the shutter 64 from the closing position to the opening position. Reversely, the linear motion link 182 is configured to move frontward in accordance with the pivotal movement of the front cover 121 from the closed position to the open position, thereby causing the link 8A to move the shutter 64 from the opening position to the closing position.

That is, the shutter 64 has moved to the opening position when the front cover 121 is at the closed position, and the shutter 64 has moved to the closing position when the front cover 121 is at the open position. At the first position, the linear motion link 182 can move the shutter 64 the closed position. At the second position, the linear motion link 182 can move the shutter 64 to the opening position.

The engagement pin 832*a* of the second pivot link 83 is inserted in the connection hole 1822 of the linear motion link 182 from its right side. The engagement pin 832*a* and the connection hole 1822 are engageable with each other in association with the movement of the linear motion link 182 in the front-rear direction. The linear motion link 182 is connected to the second pivot link 83 by the engagement between the engagement pin 832*a* and the connection hole 1822.

With this configuration, the link 8A is configured to move the shutter 64 from the closing position to the opening position in accordance with the pivotal movement of the front cover 121 from the open position to the closed position, and the link 8A is configured to move the shutter 64 from the opening position to the closing position in accordance with the pivotal movement of the front cover 121 from the closed position to the open position.

In this way, by using the front cover 121 as the operation member for moving the link 8A, the shutter 64 is allowed to move between the opening position and the closing position in interlocking relation to the opening/closing operation to the front cover 121.

What is claimed is:

1. An image-forming apparatus comprising:
- a fixing device configured to fix a toner image to a sheet, the fixing device comprising:
  - a heater unit; and
  - a pressure unit forming a nipping region in cooperation with the heater unit;
- a shutter movable between a closing position for covering a part of the heater unit and an opening position for opening the part of the heater unit; and
- an urging member comprising a spring, the spring being configured to urge the shutter such that:
  - when the shutter is at the closing position, the shutter is maintained at the closing position; and
  - when the shutter is at the opening position, the shutter is maintained at the opening position.

2. The image-forming apparatus according to claim 1, further comprising a link configured to switch an urging direction of the spring between a first urging direction for maintaining the shutter at the closing position and a second urging direction for maintaining the shutter at the opening position.

3. The image-forming apparatus according to claim 2,
- wherein the link is connected to the shutter, the link being configured to shift between a first state where the link places the shutter at the closing position and a second state where the link places the shutter at the opening position, and
- wherein the spring urges the link.

4. The image-forming apparatus according to claim 3,
- wherein the urging member further comprises:
  - a pressing arm connected to the spring, the pressing arm being configured to press the link,
  - wherein the spring urges the shutter through the pressing arm and the link.

5. The image-forming apparatus according to claim 4,
- wherein the link comprises a first link movable between a first position and a second position, the first link being at the first position when the link is in the first state, the first link being at the second position when the link is in the second state, and
- wherein the first link has:
  - a first part on which the pressing arm is configured to abut when the first link is at the first position, wherein the first part is configured to convert an urging force of the spring into a first force for moving the first link in a first direction from the second position toward the first position while the pressing portion-arm abuts on the first part; and
  - a second part on which the pressing arm is configured to abut when the first link is at the second position, wherein the second part is configured to convert the urging force of the spring into a second force for moving the first link in a second direction from the first position toward the second position while the pressing arm abuts on the second part.

6. The image-forming apparatus according to claim 5,
- wherein the first part is a first sloped surface that is sloped relative to the first direction,
- wherein the second part is a second sloped surface that is sloped relative to the second direction, and
- wherein the first sloped surface and the second sloped surface extend in different directions from each other.

7. The image-forming apparatus according to claim 6,
- wherein the spring of the urging member urges the pressing arm downward,
- wherein the first sloped surface is sloped upward as extending further in the first direction, and
- wherein the second sloped surface is sloped upward as extending further in the second direction.

8. The image-forming apparatus according to claim 4,
- wherein the pressing arm has one end portion functioning as a pivot center of the pressing arm and another end portion provided with an abutment part in abutment with the link.

9. The image-forming apparatus according to claim 8,
- wherein the spring is connected to the another end portion of the pressing arm to urge the abutment part against the link.

10. The image-forming apparatus according to claim 3, further comprising an operation member configured to be operated by a user and configured to shift the link between the first state and the second state.

11. The image-forming apparatus according to claim 10, further comprising a housing that houses the fixing device, the shutter, and the urging member therein, wherein the operation member is a cartridge attachable to and detachable from the housing, the shutter being at the opening position in a state where the cartridge is attached to the housing, the shutter being at the closing position in a state where the cartridge is detached from the housing.

12. The image-forming apparatus according to claim 11, wherein the cartridge comprises a photosensitive drum having a drum shaft, the photosensitive drum being rotatable about an axis of the drum shaft, and wherein the link comprises:

an abutment piece on which the drum shaft is configured to abut;

a first link on which the urging member abuts; and a second link pivotally movably connected to the first link and to the abutment piece.

13. The image-forming apparatus according to claim 12, wherein the first link is movable between a first position and a second position, the first link being at the first position when the link is in the first state, the first link being at the second position when the link is in the second state, wherein the drum shaft is configured to abut on the abutment piece to move the first link in a first direction from the second position toward the first position during detachment of the cartridge from the housing, wherein the drum shaft is configured to be separated from the abutment piece before the first link moving in the first direction arrives at the first position, and wherein, after the drum shaft is separated from the abutment piece, the first link is urged to move in the first direction to reach the first position by an urging force of the spring of the urging member applied to the first link.

14. The image-forming apparatus according to claim 10, further comprising:

a housing that houses the fixing device, the shutter, and the urging member therein, the housing having an opening; and a cover movable between a closed position where the cover closes the opening and an open position where the cover opens the opening, the cover functioning as the operation member, wherein the shutter is at the opening position while the cover is at the closed position, and the shutter is at the closing position while the cover is at the open position.

15. The image-forming apparatus according to claim 3, wherein the link is configured not to shift from the first state toward the second state in a case where the shutter at the closing position is applied with an external force acting in a direction for moving the shutter toward the opening position.

16. The image-forming apparatus according to claim 15, wherein the link comprises:

a shutter link connected to the shutter and configured to move the shutter between the opening position and the closing position;

a link cam connected to the shutter link, the link cam being movable between a first cam position and a second cam position, the link cam being at the first cam position when the link is in the first state, the link cam being at the second cam position when the link is in the second state; and a link spring movable in accordance with movement of the link cam and configured to abut on the shutter link to move the shutter link, wherein, when the link cam is at the first cam position, the link spring abuts on the shutter link to urge the shutter link in a direction for moving the shutter from the opening position toward the closing position, and wherein the link spring abutting on the shutter link is resiliently deformed to maintain the link cam at the first cam position in the case where the shutter at the closing position is applied with the external force when the link cam is at the first cam position.

17. The image-forming apparatus according to claim 1, wherein the fixing device has a restriction surface on which the shutter is configured to abut when the shutter is at the closing position, the restriction surface being configured to restrict movement of the shutter at the closing position.

18. The image-forming apparatus according to claim 1, further comprising a link connected to the shutter, the link being configured to shift between a first state where the link places the shutter at the closing position and a second state where the link places the shutter at the opening position, the link comprising:

a first link urged by the spring of the urging member, the first link being movable between a first position and a second position, the first link being at the first position when the link is in the first state, the first link being at the second position when the link is in the second state.

19. The image-forming apparatus according to claim 18, wherein the link further comprises:

a shutter link connected to the shutter and configured to move the shutter between the opening position and the closing position;

a link cam connected to the shutter link and connectable to the first link, the link cam being movable between a first cam position and a second cam position, the link cam being at the first cam position when the link is in the first state, the link cam being at the second cam position when the link is in the second state; and a link spring movable in accordance with movement of the link cam and configured to abut on the shutter link to move the shutter link.

20. The image-forming apparatus according to claim 19, wherein the urging member further comprises:

a pressing arm connected to the spring, the pressing arm abutting on the first link to apply an urging force of the spring to the first link, and wherein, when the link is in the first state, the urging force of the spring applied to the first link when the first link is at the first position is greater than an urging force of the link spring applied to the shutter link when the link cam is at the first cam position.

21. The image-forming apparatus according to claim 1, wherein the spring is configured to exert a force on different parts of a link which is connected to the shutter to urge the shutter such that:

when the shutter is at the closing position, movement of the shutter from the closing position is restricted to maintain the shutter at the closing position; and when the shutter is at the opening position, movement of the shutter from the opening position is restricted to maintain the shutter at the opening position.

* * * * *